United States Patent
Holtzapple et al.

(10) Patent No.: US 12,553,022 B2
(45) Date of Patent: Feb. 17, 2026

(54) PROCESSES FOR CONVERTING BIOMASS INTO HIGH-VALUE PRODUCTS

(71) Applicant: The Texas A&M University System, College Station, TX (US)

(72) Inventors: Mark Holtzapple, College Station, TX (US); Sagar Lonkar, Hillsboro (IN); Pratik Darvekar, Philadelphia (IN); Samarpita Roy, Mumbai (IN); Cesar Granda, College Station, TX (US); Trent Benefield, Houston, TX (US); Jeremy Seidel, Berkeley, CA (US); Victoria Ehlinger, Berkeley, CA (US); Scott Wellington, Bellaire, CA (US); Tyler Mann, Baytown, TX (US)

(*) Notice: Subject to any disclaimer, the term of this patent is extended or adjusted under 35 U.S.C. 154(b) by 0 days.

(21) Appl. No.: 16/969,542

(22) PCT Filed: Feb. 13, 2019

(86) PCT No.: PCT/US2019/017889
§ 371 (c)(1),
(2) Date: Aug. 12, 2020

(87) PCT Pub. No.: WO2019/160984
PCT Pub. Date: Aug. 22, 2019

(65) Prior Publication Data
US 2021/0002603 A1 Jan. 7, 2021

Related U.S. Application Data

(63) Continuation of application No. 16/275,174, filed on Feb. 13, 2019, now abandoned.
(Continued)

(51) Int. Cl.
*C12M 3/00* (2006.01)
*C12M 1/00* (2006.01)
(Continued)

(52) U.S. Cl.
CPC ............ *C12M 45/02* (2013.01); *C12M 21/12* (2013.01); *C12M 27/00* (2013.01); *C12M 29/00* (2013.01);
(Continued)

(58) Field of Classification Search
CPC .............................. C12M 45/02; C12M 47/10
See application file for complete search history.

(56) References Cited

U.S. PATENT DOCUMENTS

| 4,869,819 A * | 9/1989 | Thiele ..................... C12M 21/12 |
| | | 210/195.1 |
| 5,874,263 A * | 2/1999 | Holtzapple ............ C12M 41/32 |
| | | 435/141 |

(Continued)

*Primary Examiner* — Nathan A Bowers

(57) ABSTRACT

A biomass processing system is disclosed whereby a counter flow path is provided for recovering yielded product from at least two fermentation stages. In certain configurations, the counter flow path is associated with respective extraction stages that correspond to each respective fermentation stages. To enhance product recovery, certain configurations also disclose mechanical grinding of biomass between fermentation stage to enhance a surface area for further subsequent processing of the biomass. To yet further enhance the system, certain configurations discloses a cell recovery sub-system that agitates processed biomass to separate cells from undigested residues. The recovered cells may be recycled to fermentation stages in the system.

14 Claims, 77 Drawing Sheets

Related U.S. Application Data

(60) Provisional application No. 62/629,941, filed on Feb. 13, 2018.

(51) Int. Cl.
 *C12M 1/02* (2006.01)
 *C12M 1/26* (2006.01)
 *C12M 1/33* (2006.01)

(52) U.S. Cl.
 CPC ............ *C12M 33/10* (2013.01); *C12M 33/22* (2013.01); *C12M 47/10* (2013.01)

(56) References Cited

U.S. PATENT DOCUMENTS

| | | | | |
|---|---|---|---|---|
| 2015/0337343 A1* | 11/2015 | Benkwitz | .................. | C12P 7/18 |
| | | | | 435/158 |
| 2019/0144890 A1* | 5/2019 | Subbian | .................... | C12P 1/04 |
| | | | | 435/296.1 |

* cited by examiner

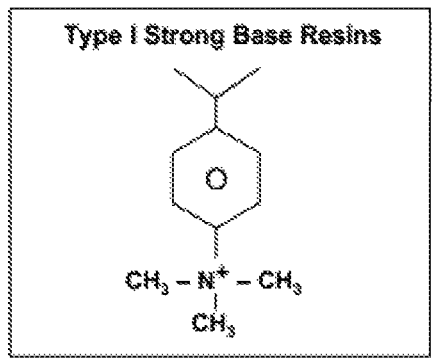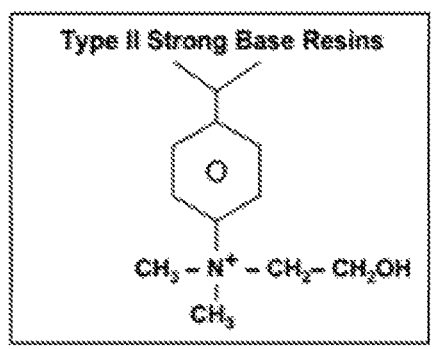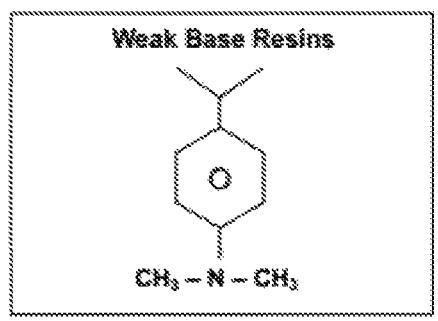
FIG. 4

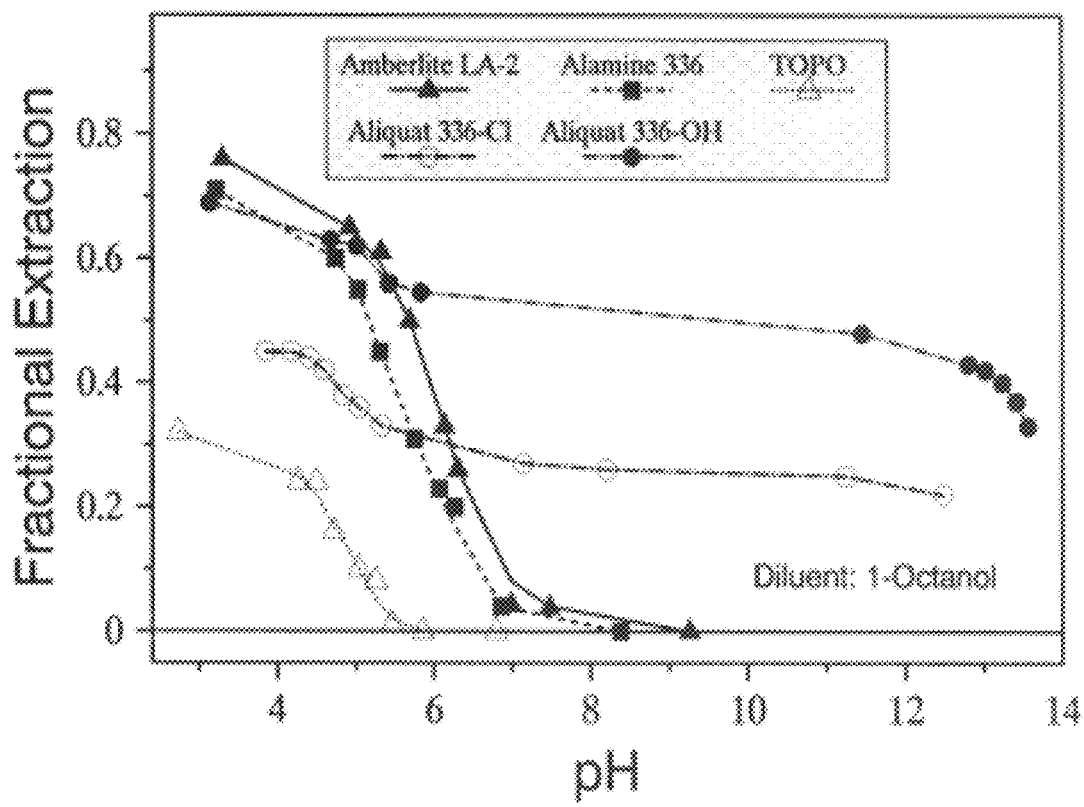

Extraction of acetic acid at 25 °C by various extractants in 1-octanol diluent. Initial concentrations: 0.450 mol/L aqueous acetic acid; 0.300 mol/L extractants in 1-octanol

Liquid Extractant

Amberlite LA-2 = 2° amine

Alamine 336 = 3° amine

Aliquant 336 = 4° amine

*Source:* H. Reisinger, C.J. King, Extraction and Sorption of Acetic Acid at pH above $pK_a$ to Form Calcium Magnesium Acetate, *Ind. Eng. Chem. Res.*, 34, 845–852 (1995).

FIG. 12E

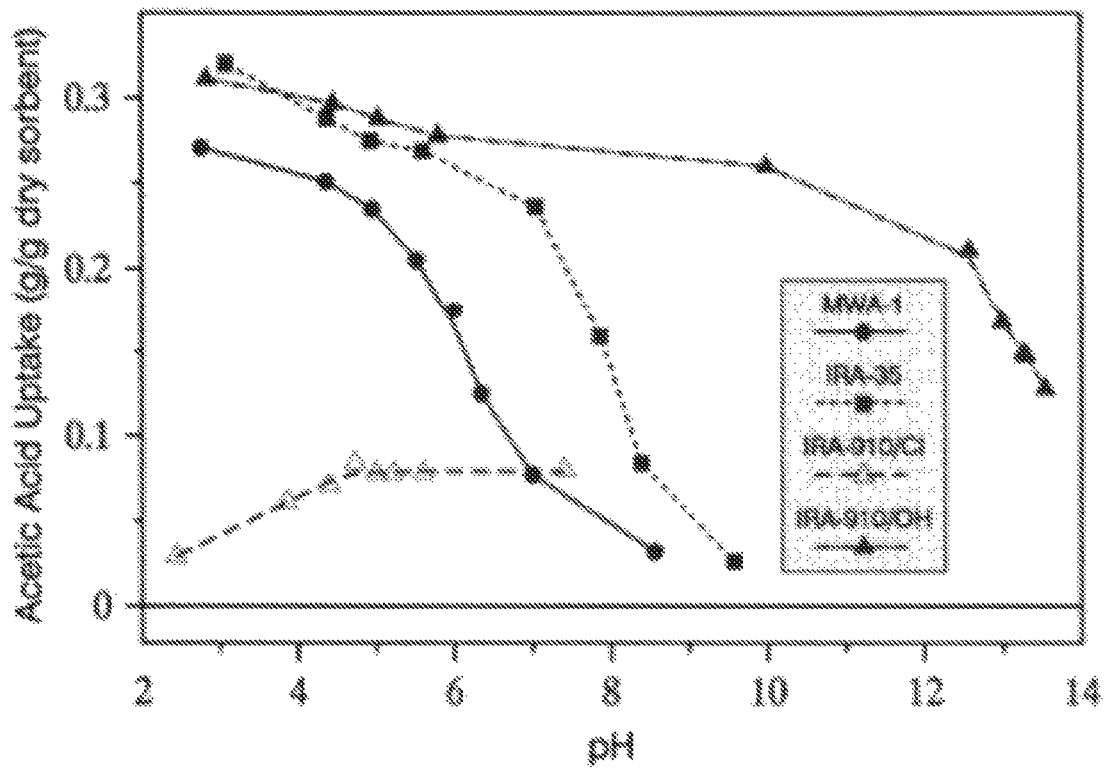

Uptake of acetic acid by various solid sorbents in batch equilibration experiments at 25 °C, as a function of pH. Initial acetic acid concentration = 0.450 mol/L.

Ion-Exchange Resin

Dowex MWA-1 = 3° amine

Amberlite IRA-35 = 3° amine

Amberlite IRA-910 = 4° amine

*Source:* H. Reisinger, C.J. King, Extraction and Sorption of Acetic Acid at pH above $pK_a$ to Form Calcium Magnesium Acetate, *Ind. Eng. Chem. Res.*, 34, 845–852 (1995).

*FIG. 12F*

Extraction of acetic acid by Amberlite LA-2 and Alamine 336 at 25 and 60 °C. Other conditions are the same as for FIGURE 12E.

Liquid Extractant

Amberlite LA-2 = 2° amine

Alamine 336 = 3° amine

*Source:* H. Reisinger, C.J. King, Extraction and Sorption of Acetic Acid at pH above $pK_a$ to Form Calcium Magnesium Acetate, *Ind. Eng. Chem. Res.*, 34, 845–852 (1995).

Uptake of acetic acid by Dowex MWA-1 and Amberlite IRA-35 at 25 and 60 °C. Other conditions are the same as for FIGURE 12F.

Ion-Exchange Resin

Dowex MWA-1 = 3° amine

Amberlite IRA-35 = 3° amine

*Source:* H. Reisinger, C.J. King, Extraction and Sorption of Acetic Acid at pH above $pK_a$ to Form Calcium Magnesium Acetate, *Ind. Eng. Chem. Res.*, 34, 845–852 (1995).

Measured equilibrium relationship between organic and aqueous phase acetic acid concentrations for extraction with 0.3 mol/L Amberlite LA-2 in 1-octanol at 25 and 60 °C.

Liquid Extractant

Amberlite LA-2 = 2° amine

*Source:* H. Reisinger, C.J. King, Extraction and Sorption of Acetic Acid at pH above $pK_a$ to Form Calcium Magnesium Acetate, *Ind. Eng. Chem. Res.*, 34, 845–852 (1995).

Measured equilibrium relationship between sorbent and aqueous phase acetic acid concentrations for uptake by Amberlite IRA-35 at 25 and 60 °C.

Ion-Exchange Resin

Amberlite IRA-35 — 3° amine

*Source:* H. Reisinger, C.J. King, Extraction and Sorption of Acetic Acid at pH above p$K_a$ to Form Calcium Magnesium Acetate. *Ind. Eng. Chem. Res.*, 34, 845–852 (1995).

Extraction of acetic acid at 25 °C by varying concentrations of Amberlite LA-2 in 1-octanol: fractional extraction and stoichiometric loading.

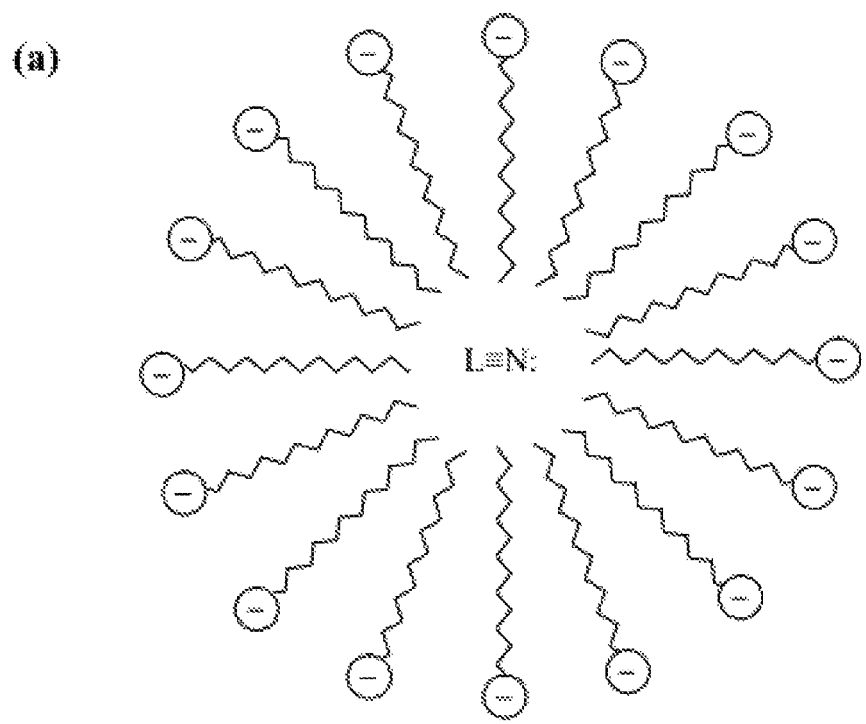
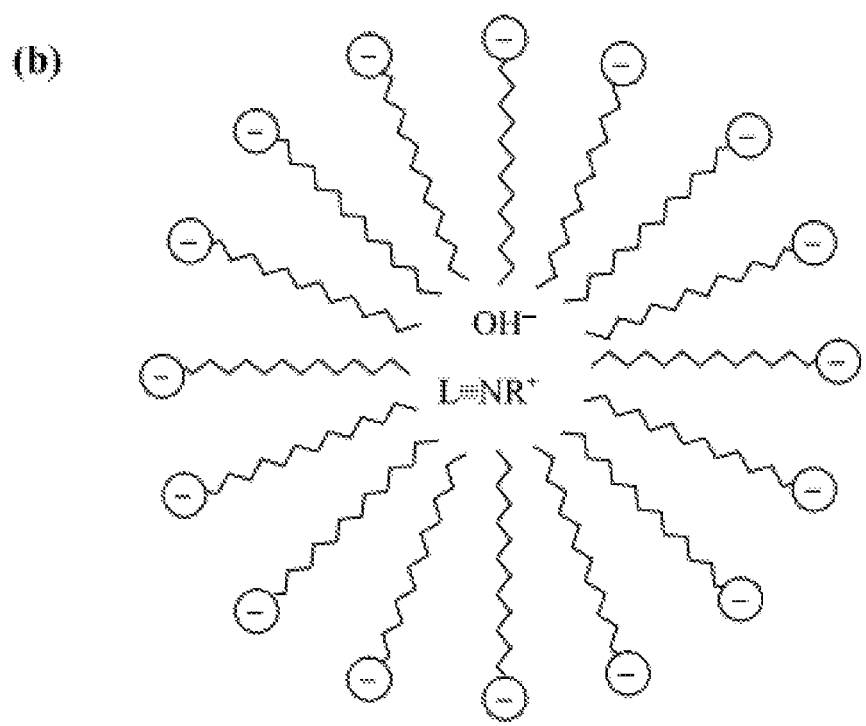
FIG. 22

Effect of temperature on acid production in mixed-culture fermentation. Concentration profiles are shown for (a) 25 °C, (b) 40 °C (c) 55 °C. (Ethanol (), acetic acid (■), propionic acid (▲), butyric acid (×), valeric acid (), caproic acid (●)). Error bars indicate one standard deviation.

Effect of temperature on acid production in mixed-culture fermentation. Concentration profiles are shown for (a) 25 °C, (b) 40 °C (c) 55 °C. (Ethanol (), acetic acid (■), propionic acid (▲), butyric acid (×), valeric acid (), caproic acid (●)). Error bars indicate one standard deviation.

Bar graph of average losses due to grinding

Line chart of the concentration of total acids in each fermentor.

PROCESSES FOR CONVERTING BIOMASS INTO HIGH-VALUE PRODUCTS

CROSS-REFERENCE TO RELATED APPLICATIONS

This application is related to U.S. Provisional Application Nos. 62/629,941 (filed on Feb. 13, 2018), which is incorporated by reference herein for all purposes. The present application hereby claims priority under 35 U.S.C. § 119(e) to United States Provisional Application Nos. 62/62,994.

TECHNICAL FIELD

This disclosure is generally directed to biomass processing technologies. More specifically, this disclosure is directed to process for converting biomass into high-value products.

BACKGROUND

A great deal of biomass remains unused or inefficiently used in a variety of settings such as agricultural and industrial processes. Disposal of this biomass is often difficult or costly.

BRIEF DESCRIPTION OF THE DRAWINGS

For a more complete understanding of this disclosure and its features, reference is now made to the following description, taken in conjunction with the accompanying drawings, in which:

FIG. 4 shows examples of strong-base and weak-base ion exchange resins;

FIG. 12E shows extraction of acetic acid at 25 C by various extractants in 1-octanol diluent;

FIG. 12F shows uptake of acetic acid by various solid sorbents in batch equilibration experiments at 25 C, as a function of pH;

FIG. 12I shows a measured equilibrium relation between organic and aqueous phase acetic acid concentrations;

FIG. 22 shows weak-base and strong-base liquid extractants incorporated into detergent micelles;

SUMMARY OF THE DISCLOSURE

Figure 1:
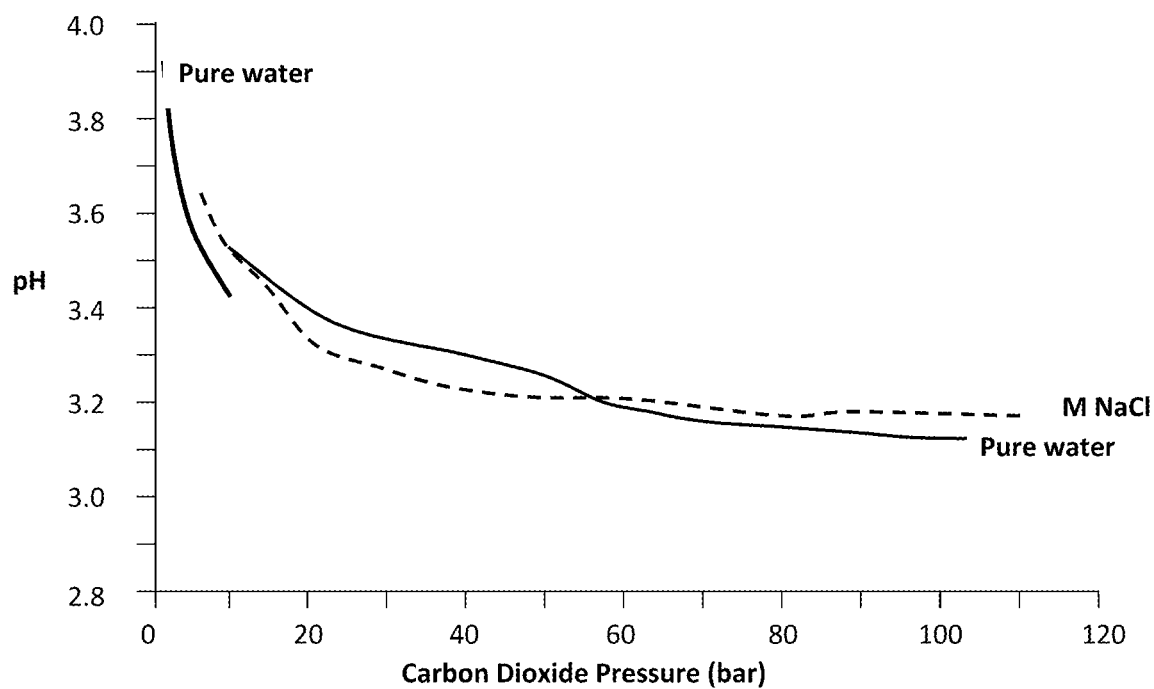
FIG. 1 shows the measured pH of water and salt solutions in equilibrium with high-pressure carbon dioxide using pH probe.

A biomass processing system is disclosed whereby a counter flow path is provided for recovering yielded product from at least two fermentation stages. In certain configurations, the counter flow path is associated with respective extraction stages that correspond to each respective fermentation stages. To enhance product recovery, certain configurations also disclose mechanical grinding of biomass between fermentation stage to enhance a surface area for further subsequent processing of the biomass. To yet further enhance the system, certain configurations discloses a cell recovery sub-system that agitates processed biomass to separate cells from undigested residues. The recovered cells may be recycled to fermentation stages in the system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

It will be understood that well-known processes and components have not been described in detail and have been omitted for brevity. Although specific steps, structures, and materials may have been described, the present disclosure may not be limited to these specifics, and others may be substituted as it is well understood by those skilled in the art, and various steps may not necessarily be performed in the sequences shown.

Table 1 below shows the typical composition of fatty acids produced in mixed-acid fermentations of biomass. The smaller fatty acids (C2 to C4) may be designated as short-chain fatty acids (SCFAs) and the larger fatty acids (C5 to C8) may be designated as medium-chain fatty acids (MCFAs). The designation is somewhat arbitrary, so sometimes C4 is included as an MCFA rather than an SCFA or C5 is considered as SCFA rather than MCFA. It is interesting to note that at elevated temperatures (e.g., 55° C.), essentially no MCFAs are produced.

As the acids are produced, it is necessary to neutralize them so the pH does not become excessively low, which would inhibit the growth of the microorganisms.

TABLE 1

Typical product spectrum in fermentation broth

| Group designation | No. carbons | Carboxylic acid Systematic name | Common name | 40° C. (wt %) | 55° C. (wt %) |
|---|---|---|---|---|---|
| Short-chain fatty acid (SCFA) | 2 | Ethanoic | Acetic | 41 | 80 |
|  | 3 | Propanoic | Propionic | 15 | 4 |
|  | 4 | Butanoic | Butyric | 21 | 15 |
| Medium-chain fatty acid (MCFA) | 5 | Pentanoic | Valeric | 8 | <1 |
|  | 6 | Hexanoic | Caproic | 12 | <1 |
|  | 7 | Heptanoic | Enanthic | 3 | <1 |
|  | 8 | Octanoic | Caprylic | <1 | <1 |
| Total |  |  |  | 100 | 100 |

For an appreciation of this disclosure, certain fundamental concepts are provided. Although such fundamental concepts are provided, such fundamental concepts are not intended to limit the scope of the disclosure.

Acidity

Acidity quantifies the tendency of a molecule to release hydrogen ions. Below is an equilibrium reaction in which the acid (HA) dissociates to form hydrogen ion ($H^+$) and the resulting anion ($A^-$)

$$HA \leftrightarrow H^+ + A^-$$

The equilibrium constant $K_a$ is defined as the molar concentration of products divided by reactants $$K_a \equiv \frac{[H^+][A^-]}{[HA]}$$

The equilibrium constant can span many orders of magnitude. $K_a$ can be quantified on a logarithmic scale using the following definition:

$$pK_a = -\log_{10} K_a$$

Basicity

Basicity quantifies the tendency of a molecule to produce hydroxyl ions. Below is an equilibrium reaction in which the base (B) reacts with water to form a hydroxyl ion ($OH^-$) and the resulting cation ($BH^+$)

$$B + H_2O \leftrightarrow BH^+ + OH^-$$

The equilibrium constant $K_B$ is defined as the molar concentration of products divided by reactants.

$$K_B \equiv \frac{[BH^+][OH^-]}{[H_2O][B]}$$

In dilute aqueous solutions, the concentration of water is essentially constant, so a new equilibrium constant $K_b$ can be defined $$K_b \equiv K_B[H_2O] = \frac{[BH^+][OH^-]}{[B]}$$

The equilibrium constant can span many orders of magnitude. $K_b$ can be quantified on a logarithmic scale using the following definition:

$$pK_b = -\log_{10} K_b$$

Water Dissociation

Water spontaneously dissociates into hydrogen ions and hydroxyl ions $$H_2O \leftrightarrow H^+ + OH^-$$

The equilibrium constant $K_W$ is defined as the molar concentration of products divided by reactants.

$$K_W \equiv \frac{[H^+][OH^-]}{[H_2O]}$$

In dilute aqueous solutions, the concentration of water is essentially constant, so a new equilibrium constant $K_w$ can be defined $$K_w = K_W[H_2O] = [H^+][OH^-] = 10^{-14}$$

At room temperature, the value of $K_w$ is $10^{-14}$ M², which can be expressed on a logarithmic scale as follows:

$$pK_w = -\log_{10} K_w = 14$$

Relationship Between $pK_a$ and $pK_b$

Through appropriate manipulations of the above equilibrium constants, the following relationship can be derived:

$$pK_b = 14 - pK_a$$

$pK_a$ and $pK_b$ of Relevant Compounds

Table 2 shows $pK_a$ and $pK_b$ for compounds that are relevant to this disclosure. While select compounds are provided, the teachings of the disclosure are not necessarily limited to such select compounds. This table shows some key points:

- Formic acid is a stronger acid than the other common volatile fatty acids (e.g., acetic, propionic, butyric)
- Tertiary amines are weaker bases than primary and secondary amines
- Carbonic acid is a weak acid
- Bicarbonate is a weak base

TABLE 2 pK$_a$ and pK$_b$ for select relevant compounds

| Acid | Equilibrium Reaction | pK$_a$ | pK$_b$ | |
|---|---|---|---|---|
| Formic acid | HA ↔ H$^+$ + A$^-$ | 3.77 | 10.23 | Strong acid |
| Acetic acid | HA ↔ H$^+$ + A$^-$ | 4.756 | 9.244 | ↕ |
| Butyric acid | HA ↔ H$^+$ + A$^-$ | 4.82 | 9.18 | |
| Pentanoic acid | HA ↔ H$^+$ + A$^-$ | 4.842 | 9.158 | Strong base |
| Propionic acid | HA ↔ H$^+$ + A$^-$ | 4.88 | 9.12 | |
| Hexanoic acid | HA ↔ H$^+$ + A$^-$ | 4.88 | 9.12 | |
| Heptanoic acid | HA ↔ H$^+$ + A$^-$ | 4.893 | 9.107 | |
| Octanoic acid | HA ↔ H$^+$ + A$^-$ | 4.895 | 9.105 | |
| Carbonic acid | H$_2$CO$_3$ ↔ H$^+$ + HCO$_3^-$ | 6.37 | 7.63 | |

TABLE 2-continued pK$_a$ and pK$_b$ for select relevant compounds

| Acid | Equilibrium Reaction | pK$_a$ | pK$_b$ |
|---|---|---|---|
| Ammonia | NH$_3$ + H$_2$O ↔ NH$_4^+$ + OH$^-$ | 9.26 | 4.74 |
| Tertiary amine | (CH$_3$)$_3$N + H$_2$O ↔ (CH$_3$)$_3$NH$^+$ + OH$^-$ | 9.77 | 4.13 |
| Bicarbonate | HCO$_3^-$ ↔ H$^+$ + CO$_3^-$ | 10.3 | 3.7 |
| Primary amine | CH$_3$NH$_2$ + H$_2$O ↔ CH$_3$NH$_3^+$ + OH$^-$ | 10.64 | 3.36 |
| Secondary amine | (CH$_3$)$_2$NH + H$_2$O ↔ (CH$_3$)$_2$NH$_2^+$ + OH$^-$ | 10.73 | 3.27 |

Henderson-Hasselbalch Equation

As a function of pH, the Henderson-Hasselbalch equation quantifies the ratio of undissociated acid to dissociated acid.

$$pH = pK_a + \log_{10}\frac{[A^-]}{[HA]}$$

$$\frac{[A^-]}{[HA]} = 10^{pH-pK_a}$$

$$\frac{[HA]}{[A^-]} = 10^{pK_a-pH}$$

For volatile fatty acids commonly produced in mixed-acid fermentations (e.g., acetic, propionic, and butyric), Table 3 shows the ratio of undissociated acid to dissociated acid at pH's relevant to mixed-acid fermentations (3.0 to 7.0). At pH 6.0 (which is achieved with calcium carbonate buffer), the undissociated form is 5 to 7% of the dissociated acid. At pH 7.0 (which is achieved with ammonium, magnesium, sodium, or potassium bicarbonate buffer), the undissociated form is 0.5 to 0.7% of the dissociated acid.

TABLE 3

Ratio of undissociated to dissociated acid.

| | | | Acid Recovery pH | | Fermentation pH | | |
|---|---|---|---|---|---|---|---|
| Acid | Equilibrium Reaction | pK$_a$ | $\frac{[HA]}{[A^-]}$ @pH 3.0 | $\frac{[HA]}{[A^-]}$ @pH 4.0 | $\frac{[HA]}{[A^-]}$ @pH 5.0 | $\frac{[HA]}{[A^-]}$ @pH 6.0 | $\frac{[HA]}{[A^-]}$ @pH 7.0 |
| Formic acid | HA ↔ H$^+$ + A$^-$ | 3.77 | 5.889 | 0.589 | 0.0589 | 0.00589 | 0.000589 |
| Acetic acid | HA ↔ H$^+$ + A$^-$ | 4.756 | 57.0 | 5.70 | 0.570 | 0.0570 | 0.00570 |
| Butyric acid | HA ↔ H$^+$ + A$^-$ | 4.82 | 66.1 | 6.61 | 0.661 | 0.0661 | 0.00661 |
| Pentanoic acid | HA ↔ H$^+$ + A$^-$ | 4.842 | 69.5 | 6.95 | 0.695 | 0.0695 | 0.00695 |
| Propionic acid | HA ↔ H$^+$ + A$^-$ | 4.88 | 75.9 | 7.59 | 0.759 | 0.0759 | 0.00759 |
| Hexanoic acid | HA ↔ H$^+$ + A$^-$ | 4.88 | 75.9 | 7.59 | 0.759 | 0.0759 | 0.00759 |
| Heptanoic acid | HA ↔ H$^+$ + A$^-$ | 4.893 | 78.2 | 7.82 | 0.782 | 0.0782 | 0.00782 |
| Octanoic acid | HA ↔ H$^+$ + A$^-$ | 4.895 | 78.5 | 7.85 | 0.785 | 0.0785 | 0.00785 |

Effect of Carbon Dioxide Partial Pressure

Table 4 shows that as the partial pressure of carbon dioxide increases, water becomes more acidic because of the increasing concentrations of carbonic acid

TABLE 4

Effect of carbon dioxide partial pressure on pH and concentration of dissolved species.

| pCO$_2$ (atm) | pH | [CO$_2$] (mol/L) | [H$_2$CO$_3$] (mol/L) | [HCO$_3^-$] (mol/L) | [CO$_3^{2-}$] (mol/L) |
|---|---|---|---|---|---|
| 1.0 × 10$^{-8}$ | 7.00 | 3.36 × 10$^{-10}$ | 5.71 × 10$^{-13}$ | 1.42 × 10$^{-09}$ | 7.90 × 10$^{-13}$ |
| 1.0 × 10$^{-7}$ | 6.94 | 3.36 × 10$^{-09}$ | 5.71 × 10$^{-12}$ | 5.90 × 10$^{-09}$ | 1.90 × 10$^{-12}$ |
| 1.0 × 10$^{-6}$ | 6.81 | 3.36 × 10$^{-08}$ | 5.71 × 10$^{-11}$ | 9.16 × 10$^{-08}$ | 3.30 × 10$^{-11}$ |
| 1.0 × 10$^{-6}$ | 6.42 | 3.36 × 10$^{-07}$ | 5.71 × 10$^{-09}$ | 3.78 × 10$^{-07}$ | 4.53 × 10$^{-11}$ |
| 1.0 × 10$^{-4}$ | 5.92 | 3.36 × 10$^{-06}$ | 5.71 × 10$^{-09}$ | 1.19 × 10$^{-06}$ | 5.57 × 10$^{-11}$ |
| 3.5 × 10$^{-4}$ | 5.65 | 1.18 × 10$^{-05}$ | 2.00 × 10$^{-08}$ | 2.23 × 10$^{-06}$ | 5.60 × 10$^{-11}$ |

TABLE 4-continued

Effect of carbon dioxide partial pressure
on pH and concentration of dissolved species.

| $pCO_2$ (atm) | pH | $[CO_2]$ (mol/L) | $[H_2CO_3]$ (mol/L) | $[HCO_3^-]$ (mol/L) | $[CO_3^{2-}]$ (mol/L) |
|---|---|---|---|---|---|
| $1.0 \times 10^{-3}$ | 5.42 | $3.36 \times 10^{-05}$ | $5.71 \times 10^{-08}$ | $3.78 \times 10^{-06}$ | $5.61 \times 10^{-11}$ |
| $1.0 \times 10^{-2}$ | 4.92 | $3.36 \times 10^{-04}$ | $5.71 \times 10^{-07}$ | $1.19 \times 10^{-05}$ | $5.61 \times 10^{-11}$ |
| $1.0 \times 10^{-1}$ | 4.42 | $3.36 \times 10^{-03}$ | $5.71 \times 10^{-06}$ | $3.78 \times 10^{-05}$ | $5.61 \times 10^{-11}$ |
| $1.0 \times 10^{+0}$ | 3.92 | $3.36 \times 10^{-02}$ | $5.71 \times 10^{-05}$ | $1.20 \times 10^{-04}$ | $5.61 \times 10^{-11}$ |
| $2.5 \times 10^{+0}$ | 3.72 | $8.40 \times 10^{-02}$ | $1.43 \times 10^{-04}$ | $1.89 \times 10^{-04}$ | $5.61 \times 10^{-11}$ |
| $1.0 \times 10^{+1}$ | 3.42 | $3.36 \times 10^{-01}$ | $5.71 \times 10^{-04}$ | $3.78 \times 10^{-04}$ | $5.61 \times 10^{-11}$ |

Figure 2:
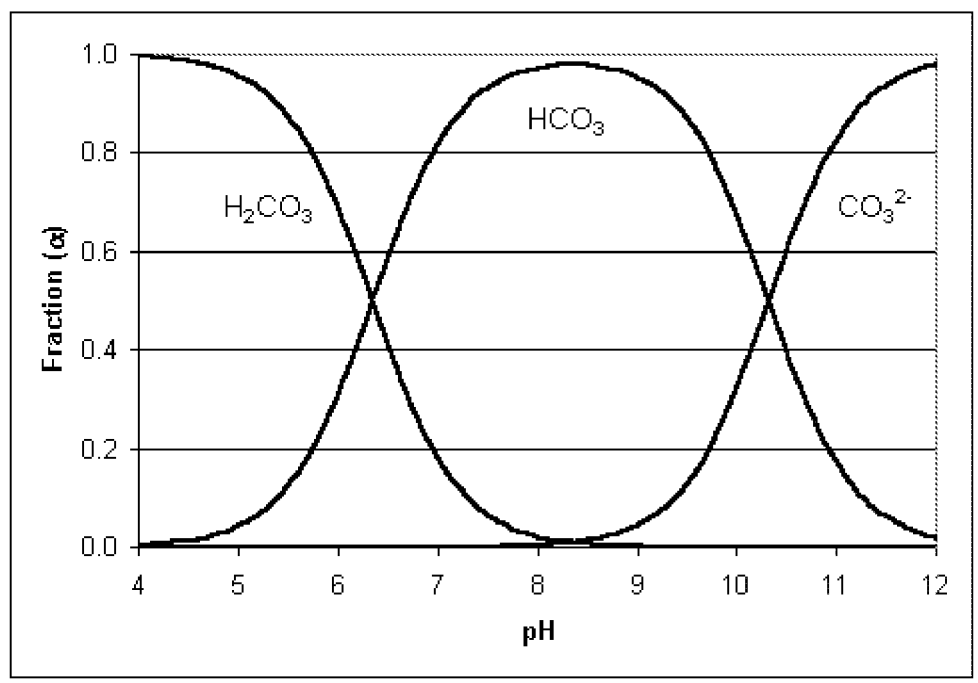
FIG. 2 shows the effect of pH on $CO_2$ species.

FIG. 1 shows the effect of high-pressure carbon dioxide on pH. The presence of salt (NaCl) has little effect on pH. Modest pressures of 10 bar can reduce the pH to about 3.5 where the undissociated acid is the predominant species (Table 3). FIG. 2 shows the fraction of each carbon dioxide species ($H_2CO_3$, $HCO_3^-$, $CO_3^=$) as a function of pH.

Interaction of Carboxylic Acids with Liquid Extractants

The classification of liquid extractants is described in Table 5 below, which lists the extractants in order of chemical reactivity. A good review article follows:

Yeon Ki Hong, Won Hi Hong, and Dong Hoon Han, Application of Reactive Extraction to Recovery of Carboxylic Acids, *Biotechnol. Bioprocess Eng.* 2001, 6: 386-394.

In their undissociated form, fatty acids are uncharged. The longer chain fatty acids have less polarity because the polar carboxylic acid group is a smaller portion of the acid; therefore, longer-chain undissociated acids dissolve in water-insoluble organic extractants.

Physical extractants interact with undissociated acids through weak intermolecular forces. Non-active physical extractants have no exposed chemical functional groups whereas active physical extractants have exposed chemical functional groups and include the following chemical species: chlorinated hydrocarbons, halogenated aromatics, ketones, alcohols, and carboxylic acids.

Figure 3:
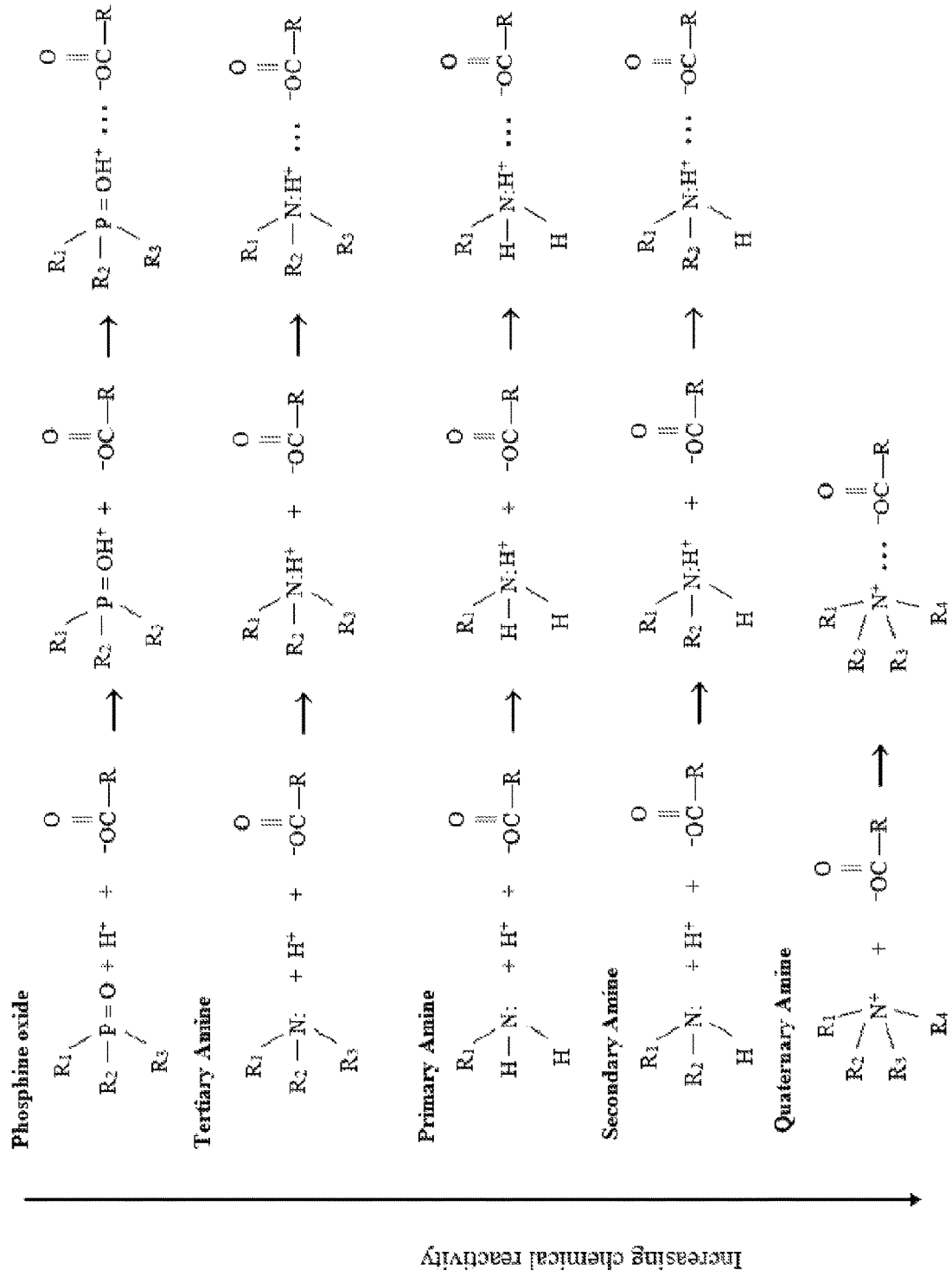
FIG. 3 shows chemically reactive extractants.

Chemical extractants interact with dissociated acids through ionic forces. Chemical extractants include amines (primary, secondary, tertiary, and quaternary) and trialkylphosphine oxides. FIG. 3 shows the nature of the chemical extractants. Quaternary amines have a permanent positive charge whereas the other amines (primary, secondary, and tertiary) and trialkylphosphine oxides have reversible positive charge. At acidic pH, the reversible extractants take a positive charge and at alkaline pH, the reversible extractants are neutral. Only the positively charged species can bind the anion. The quaternary amine binds anions in a one-step direct process. In contrast, the reversible extractants require a two-step process where they first must become protonated and then they can bind anions. If the pH is low, reversible extractants can directly bind the undissociated acids in a one-step process.

In the case of amines (primary, secondary, tertiary), the chemical interaction is through the unpaired electrons in nitrogen, which bond to free protons in solution. In the case of trialkylphosphine oxides, the chemical interaction is through its oxygen, which is a strong Lewis base.

Quaternary amines function best when dissolved in non-active physical extractants. In contrast, the reversible chemical extractants (trialkylphosphine oxides; and primary, secondary, and tertiary amines) work best when dissolved in active physical extractants, which help solubilize the resulting polarized species.

Quaternary amines are considered "strong-base" chemical extractants, which are represented herein by the following symbol: L≡NR+

All other chemical extractants in Table 5 are "weak-base" chemical extractants, which are represented herein by the symbol: L≡N:

TABLE 5

Classification of liquid extractants

| | Extractant type | Examples | Chemical reactivity |
|---|---|---|---|
| Physical | Non-active | Diesel, kerosene, vegetable oil | Low |
| | Active | Octanol, octanoic acid, high-molecular-weight carboxylic acids | ↕ |
| Chemical | Trialkylphosphine oxide | Trioctylphosphine oxide (TOPO), Cyanex 923 | High |
| | Tertiary amine | Alamine 336 | |
| | Primary amine | N1923 | |
| | Secondary amine | Amberlite LA2 | |
| | Quaternary amine | Aliquat 336 | |

A summary of the key features of the chemical extractants follows:

Trialkylphosphine oxides—lower extraction coefficient than amines, low microbial toxicity Primary amines too water soluble to be useful Secondary amines—stronger binding than tertiary amines, forms amides when heated Tertiary amines—weakest binding amine, thermally stable, least soluble in water Quaternary amines—strongest binding, true ion exchange liquid Ion Exchange Resins Ion exchange resins are similar to the chemical liquid extractants described above, except that the R-groups are so long that they become a solid (FIG. 4).

Strong-base ion exchange resins employ quaternary amines (e.g., Dow Amberlite 400). Type 1 strong-base ion exchange resins have three methyl groups. They bind anions very strongly, but are more difficult to regenerate to the hydroxide form. Type 2 strong-base ion exchange resins replace one of the methyl groups with ethanol. Although the binding affinity is not as strong, it is more easily regenerated to the hydroxide form. Type 1 resins are more stable and can tolerate higher temperatures than Type 2 resins.

Weak-base ion exchange resins can use primary, secondary (e.g., Dow Amberlite IRA96RF), or tertiary amines (e.g., Dow Amberlite IRA67).

Key properties of tertiary amine weak-base ion exchange resins are shown in Tables 6 to 10.

TABLE 6

Properties of ResinTech WBACR

| | |
|---|---|
| Resin = | acrylic styrene |
| Functional group = | tertiary amine |
| Capacity | >1.7 eq/L resin bed |
| Moisture = | 60 to 65% = 0.60 to 0.65 kg water/kg hydrated resin |

TABLE 6-continued

Properties of ResinTech WBACR

| | |
|---|---|
| Shipping density bed = | 43 lb hydrated resin/ft³ = 0.69 kg hydrated resin/L resin |
| Maximum temperature = | 212° F. |
| Cost = | $170/ft³ = $6000/m³ |

Source: htttp://www.resintech.com/products/frm_Productinfo.aspx?qProductId=135
http://architect.wwwcomm.com/Uploads/acmix/Documents/Weak%20Base%20Anion/WBACR.pdf

TABLE 7

Properties of ResinTech WBG30-B

| | |
|---|---|
| Resin = | epoxy polyamine |
| Functional group = | tertiary amine |
| Capacity | >2.2 eq/L resin bed |
| Moisture = | 52 to 62% = 0.52 to 0.62 kg water/kg hydrated resin |
| Shipping density bed = | 43 lb hydrated resin/ft³ = 0.69 kg hydrated resin/L resin |
| Maximum temperature = | 110° F. |
| Cost = | $170/ft³ = $6000/m³ |

Source: http://resintech.com/products/frm_ProductInfo.aspx?qProductId=133

TABLE 8

Properties of ResinTech WBMP

| | |
|---|---|
| Resin = | styrene divinylbenzene copolymer |
| Functional group = | tertiary amine |
| Capacity = | 1.3 eq/L resin bed |
| Moisture = | 53 to 60% = 0.53 to 0.60 kg water/kg hydrated resin |
| Shipping density bed = | 40 lb hydrated resin/ft³ = 0.64 kg hydrated resin/L resin |
| Maximum temperature = | 212° F. |
| Cost = | $145/ft³ = $5120/m³ |

Source:http://architect.wwwcomm.com/Uploads/acmix/Documents/Weak%20Base%20Anion/WBMP.pdf

TABLE 9

Properties of Dow Amberlite IRA96RF

| | |
|---|---|
| Resin = | styrene divinylbenzene copolymer |
| Functional group = | tertiary amine |
| Capacity = | 1.25 eq/L resin bed |
| Moisture = | 53 to 63% = 0.57 to 0.63 kg water/kg hydrated resin |
| Shipping density bed = | 42 lb hydrated resin/ft³ = 0.67 kg hydrated resin/L resin |
| Diameter = | 0.63 to 0.83 mm |
| Maximum temperature = | 212° F. |

Source: http://hopegood.com.tw/productlist/IRA96RF.pdf

TABLE 10

Properties of Dow Amberlyst A21

| | |
|---|---|
| Resin = | styrene divinylbenzene copolymer |
| Functional group = | tertiary amine |
| Capacity | >1.25 eq/L resin bed |
| Moisture = | 54 to 60% = 0.54 to 0.60 kg water/kg hydrated resin |
| Shipping density resin bed = | 41.2 lb hydrated resin/ft³ = 0.66 kg hydrated resin/L |
| Diameter = | 0.49 to 0.69 mm |
| Maximum temperature = | 212° F. |

Source: http://www.rohmhaas-polska.com/produkty/pds/amberlyst/A21_ban.pdf

Example Calculation: ResinTech WBACR

Ion exchange resins bond acids to the tertiary amine functional groups. In addition, the porous channels within the ion exchange resin hold water. The ratio of water to acid is calculated for ResinTech WBACR Acid Loading =

$$\frac{1.7 \; eq}{L \; \text{resin bed}} \times \frac{\text{mol}}{eq} \times \frac{60 \; g}{\text{mol}} \times \frac{\text{kg}}{1000 \; g} = 0.102 \frac{\text{kg acetic acid}}{L \; \text{resin bed}}$$

Water Loading =

$$\frac{0.62 \; \text{kg water}}{\text{kg hydrated resin}} \times \frac{0.69 \; \text{kg hydrated resin}}{L \; \text{resin bed}} = 0.428 \frac{\text{kg water}}{L \; \text{resin bed}}$$

$$\text{Ratio} = \frac{0.428 \frac{\text{kg water}}{L \; \text{resin bed}}}{0.102 \frac{\text{kg acid}}{L \; \text{resin bed}}} = 4.19 \frac{\text{kg water}}{\text{kg acetic acid}}$$

Using the following assumptions:
Fermentation feeding rate=250 tonne biomass/day
Acid yield=0.52 kg acid/kg biomass
Cycle time=1 h
Selectivity to carboxylic acids=100% (for illustrative purposes)
Loading=100% (for illustrative purposes)
the quantity and cost of ResinTech WBACR is calculated below:

$$\text{Resin} = \frac{250 \; tonne \, biomass}{d} \times \frac{0.52 \; tonne \, acid}{tonne \, biomass} \times \frac{m^3 \; \text{resin bed}}{0.102 \; tonne \, acid} \times \frac{d}{24 \; h} \times \frac{1 \; h}{\text{cycle}} = 53.1 \; m^3 \; \text{resin bed}$$

Cost = 53.1 m³ resin bed × $6000/m³ = $318,600

Table 11 shows the same information for other resins.

TABLE 11

Comparison of ion exchange resins

| | Acid Loading $\left(\frac{\text{kg acetic acid}}{L \; \text{resin bed}}\right)$ | Water Loading $\left(\frac{\text{kg water}}{L \; \text{resin bed}}\right)$ | Ratio $\left(\frac{\text{kg water}}{\text{kg acetic acid}}\right)$ | Resin* (m³) | Cost* ($) |
|---|---|---|---|---|---|
| ResinTech WBACR | 0.102 | 0.428 | 4.19 | 53.1 | 318,600 |
| ResinTech WBG30-B | 0.132 | 0.393 | 3.00 | 41.0 | 246,212 |
| ResinTech WBMP | 0.078 | 0.365 | 4.68 | 69.4 | 355,555 |

TABLE 11-continued

Comparison of ion exchange resins

| | Acid Loading $\left(\frac{\text{kg } aceticacid}{L \text{ resinbed}}\right)$ | Water Loading $\left(\frac{\text{kg water}}{L \text{ resin bed}}\right)$ | Ratio $\left(\frac{\text{kg water}}{\text{kg acetic acid}}\right)$ | Resin* $(m^3)$ | Cost* ($) |
|---|---|---|---|---|---|
| Amberlite IRA96RF | 0.075 | 0.402 | 5.36 | 72.2 | — |
| Amberlyst A21 | 0.075 | 0.376 | 5.02 | 72.2 | — |

*Assumptions: Fermentation feeding rate = 250 tonne biomass/day
Acid yield = 0.52 kg acid/kg biomass
Cycle time = 1 h Biochemistry and Microbiology A mixed consortium of microorganisms (e.g., Clostridia, Bacilli) transforms biomass into carboxylates, namely, short-chain fatty acids (SCFAs, e.g., acetic, propanoic, butanoic acids) and medium-chain fatty acids (MCFAs, e.g., pentanoic, hexanoic, heptanoic, and octanoic acids). The mixed-culture fermentation is an example of "consolidated bioprocessing" in which the fermenting organisms produce both hydrolytic enzymes (e.g., cellulase) and fermentation products (SCFAs and MCFAs).

Because a wide variety of microorganisms are present, each with its own specialized niche, a wide variety of biomass components (e.g., cellulose, hemicellulose, starch, sugar, gums, lipids, proteins) are transformed into SCFAs and MCFAs.

The mixed culture does not require sterile operating conditions. In fact, soil, rumen fluid, compost, and other natural materials are employed as the inoculum source and there is no attempt to maintain sterile operating conditions. Non-sterile operating conditions are tolerated because the SCFAs and MCFAs are nearly at the low energy state; hence, the biological transformations are driven by thermodynamics rather than the challenging task of maintaining monoculture fermentations.

Lower energy products can result from methane production and sulfate reduction. Elimination of sulfate-reducing microorganisms is achieved by ensuring sulfate is not added to the fermentation media. Elimination of methanogens, which would otherwise consume the acids, may be readily accomplished by adding inhibitors (e.g., iodoform) or by employing operating conditions (e.g., low pH) that prevent the growth of methanogens.

Figure 5:
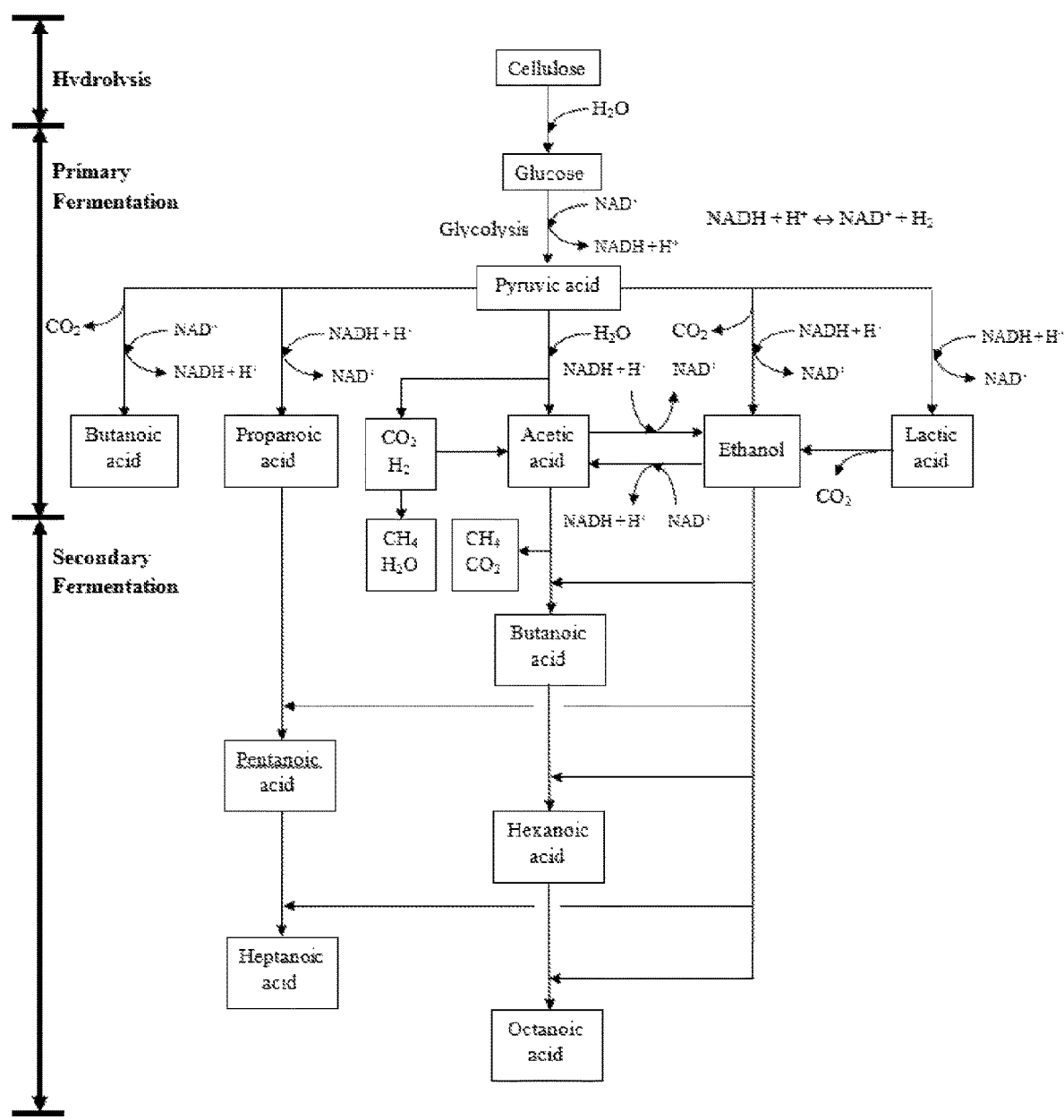
FIG. 5 shows biological pathways in mixed-acid fermentation.

FIG. 5 summarizes the complex biological pathways that convert cellulose into various products, primarily acids. The biochemistry is employed in three phases: (1) enzymatic hydrolysis, (2) primary fermentation, and (3) secondary fermentation. Primary fermenters convert glucose into various products: acids (acetic, propanoic, butanoic, lactic), solvents (ethanol), and gases (carbon dioxide, hydrogen). Secondary fermenters convert primary products into secondary products such as MCFAs (pentanoic, hexanoic, heptanoic, octanoic acids) and gases (methane, carbon dioxide).

Within primary fermenters, the first step is glycolysis, a nearly ubiquitous biochemical pathway that converts glucose to pyruvate. Glucose is a more reduced species than is pyruvate; cells capture the difference in reducing potential by converting oxidized nicotinamide adenine dinucleotide ($NAD^+$) to its reduced form (NADH). In generic terms, the reduced species ($RH_2$) undergoes the following reaction to become oxidized species (R)

$$RH_2 + NAD^+ \rightarrow NADH + H^+ + R \quad (1)$$

The enzyme hydrogen dehydrogenase reversibly transforms NADH (and other reduced biological hydrogen carriers) into hydrogen gas $$NADH + H^+ \leftrightarrow NAD^+ + H_2 \quad (2)$$

In the mixed culture, the hydrogen partial pressure determines whether NAD is in its oxidized form ($NAD^+$) or its reduced form (NADH). If the hydrogen partial pressure is low, then the pool of $NAD^+$ is abundant, thus allowing glycolysis to proceed rapidly. If the hydrogen partial pressure is high, the pool of NADH is abundant thus providing reducing power for many of the subsequent reactions. This interspecies hydrogen transfer, the sharing of reducing power between species, allows the entire consortium of microorganisms to behave as a "super-microorganism."

The following classes of microorganisms are typically found in the consortium:

Lactic acid formers convert sugar to lactic acid.

Ethanologens ferment sugar to ethanol and carbon dioxide. Other routes to ethanol include decarboxylation of lactic acid and the reduction of acetic acid.

Acidogens directly ferment sugar to acids such as acetic, propanoic, and butanoic acids. In addition, acetic acid can be made from ethanol, which occurs more readily at low hydrogen partial pressure.

Acetogens convert carbon dioxide and hydrogen into acetic acid.

Chain elongators convert carboxylic acids to longer chain carboxylic acids in the presence of reductants (e.g., ethanol, higher alcohols, lactic acid, sugar, starch, carbon monoxide and hydrogen) or when there is a reducing environment provided by an electrical voltage.

Acetotrophic methanogens convert acetic acid to methane and carbon dioxide.

Hydrogenotrophic methanogens convert hydrogen and carbon monoxide to methane and water.

At elevated temperatures (55° C.), chain elongation does not occur to an appreciable extent whereas it does occur at lower temperatures (~40° C. and lower).

Figure 6A:
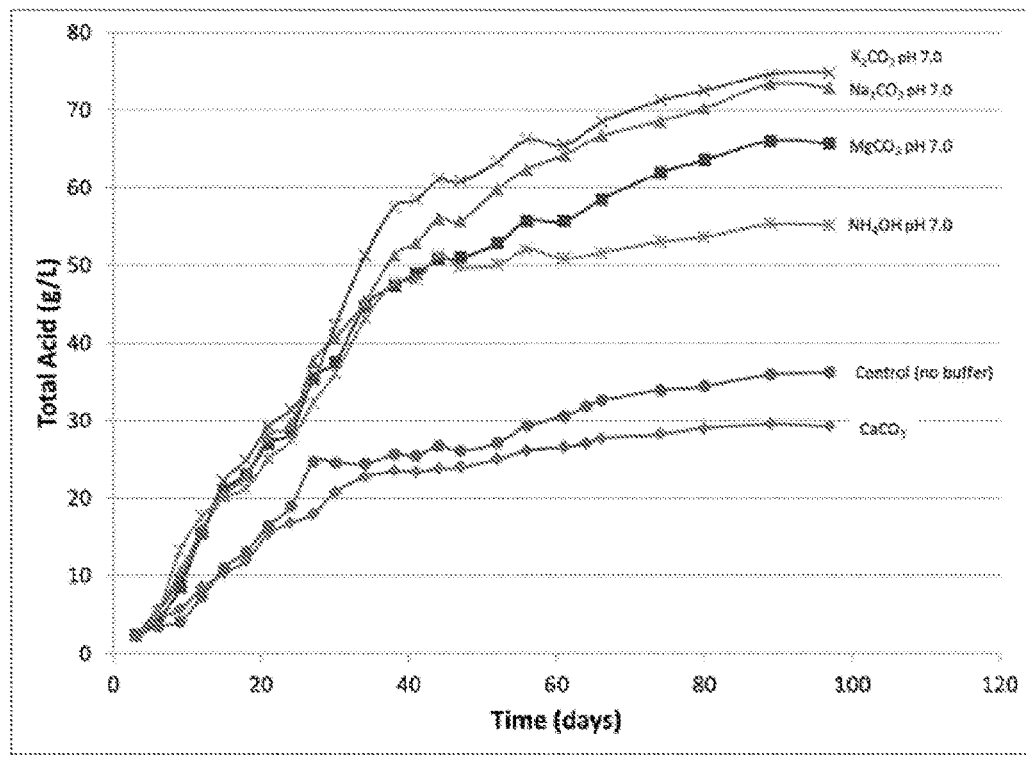
FIG. 6A shows the effect of buffer on acid production.

FIG. 6A shows the effect of buffer on acid production in extended batch fermentation. The best buffers must buffer the pH near neutrality (pH=~7.0). The control (no buffer) and calcium carbonate are not able to maintain neutral pH, so they performed the worst. In contrast, the monovalent alkali metals (sodium and potassium carbonate) performed the best. Magnesium carbonate, which is divalent, performed nearly as well as the alkali metals. Divalent cations tend to form insoluble carboxylates from heavy MCFA's, much like soap scum. Presumably, the insoluble MCFA's had a slightly negative impact on the fermentation. Ammonium hydroxide buffer performed moderately well.

Pretreatment

Figure 6B:
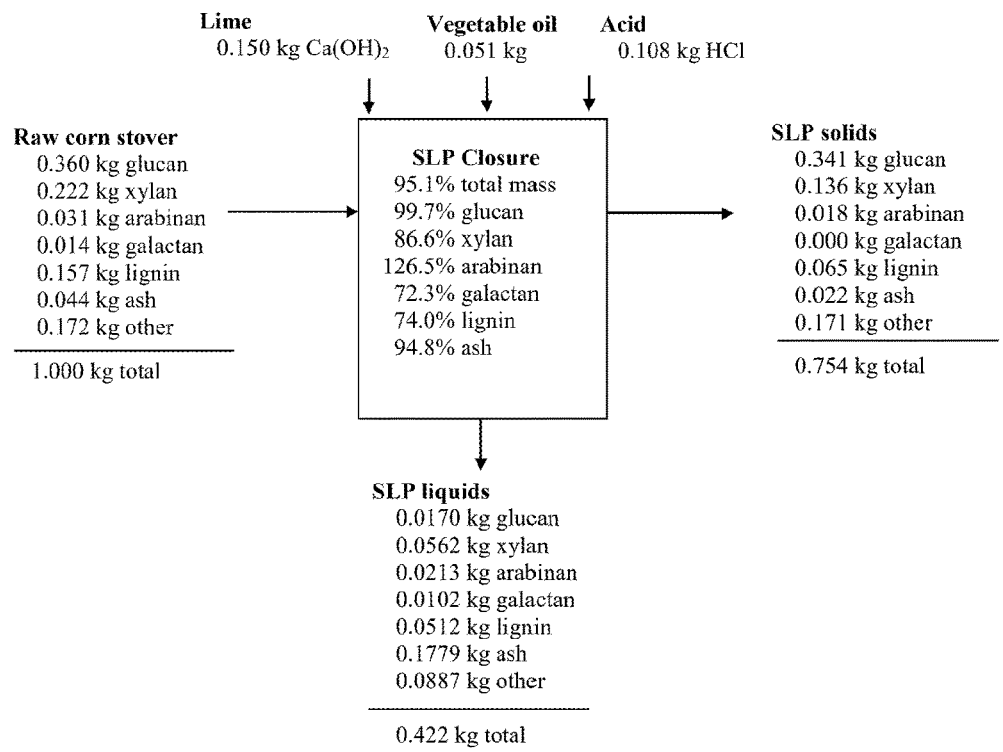
FIG. 6B shows mass balances for submerged lime pretreatment (SLP) of corn stover at 50 C for 1 month.

FIG. 6B shows a mass balance for corn stover pretreated with alkali (lime) for 1 month at 50° C. Approximately 25% of the xylan is solubilized from the alkaline pretreatment. The dissolved sugars are mostly oligomers that can be converted to sugar monomers via enzymes or dilute acid.

Process Options

Figure 6C:
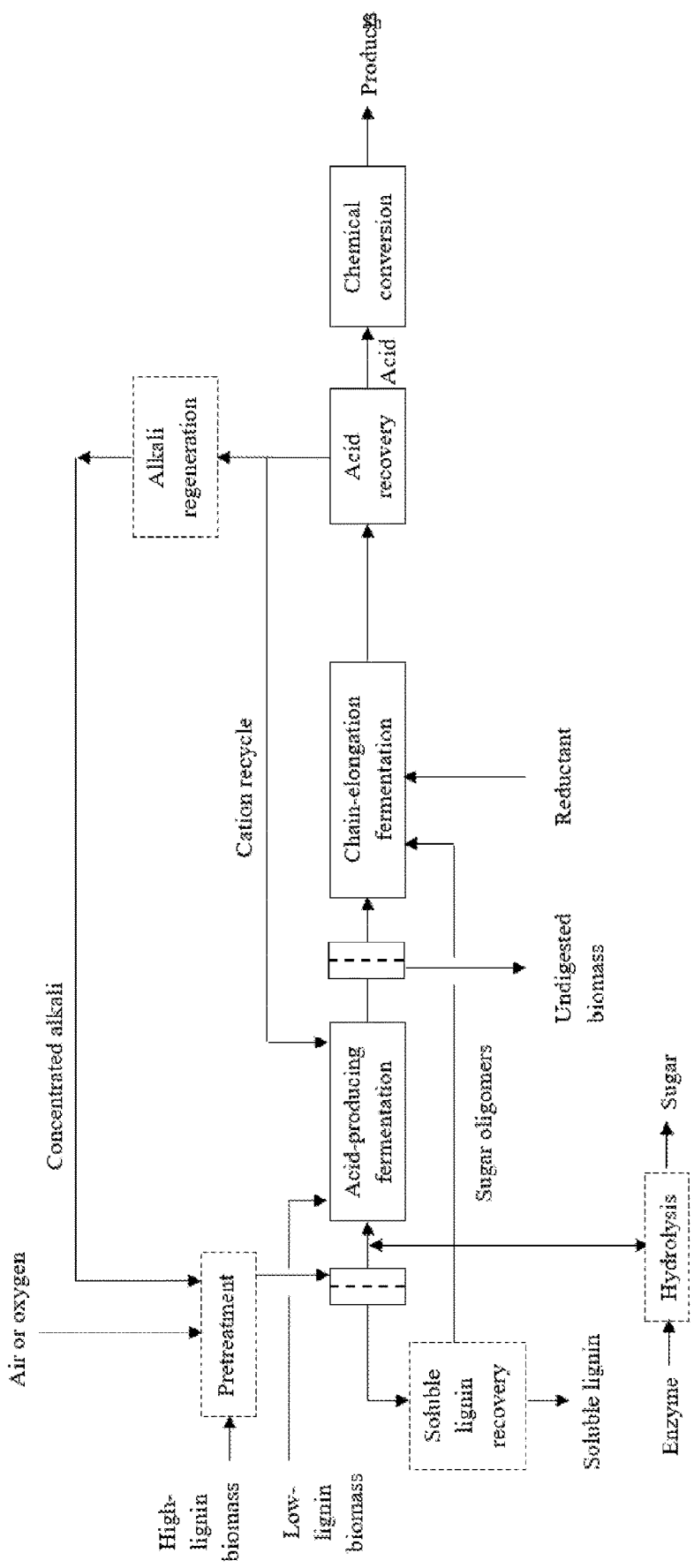
FIG. 6C shows a simplified overview of biomass conversion process.

FIG. 6C is a simplified overview of the biomass conversion process, which occurs in the following steps:

1. High-lignin biomass is pretreated with alkali and possibly air/oxygen to enhance digestibility. Solubilized lignin can be recovered and used for fuel or chemical feedstock. For low-lignin biomass, pretreatment is not required and is optional, as indicated by dashed boxes.
2. Sugar oligomers that are solubilized during alkaline pretreatment can be sent to the acid-producing fermentor or the chain-elongation fermentor. Preferably, they are sent to the chain-elongation fermentor where they serve as a reductant to enhance chain elongation. Optionally, the sugar oligomers can be sent to a hydrolysis reactor in which enzymes (e.g., hemicellulase) or dilute acid complete the hydrolysis to produce sugar monomers. The monomers are dominated by pentose sugars, which can be consumed by a variety of microorganisms, such as Torula yeast or Clostridia bacteria.
3. Using a mixed culture of microorganisms, biomass is converted to short-chain fatty acids (primarily acetic, propanoic, butanoic) and ethanol in the acid-producing fermentation.
4. Using a mixed culture of microorganisms, the products from the acid-producing fermentation are elongated to medium-chain fatty acids (pentanoic, hexanoic, heptanoic, octanoic) by using reductants, such as hydrogen, carbon monoxide, ethanol, sugar, lactic acid, or starch.
5. The medium-chain fatty acids are extracted from the fermentation broth.
6. The extracted medium-chain fatty acids are chemically converted to chemicals (e.g., primary alcohols, secondary alcohols, ketones, esters) and hydrocarbons, which may be used as fuel.

Figure 7:
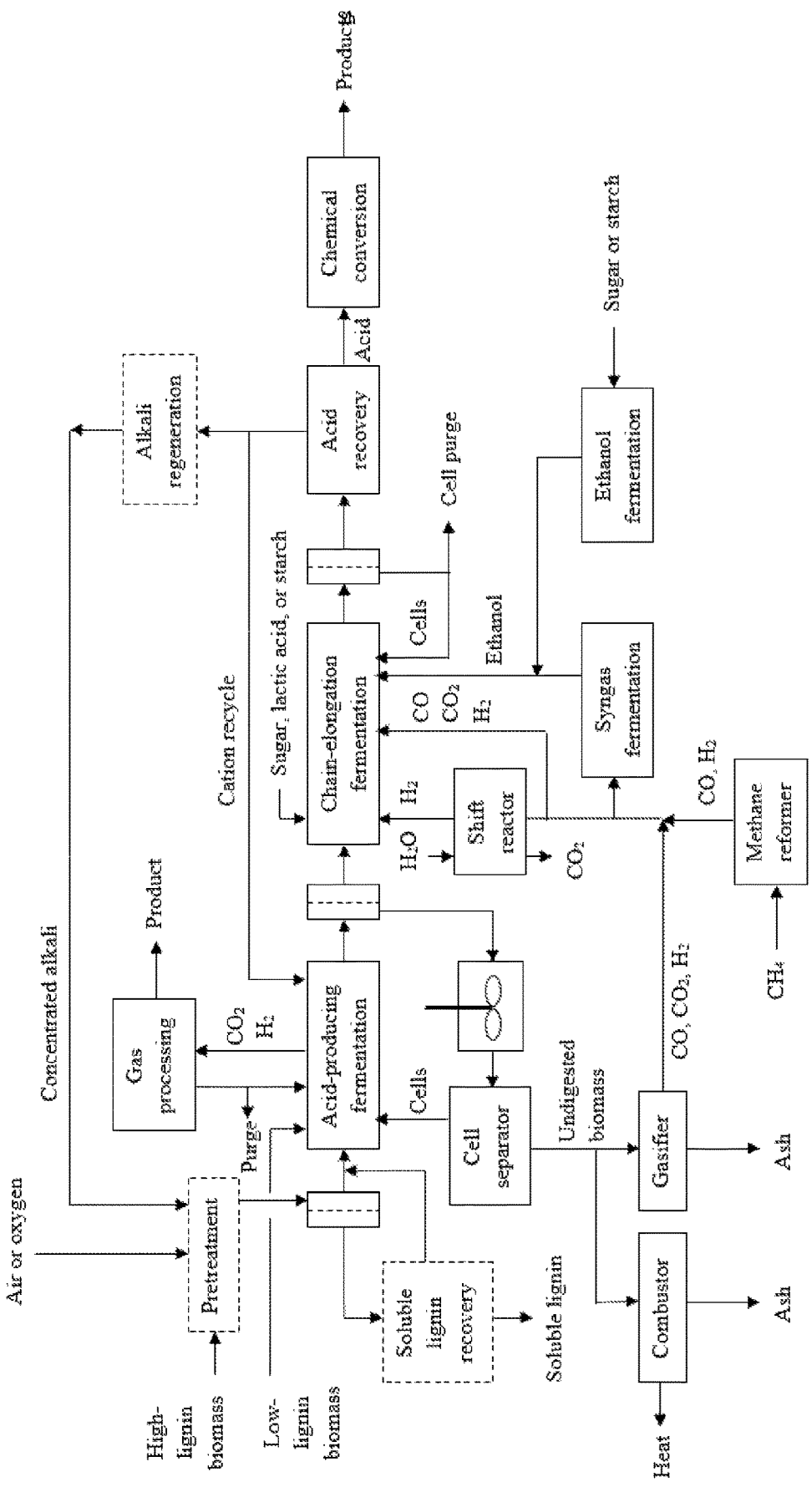
FIG. 7 shows a more detailed overview of biomass conversion process.

FIG. 7 shows a detailed overview of the biomass conversion process, which shows details of the various options:

1. Gas exiting the acid-producing fermentation is processed to remove hydrogen, which helps favor glycolysis.
2. Cell recycle is incorporated into the fermentors to increase fermentation rates.
3. Undigested biomass is combusted or gasified.
4. Various options are shown for adding reductant to the chain-elongation fermentor, such as the following:
   Hydrogen addition from reformed natural gas or gasified biomass.
   Hydrogen, carbon monoxide, and carbon dioxide addition from reformed natural gas or gasified biomass.
   Ethanol addition from fermented biomass or fermented syngas.
   Direct addition of sugar, lactic acid, or starch.
   Details of these basic steps are explained below.

Pretreatment

Figure 8A:
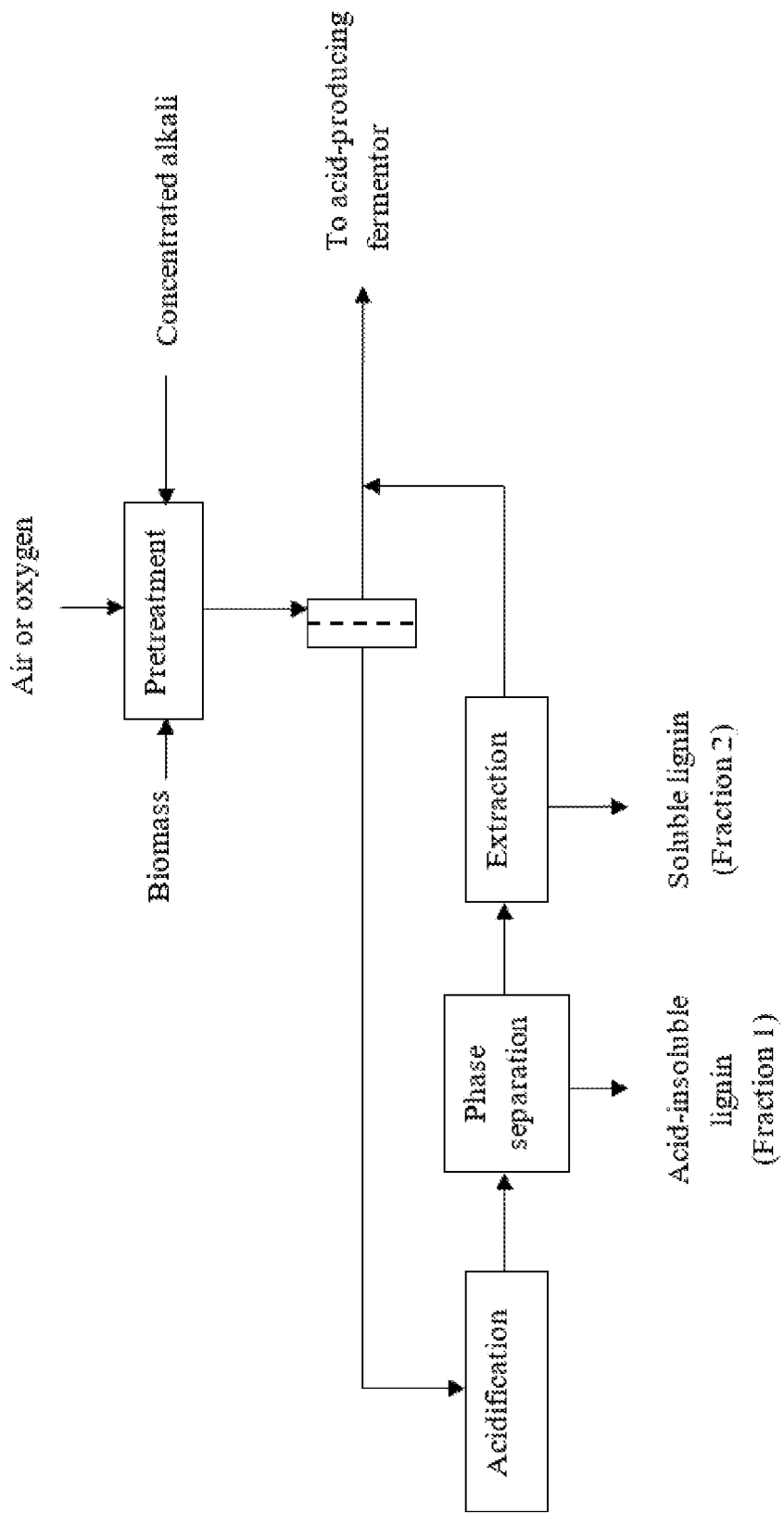
FIG. 8A shows details of biomass pretreatment.

Because it is already reactive, low-lignin biomass (e.g., food scraps, manure, sewage sludge) can be directly added to the acid-producing fermentation. In contrast, high-lignin biomass is not very reactive and requires pretreatment. As detailed in FIG. 8A, high-lignin biomass (e.g., wood, grass, straw, stems) is pretreated with alkali, primarily sodium hydroxide or potassium hydroxide. In addition, air or oxygen can be added to help break down lignin so it dissolves in water. Typical pretreatment conditions are shown below:

Temperature=20 to 210° C.
Time=10 min to 2 months
Alkali loading=0.01 to 0.5 kg alkali/kg biomass
Water loading=1 to 20 kg water/kg biomass
Partial pressure of oxygen=0 to 33 bar If the biomass has a high lignin content (e.g., wood), then more aggressive treatments are required (longer time, higher temperature, more alkali, higher oxygen partial pressure). If the biomass has a low lignin content (e.g., straw), the less aggressive treatments can be employed (shorter time, lower temperature, less alkali, lower oxygen partial pressure). The pretreatment conditions can be customized to each biomass to balance cost with reactivity.

The pretreated biomass can be added directly to the fermentor; however, it is desirable to recover lignin from the aqueous solution, which allows the recovered lignin to be converted into industrial chemicals or fuels. To recover lignin, the aqueous solution is filtered from the solids. To achieve greater recovery, the solids can be washed countercurrently. To precipitate the dissolved lignin, the aqueous solution is acidified by one (or a combination) of the following means: (1) mineral acid, (2) organic acid such as acetic, (3) pressurization with carbon dioxide, or (4) mixed-acid fermentation of the solubilized carbohydrates. The acid-insoluble lignin that precipitates once the pH is decreased to acidic levels is designated as Fraction 1. Additional lignin (Fraction 2) can be recovered by an appropriate extractant (e.g., toluene). Lignin Fraction 2 is recovered from the extractant by evaporation or distillation. After the lignin is substantially removed, the aqueous stream can be sent to the acid-producing fermentation.

The alkalinity required in the pretreatment can be accomplished using a number of methods:

Method A—Ash produced from the gasifier or combustor is added directly to the pretreatment vessel. The temperature in the gasifier or combustor is sufficiently high that minerals present in the biomass are calcined into alkaline species.

Figure 8B:
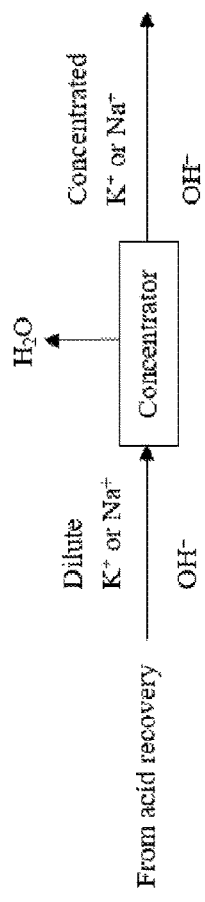
FIG. 8B shows Method B—Alkali concentration.

Method B— If the acid recovery system is regenerated with hydroxide ions, the effluent already contains dilute hydroxide, which can be concentrated for the pretreatment system (FIG. 8B).

Figure 8C:
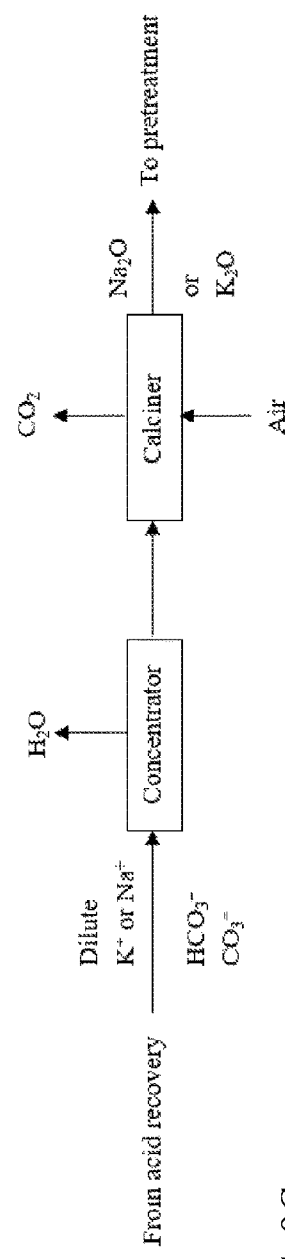
FIG. 8C shows Method C—Direct alkali regeneration.

Method C—In many acid recovery schemes, the exit stream contains carbonate or bicarbonate ions, and dissolved organic species. This aqueous solution is concentrated using a variety of conventional methods (e.g., reverse osmosis, multi-effect evaporators, vapor-compression evaporation) and calcined into alkaline species (FIG. 8C). The cations include sodium or potassium. Using sodium as the example, the calcining chemistry follows:

$$2NaHCO_3 \rightarrow Na_2CO_3 + CO_2 + H_2O$$

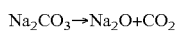

$$Na_2CO_3 \rightarrow Na_2O + CO_2$$

The first reaction occurs at a modest temperature (50 to 200° C.) whereas the second reaction occurs at a higher temperature (>851° C.). Similar chemistry occurs with potassium carbonate, but it requires a higher thermal decomposition temperature (>1200° C.). When sodium oxide or potassium oxide are added to water, they form the hydroxide

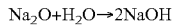

$$Na_2O + H_2O \rightarrow 2NaOH$$

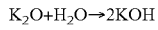

$$K_2O + H_2O \rightarrow 2KOH$$

Figure 8D:
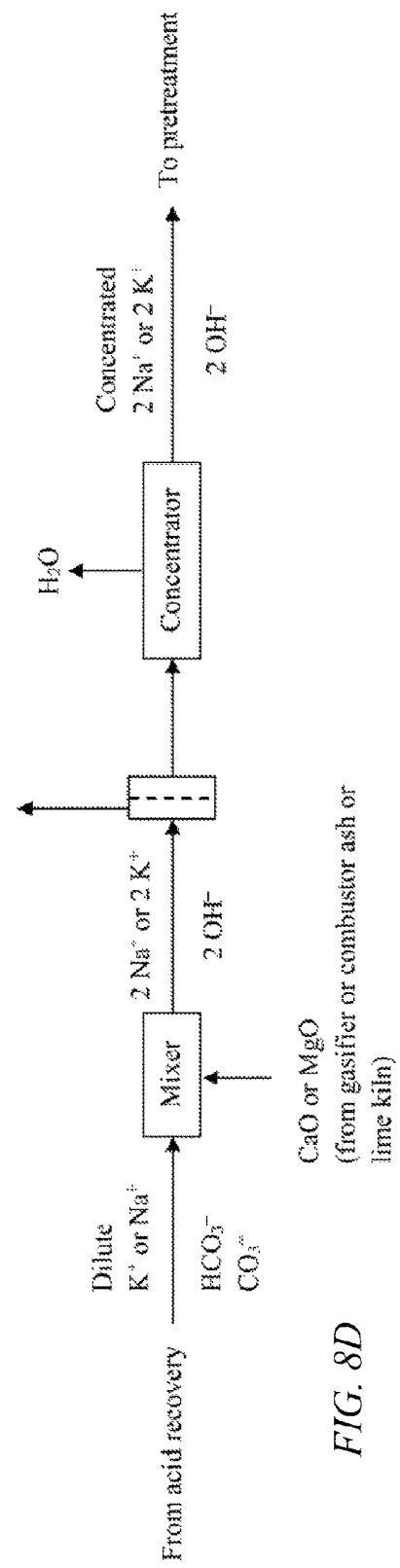
FIG. 8D shows Method D—Indirect alkali regeneration.

Method D—In many acid recovery schemes, the exit stream contains carbonate or bicarbonate ions, and dissolved organic species. The cations may include sodium or potassium. This aqueous solution is mixed with calcium oxide or magnesium oxide (or the corresponding hydroxides) to form an alkaline solution (FIG. 8D). The solubility of the resulting calcium and magnesium carbonate is low:

Calcium carbonate solubility=15 mg/L at 25° C.
Magnesium carbonate solubility=106 mg/L at 25° C.

The precipitated carbonates can be calcined and converted to oxides according to the following chemistry:

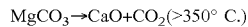

The magnesium carbonate requires a lower decomposition temperature, which saves energy. Compared to Method C, Method D does not destroy dissolved organic species, some of which may have economic value.

Acid-Producing Fermentation

The acid-producing fermentation is operated in a manner that promotes the primary fermentation (FIG. 5), particularly cellulose-degrading microorganisms. A buffer (e.g., sodium carbonate, sodium bicarbonate, sodium hydroxide) is added to the fermentor to maintain the pH near neutrality. Furthermore, the temperature is controlled to approximately 55° C. which promotes the production of primarily three acids (acetic, propanoic, butanoic) plus ethanol. Ethanol serves as a reductant in the chain-elongation fermentation. Because the temperature is elevated, the fermentation tends to proceed faster than at lower temperature. Also, at high temperatures it is easier to remove metabolic heat, which reduces the flow rate of cooling water and reduces the size of the cooling tower. Ideally, methanogens are inhibited in the acid-producing fermentation. A number of approaches are employed to reduce methanogens such as adding methane analogs (e.g., iodoform), drugs (e.g., bromoethanesulfonic acid), or ammonia.

Figure 9:
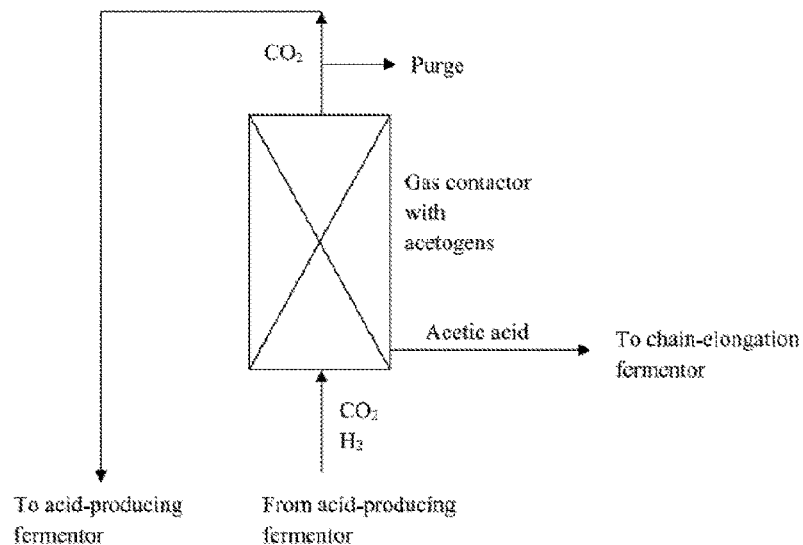
FIG. 9 shows removal of hydrogen using acetogens.

As described in FIG. 5, glycolysis is promoted at low hydrogen partial pressures, so the acid-producing fermentor benefits from removing hydrogen from the gas according to the following methods:

Acetogens—FIG. 9 shows the fermentation gas being absorbed into a fermentor that grows acetogens, which convert hydrogen and carbon dioxide to acetic acid. The acetic acid can be added to either fermentor, but is preferably added to the chain-elongation fermentor. The acetogens can be cultured in bulk liquid, or attached to packing. The gas that has been substantially stripped of hydrogen is returned to the acid-producing fermentation and bubbled through the liquid to strip additional hydrogen and thereby maintain a low hydrogen partial pressure in the fermentation. Excess gas (primarily carbon dioxide) is purged from the system.

Figure 10:
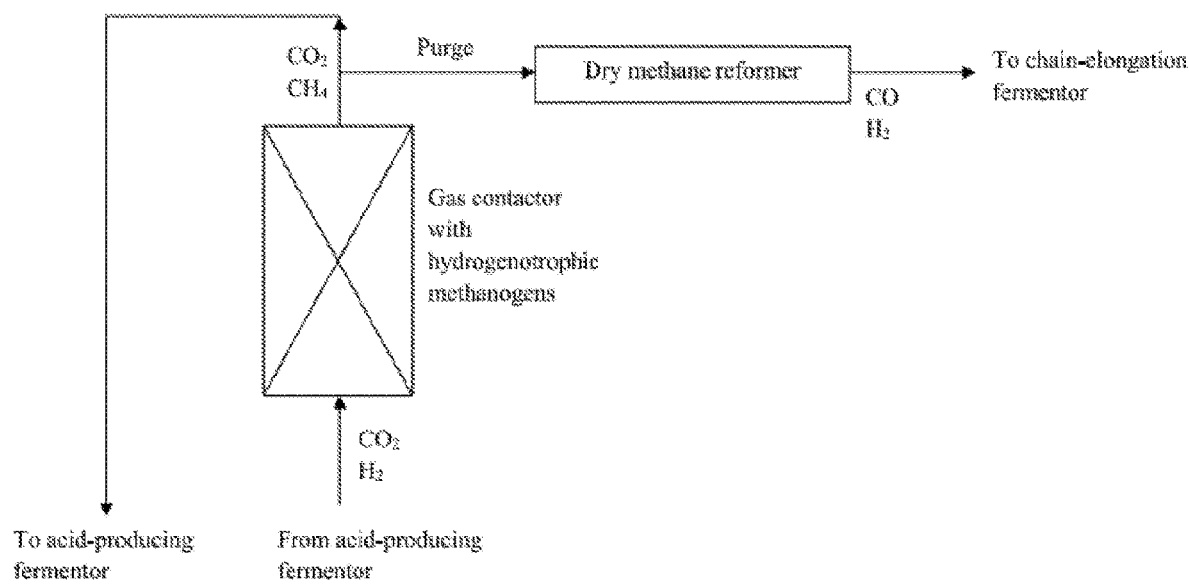
FIG. 10 shows removal of hydrogen using hydrogenotrophic methanogen.

Hydrogenotrophic methanogens—FIG. 10 shows the fermentation gas being absorbed into a fermentor that grows hydrogenotrophic methanogens, which convert hydrogen and carbon dioxide to methane. The methanogens can be cultured in bulk liquid, or attached to packing. The gas that has been substantially stripped of hydrogen is returned to the acid-producing fermentation and bubbled through the liquid to strip additional hydrogen and thereby maintain a low hydrogen partial pressure in the fermentation. Excess gas that is purged from the system contains a substantial amount of methane, which can be sent to a "dry" methane reformer. Dry methane reformers react methane and carbon dioxide to form carbon monoxide and hydrogen using noble metal catalysts at elevated temperatures.

Figure 11:
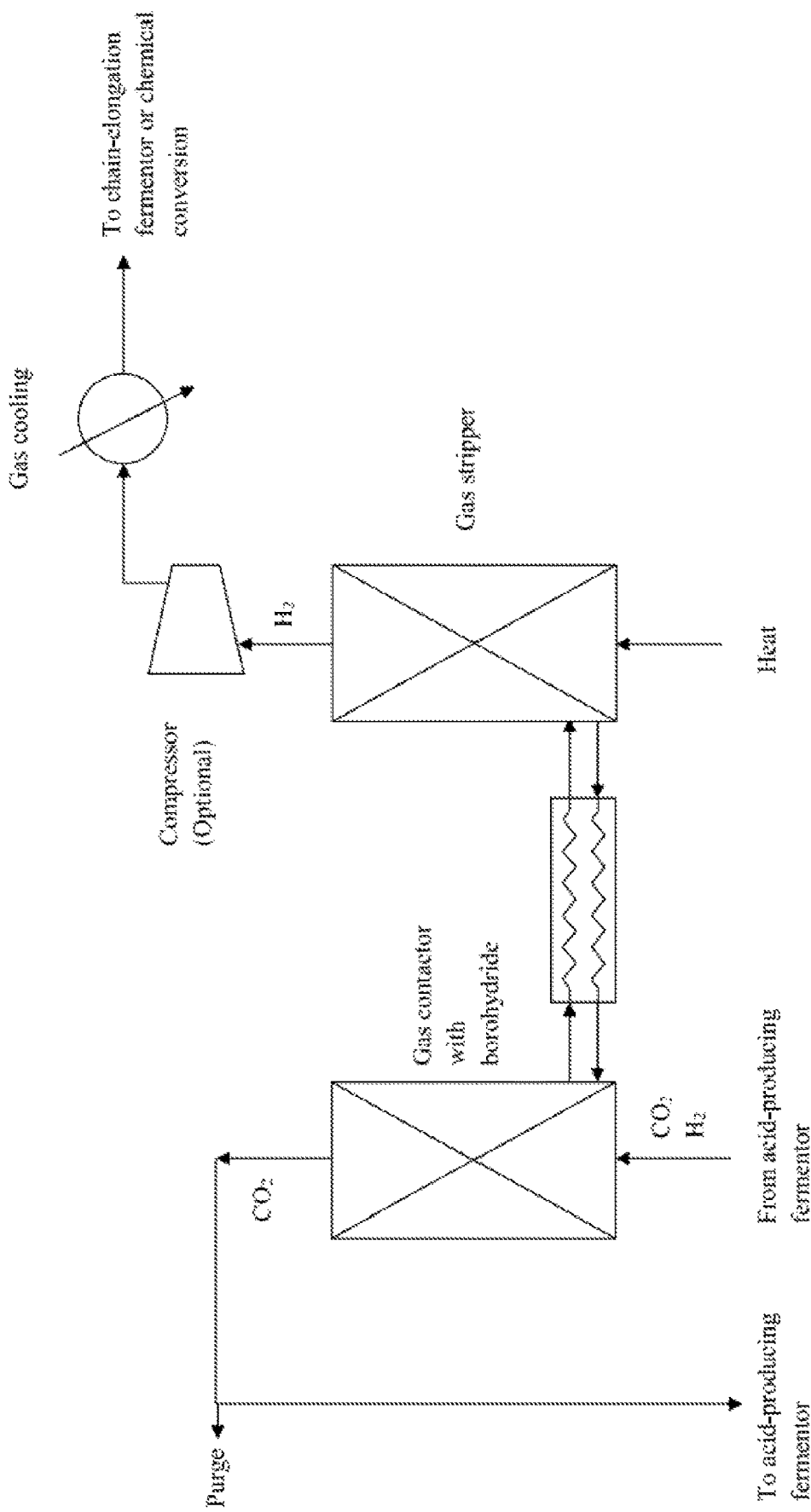
FIG. 11 shows removal of hydrogen using absorption.
Figure 12A:
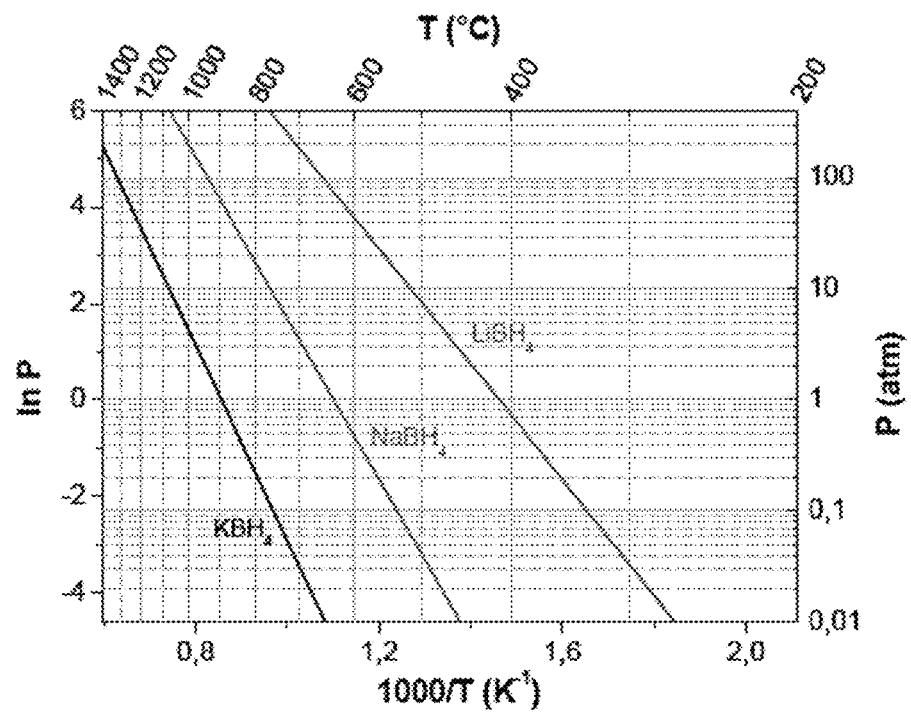
FIG. 12A show hydrogen equilibrium pressure with borohydrides.

Absorption—FIG. 11 shows a gas contactor containing a borohydride, which reversibly binds hydrogen. FIG. 12A shows the equilibrium hydrogen pressure as a function of temperature. At low temperatures, the borohydride absorbs hydrogen and at elevated temperatures, the hydrogen is released. By using temperature as the "swing variable," it is possible to regenerate the borohydride and reuse it. Of the borohydrides shown in FIG. 11, $LiBH_4$ is preferred because it regenerates at lower temperatures than the others. The use of an optional compressor reduces the temperature required to regenerate the borohydride. The recovered hydrogen can be used in the chain-elongation fermentor, or used for hydrogenations in downstream chemical processes. The gas that has been substantially stripped of hydrogen is returned to the acid-producing fermentation and bubbled through the liquid to strip additional hydrogen and thereby maintain a low hydrogen partial pressure in the fermentation. As an alternative to liquid adsorbents, solid adsorbents such as nickel metal hydrides could be employed; however, it is more difficult to reversibly change the temperature of solids, so this is not as preferable as liquid adsorbents.

It should be noted that removal of hydrogen from the acid-producing fermentor is not essential; however, it is desirable because it allows glycolysis to proceed more rapidly, which reduces the size of the fermentor. From an engineering perspective, there is a trade-off between the cost of a larger fermentor versus the cost of the hydrogen-removal system. If hydrogen is not removed from the gases emitted from the acid-producing fermentor, the gas should not be purged into the air; rather, it should be directed to the chain-elongation fermentor where the hydrogen is used to increase the chain length of the acids.

To reduce the size of the acid-producing fermentor, it is desirable to maintain a high cell density. This can be accomplished by removing solids from the exit stream and vigorously agitating them to dislodge attached cells. Then, the undigested residues are separated from the dislodged cells. Because the undigested residues are large particles, they will settle faster than the small cells. Either a centrifuge or gravity settler can take advantage of the different settling rates to separate cells from undigested solids. The recovered cells are returned to the acid-producing fermentor. If necessary, excess cells can be purged and sold as animal feed, or other purposes. For example, the cells can be lysed and returned to the fermentor to serve as a nutrient source. Because of cell recycle, the mixed culture will evolve to be particularly effective at digesting biomass; those cells that thrive are recycled and continue to build within the culture.

Undigested residues can be used as follows:
1. Spread on land as compost or fertilizer
2. Dried and sold as a boiler fuel
3. Combusted at the plant to provide process heat and ash
4. Pyrolyzed to produce combustible gas and biochar
5. Gasified at the plant to provide process heat, syngas, and biochar Generally, Option 5 is preferred because there is more energy in the undigested residue than is needed to operate the plant. The heat generated by gasification can be used to produce heat and power needed to run the plant. The syngas can be fed to the chain-elongation fermentor to make more product. Burning the biochar releases alkaline ash that can be used as a pretreatment chemical.

Chain-Elongation Fermentation

The chain-elongation fermentor is operated at conditions that favor chain elongation. Typically, the pH would be near neutrality or acidic (pH 3 to 6) and the temperature would be approximately 40° C. or less. In the chain-elongation fermentor, although the mass concentration of the acids increases, the molar concentration does not change appreciably; therefore, it is not necessary to add an appreciable amount of buffer.

Chain elongation requires a reductant. Examples of these follow:

1. Hydrogen provided from the acid-producing fermentor, gasified undigested biomass, or external sources.
2. Syngas ($CO$, $CO_2$, $H_2$) provided from the gasification of undigested biomass or natural gas.
3. External ethanol, which could be produced from grain, biomass, or syngas.
4. Lactic acid
5. Free sugars
6. Starch
7. Generating a reducing environment through the use of electrical charges Hydrogen provides energy, but not carbon. In this case, the reducing power of hydrogen allows acids produced in the acid-producing fermentation to elongate the chain. In contrast, the other sources of energy also provide carbon. In these cases, the added carbon becomes part of the elongated chain.

The chain-elongation fermentor can be operated with biomass solids, or without. In Options 1 and 2, gases (hydrogen, syngas) are the dominant method of chain elongation. For these options, it is desirable to operate the fermentor without appreciable amounts of solids, which interfere with gas transfer. In Options 3 to 5, the added liquids or solids dissolve in water. In these cases, because gas transfer is not a dominant mechanism, it is acceptable to have significant solids in the fermentor.

The cells that are produced in the chain-elongation fermentor can be collected and recycled. If the fermentor is operated without a significant amount of biomass solids, cell recycle is readily accomplished by separating the cells from water by a centrifuge or gravity settler. If there are significant solids in the fermentor, it is more difficult to separate cells; methods such as those described for the acid-producing fermentor would be employed. The purged cells can be sold as animal feed, or recycled to the acid-producing fermentor either as whole cells or lysed cells.

Rather than recycling cells, an alternative is to operate a packed bed (trickle bed) or an up-flow filter bed.

Acid Recovery or Concentration and Purification

Acids can be produced by the fermentation, or they can be present in the raw biomass and pass through the fermentation unaffected by the microorganisms. The recovery of acids from fermentation broth can occur via the following options:

Ion-exchange resins
  Weak base (L≡N:)
  Strong base (L≡NR$^+$)
Liquid extractants
  Weak base (L≡N:)
  Strong base (L≡NR$^+$)

Regardless of whether an ion-exchange resin or liquid extractant is used, the same symbol is employed for a weak base (L≡N:) and a strong base (L≡NR$^+$). Essentially, the only difference is whether the groups attached to the nitrogen form a solid (ion-exchange resin) or a liquid (liquid extractant). Regardless of the attached groups, the chemistry involved in the ion exchange is the same.

An important part of the extraction process—whether by ion exchange or liquid extraction—is that the fermentation broth must be appropriately preconditioned prior to use. The following are some examples of preconditioning steps:

Particle filtration to remove suspended biomass particles
Membrane filtration (e.g., microfiltration, ultrafiltration, nanofiltration) to remove fine suspended or dissolved particles that may cause fouling
Pre-concentration (e.g., reverse osmosis, multi-effect evaporation, vapor-compression evaporation) to reduce the size of the extraction equipment These preconditioning steps are well-known to practitioners of the art and are selected based on the unique properties of the fermentation broth and the extraction process. One objective of this patent is to reduce the amount of preconditioning required by using membranes in liquid extraction (see FIG. 21) or unique ion exchange geometry (see FIGS. 15 to 17). In future process flow diagrams, appropriate preconditioning is assumed to precede the indicated extraction process. For simplicity, in future process flow diagrams, the need for preconditioning will not be discussed because the point is made here.

Strong Base

Strong-base ion-exchange resins and liquid extractants have a permanent positive charge (FIG. 3). They are regenerated by replacing the bound acid anion ($A^-$) with another anion, typically hydroxyl anion ($OH^-$). It is possible to load the strong-base ion exchange resin or liquid extractant with other anions (e.g., bicarbonate, carbonate); however, to simplify the discussion, hydroxide anions ($OH^-$) will be used as the illustrative example.

The following reactions show the chemistry during service and regeneration:

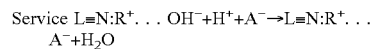
Service L≡N:R$^+$... $OH^-$+$H^+$+$A^-$→L≡N:R$^+$... $A^-$+$H_2O$

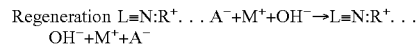
Regeneration L≡N:R$^+$... $A^-$+$M^+$+$OH^-$→L≡N:R$^+$... $OH^-$+$M^+$+$A^-$ During service, initially the resin or extractant is loaded with hydroxyl anions ($OH^-$). As it contacts the much greater quantity of acid anions ($A^-$) in the fermentation broth, the anions exchange. During regeneration, initially the resin or extractant is loaded with acid anions ($A^-$). As it contacts the much greater quantity of hydroxyl anions ($OH^-$) in the regenerating solution, the anions exchange. In essence, the driving force that causes the resin or extractant to swing one way, or the other, is the relative quantity of hydroxyl anions ($OH^-$) or acid anions ($A^-$) in the contacting solution.

The amount of cation exchange is not only affected by the amount of anions in one solution or the other, but also the relative binding strength, or selectivity. Table 12 shows the selectivity for anions in Type I and Type II strong-base resins. For Type I resins, acetate (3.2) and propionate (2.6) have a stronger selectivity than hydroxyl (1.0), but not as strong as bicarbonate (6.0). By maintaining a low carbon dioxide concentration in the fermentation broth, the concentration of bicarbonate anions is low relative to the acid concentration. Because the carboxylate anions have a higher selectivity than hydroxyl anions, they more readily bind during service, but are more difficult to replace during regeneration.

TABLE 12

Selectivity coefficients of various anions on functionalized styrene-divinylbenzene anion exchange resins

| Ion | Type I | Type II |
|---|---|---|
| $OH^-$ | 1.0 | 1.0 |
| Benzene sulphonate | 500 | 75 |

TABLE 12-continued

Selectivity coefficients of various anions on functionalized styrene-divinylbenzene anion exchange resins

| Ion | Type I | Type II |
|---|---|---|
| Salicylate | 450 | 65 |
| Citrate | 220 | 23 |
| I$^-$ | 175 | 17 |
| Phenate | 110 | 27 |
| HSO$_4^-$ | 85 | 15 |
| ClO$_3^-$ | 74 | 12 |
| NO$_3^-$ | 65 | 8 |
| Br$^-$ | 50 | 6 |
| CN$^-$ | 28 | 3 |
| HSO$_3^-$ | 27 | 3 |
| BrO$_3^-$ | 27 | 3 |
| NO$_2^-$ | 24 | 3 |
| Cl$^-$ | 22 | 2.3 |
| HCO$_3^-$ | 6.0 | 1.2 |
| IO$_3^-$ | 5.5 | 0.5 |
| Formate | 4.6 | 0.5 |
| Acetate | 3.2 | 0.5 |
| Propionate | 2.6 | 0.3 |
| F$^-$ | 1.6 | 0.3 |
| HSiO$_3^-$ | <1.0 | <1.0 |
| H$_2$PO$_4^-$ | 5.0 | 0.5 |

Note:
Hydroxyl anion is defined as 1.0

Weak Base

Weak-base ion-exchange resins and liquid extractants employ unpaired electrons in nitrogen (amines) or oxygen (phosphine oxides) to reversibly bond with hydrogen. For simplicity, the following discussion will focus on amines rather than phosphine oxides. During service, the environment should be acidic, which allows undissociated acid to bind directly (one-step model) or the nitrogen to become protonated and thereby bind the acid anion (two-step model). During regeneration, the environment should be basic, which strips the proton from the nitrogen to form water. The acid anion is removed from the resin or liquid extractant and goes into solution.

Service L≡N: +HA→L≡N:H$^+$... A$^-$ (one-step)

L≡N:+H$^+$+A$^-$→L≡N:H$^+$+A$^-$→L≡N:H$^+$... A$^-$ (two-step)

Regeneration L≡N:H$^+$... A$^-$+M$^+$+OH$^-$→L≡N:+ H$_2$O+M$^+$+A$^-$

One-Step Model

In the one-step model, only the undissociated acid is attracted to the unpaired electrons of weak-base ion-exchange resins and liquid extractants. According to this model, the percentage of undissociated acids solely determines binding to the unpaired electrons. According to the Henderson Hasselbalch equation, the fraction of undissociated acids γ is determined as follows:

$$\gamma \equiv \frac{[HA]}{[HA]+[A^-]}$$

$$\frac{1}{\gamma} = \frac{[HA]+[A^-]}{[HA]} = \frac{[HA]}{[HA]} + \frac{[A^-]}{[HA]} = 1 + \frac{[A^-]}{[HA]}$$

$$\frac{[A^-]}{[HA]} = 10^{pH-pK_a}$$

$$\frac{1}{\gamma} = 1 + 10^{pH-pK_a}$$

$$\gamma = (1 + 10^{pH-pK_a})^{-1}$$

Figure 12B:
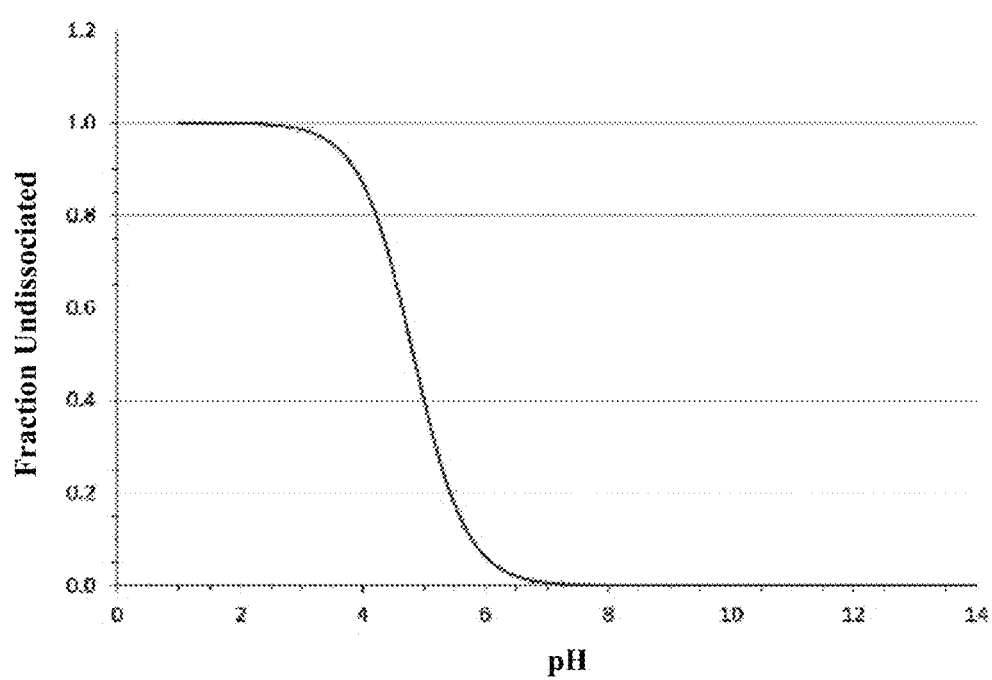
FIG. 12B shows fractions of undissociated butyric acid ($pK_a$=4.82)

FIG. 12B shows the fraction of undissociated (neutral) acid as a function of pH. If weak-base ion-exchange resins and liquid extractants operated only according to the one-step model, they would only effectively adsorb acids at pH less than about 4 where about 87% of the acid is undissociated.

Two-Step Model

In the two-step model, the weak-base ion-exchange resin or liquid extractant is first protonated and then attracts the anion. The following equilibrium reaction is illustrated for a tertiary amine:

$$R_3N+H_2O \leftrightarrow R_3NH^+ +OH^-$$

The ratio of protonated to neutral amine is determined as follows:

$$K_b \equiv \frac{[R_3NH^+][OH^-]}{[R_3N]}$$

$$\log_{10} K_b = \log_{10} \frac{[R_3NH^+][OH^-]}{[R_3N]} = \log_{10}[OH^-] + \log_{10}\frac{[R_3NH^+]}{[R_3N]}$$

$$[OH^-][H^+] = 10^{-14}$$

$$[OH^-] = \frac{10^{-14}}{[H^+]}$$

$$\log_{10}[OH^-] = \log_{10}\frac{10^{-14}}{[H^+]} = \log_{10} 10^{-14} - \log_{10}[H^+] = -14 + pH$$

$$pK_b \equiv -\log_{10} K_b - pK_b = -14 + pH + \log_{10}\frac{[R_3NH^+]}{[R_3N]}$$

$$pK_b + pK_a = 14 - pK_b = -(pK_b + pK_a) + pH + \log_{10}\frac{[R_3NH^+]}{[R_3N]}$$

$$\log_{10}\frac{[R_3NH^+]}{[R_3N]} = -pK_b + (pK_b + pK_a) - pH = pK_a - pH$$

$$\frac{[R_3NH^+]}{[R_3N]} = 10^{pK_a-pH}$$

The fraction φ of protonated weak-base amines is calculated as follows:

$$\phi \equiv \frac{[R_3NH^+]}{[R_3N] + [R_3NH^+]}$$

$$\frac{1}{\phi} = \frac{[R_3N] + [R_3NH^+]}{[R_3NH^+]} =$$

$$\frac{[R_3N]}{[R_3NH^+]} = \frac{[R_3NH^+]}{[R_3NH^+]}\frac{[R_3N]}{[R_3NH^+]} + 1 = \frac{1}{10^{pK_a-pH}} + 1$$

$$\phi = \left(\frac{1}{10^{pK_a-pH}} + 1\right)^{-1}$$

$$\phi = (1 + 10^{pH-pK_a})^{-1}$$

Figure 12C:
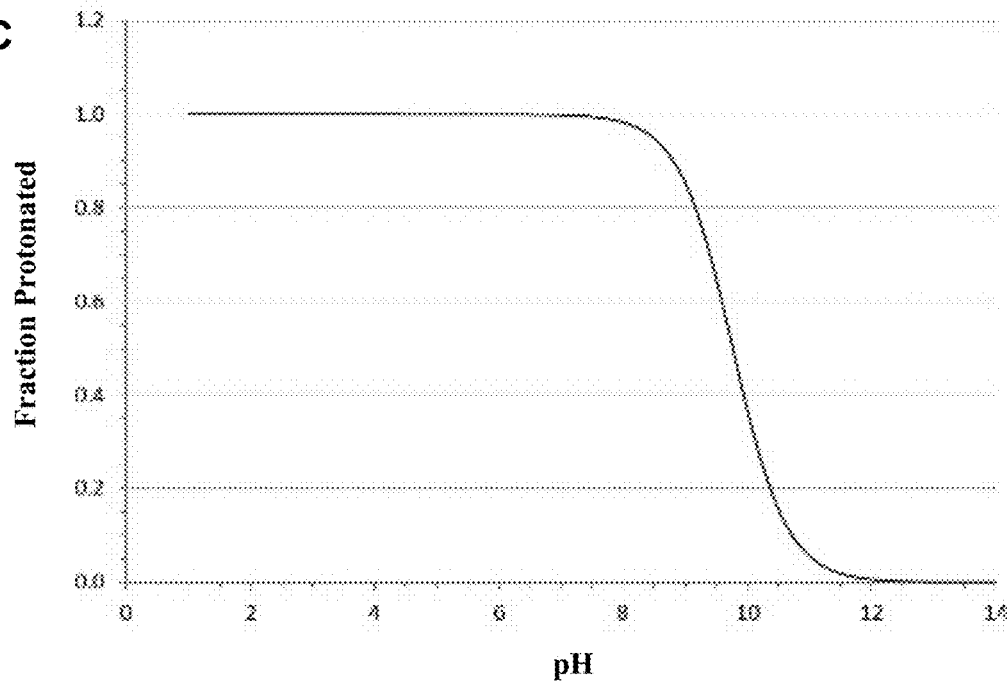
FIG. 12C shows fractions of protonated tertiary amine ($pK_a$=9.77)

FIG. 12C shows that the vast majority of a tertiary amine is protonated below pH 8 (ideal service pH) and is unprotonated above pH 11.5 (ideal regeneration pH).

The ratio of ionized acid to unionized acid is determined from the Henderson Hasselbalch equation $$\frac{[HA]}{[A^-]} = 10^{pK_a - pH}$$

$$\frac{[A^-]}{[HA]} = 10^{pH - pK_a}$$

The fraction (of ionized acid species is calculated as follows:

$$\frac{[A^-]}{[HA]} = 10^{pH - pK_a}$$

$$\Phi \equiv \frac{[A^-]}{[A^-] + [HA]}$$

$$\frac{1}{\Phi} = \frac{[A^-] + [HA]}{[A^-]} = \frac{[A^-]}{[A^-]} + \frac{[HA]}{[A^-]} = 1 + \frac{[HA]}{[A^-]} = 1 + 10^{pK_a - pH}$$

$$\Phi = (1 + 10^{pK_a - pH})^{-1}$$

Figure 12D:
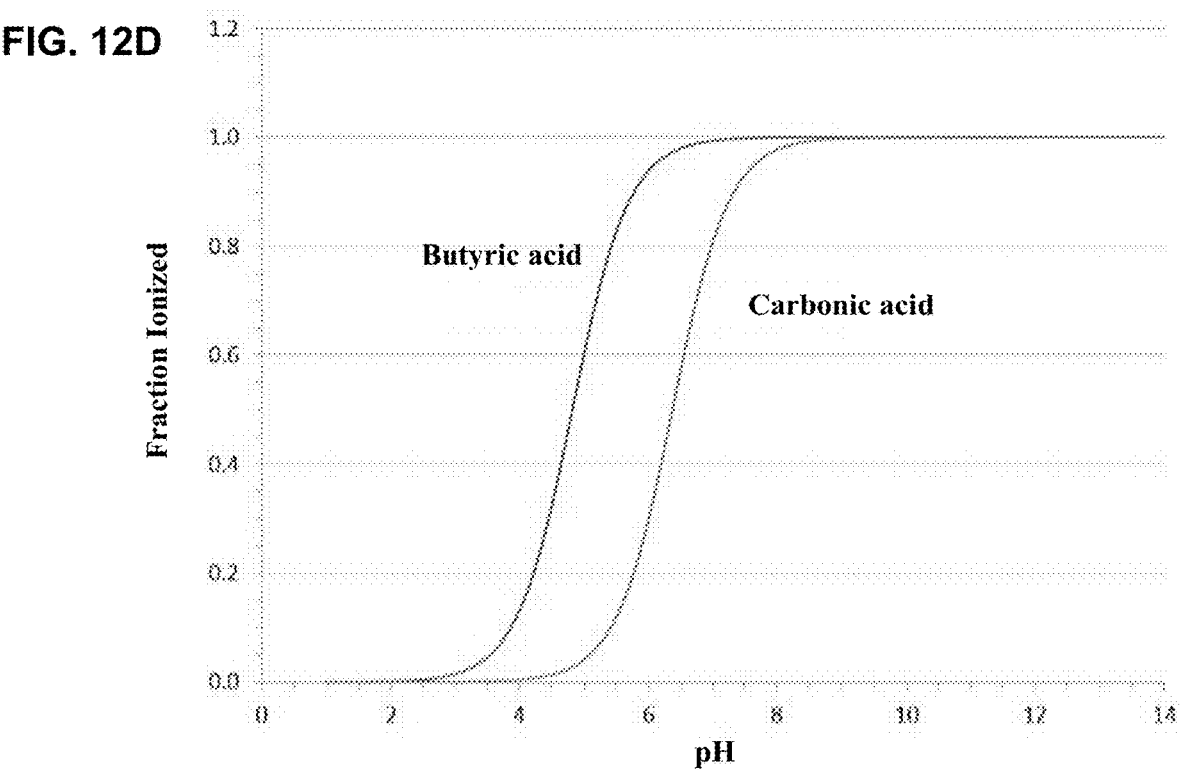
FIG. 12D shows fractions of ionized species for butyric acid ($pK_a$=4.82) and carbonic acid ($pK_a$=6.37)

FIG. 12D shows the fraction of ionized species for butyric acid and carbonic acid as a function of pH. The pH can be regulated by specifying the partial pressure of carbon dioxide (Table 4). From the perspective of the two-step model, the pH is selected based on the following considerations:
1. Must be acidic enough to ensure the weak-base ion exchange resin or liquid extractant is protonated (pH<8, FIG. 12C)
2. Must be alkaline enough to ensure that the carboxylic acid is ionized (pH>5.0, FIG. 12D)
3. The fraction of ionized carboxylic acid must be significantly greater than the fraction of ionized carbonic acid Based on these three considerations of the two-step model, the recommended pH for the extraction is about 5.5. According to the two-step model, below about pH 5.5, the fraction of ionized species is too low (FIG. 12D) to be effective.

Literature Data

Figure 12G:
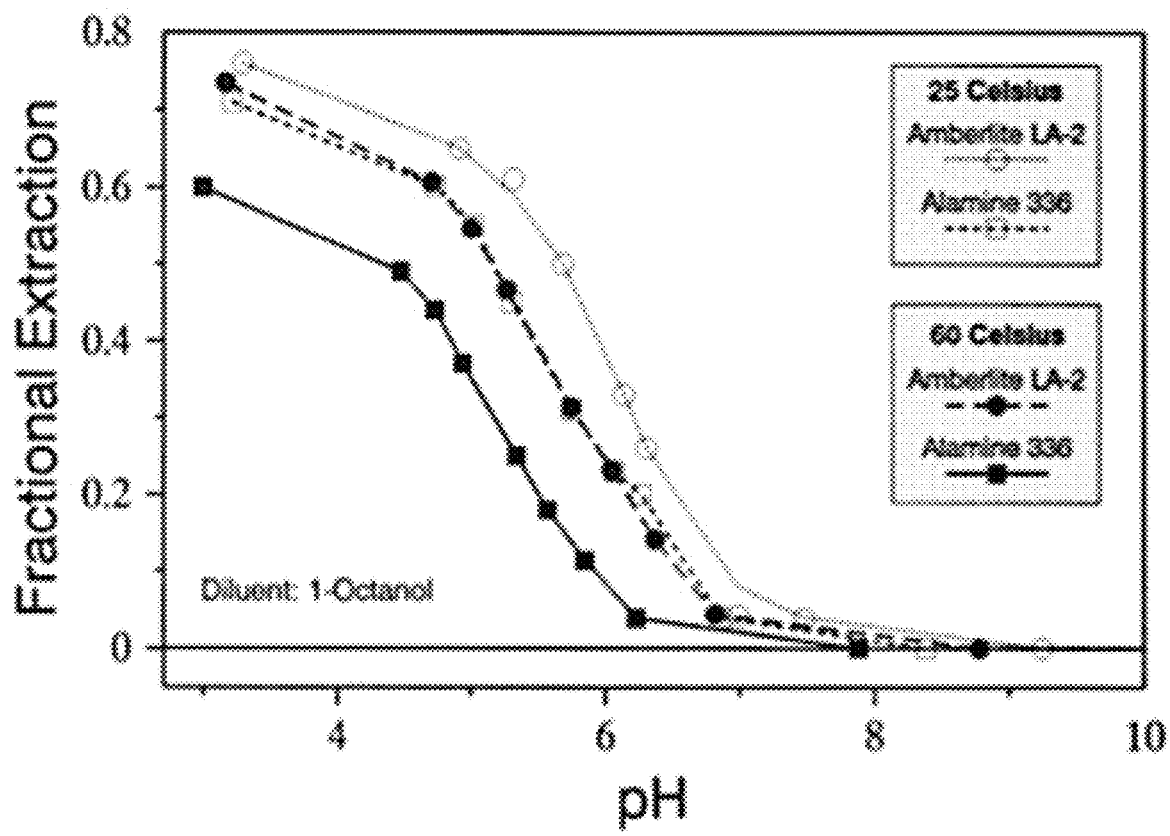
FIG. 12G shows extract of acetic acid by Amberlite LA-2 and Alamine 336 at 25 and 60 C.
Figure 12H:
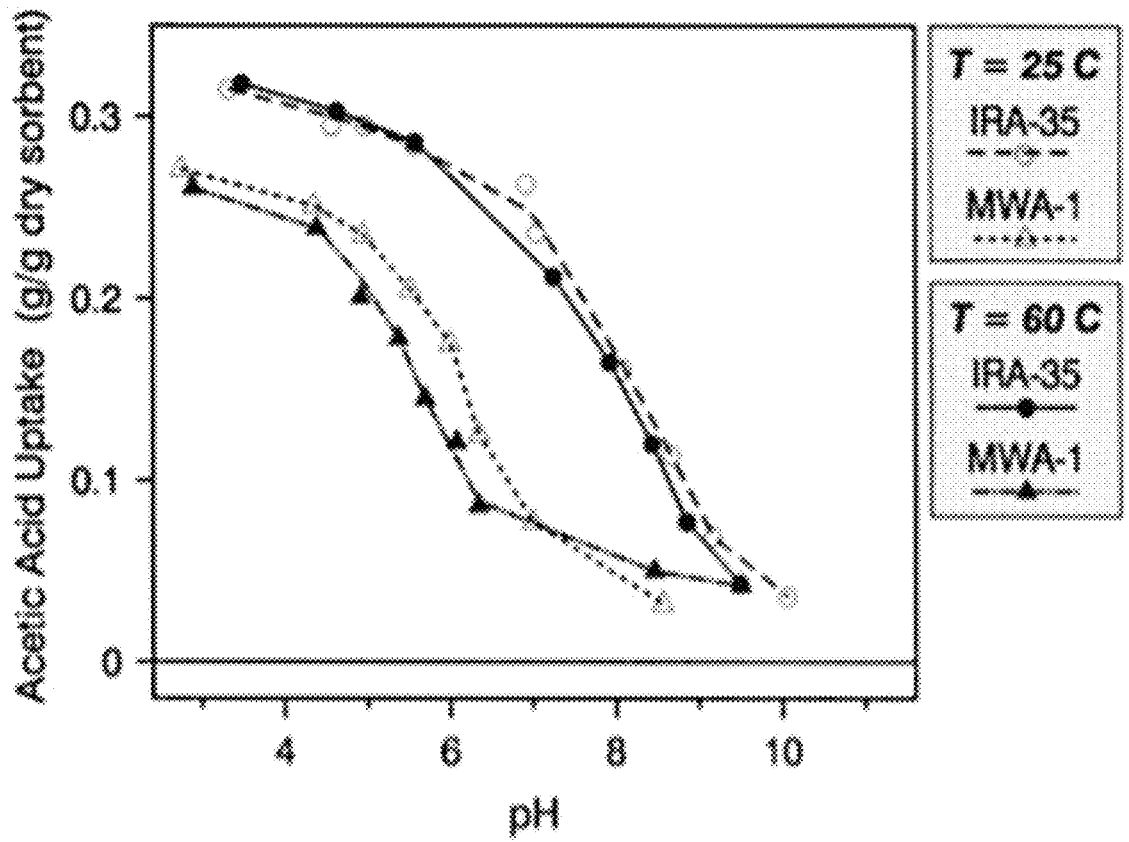
FIG. 12H shows uptake of acetic acid by Dowex MWA-1 and Amberlite IRA-35 at 25 and 60 C.
Figure 121:
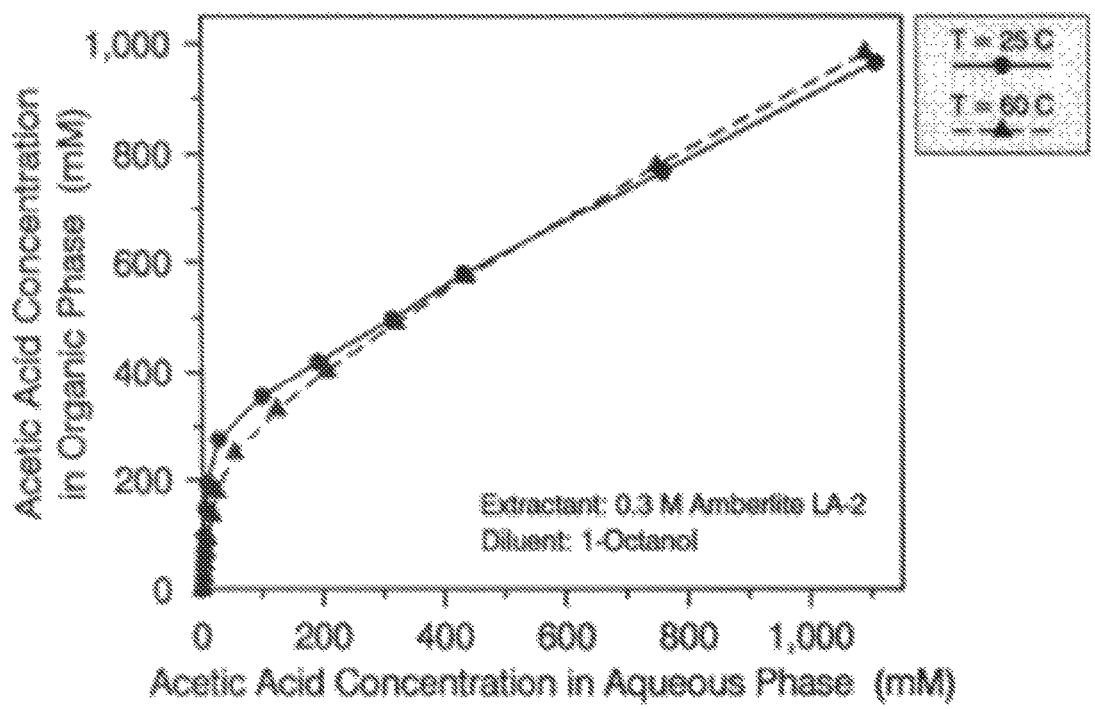
Figure 12J:
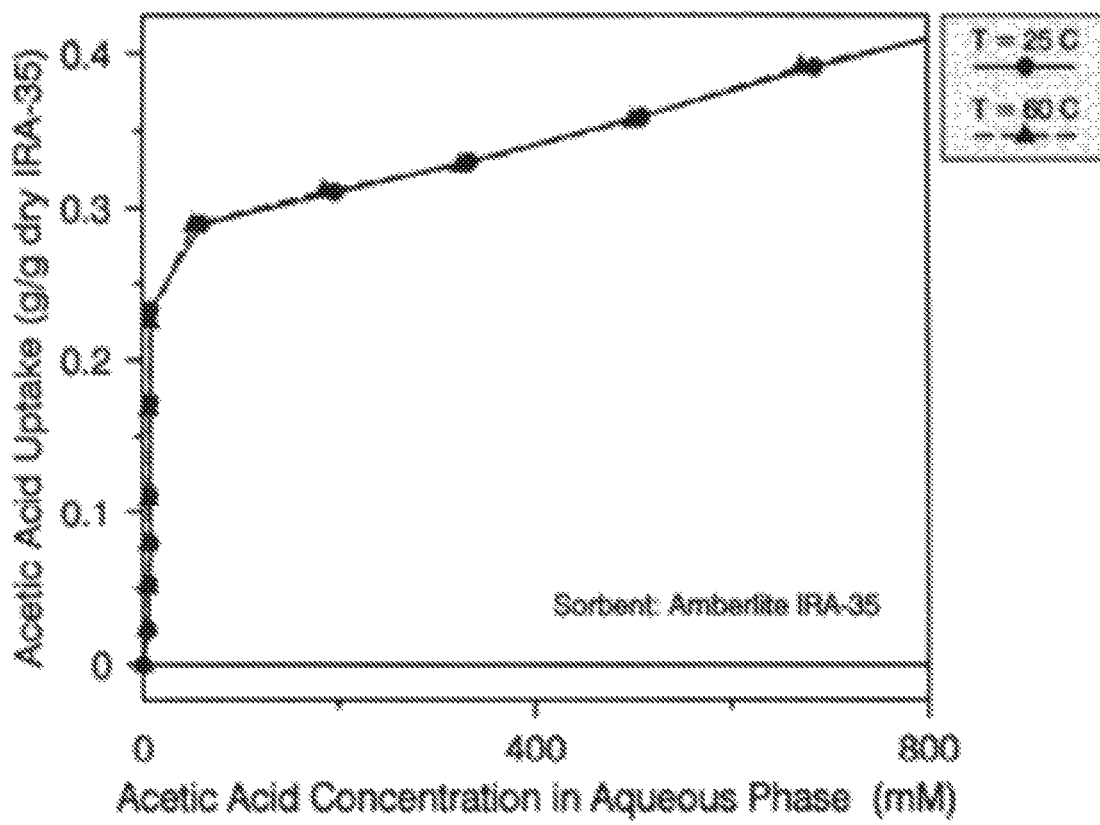
FIG. 12J shows a measured equilibrium relation between sorbent and aqueous phase acetic acid concentrations.
Figure 12K:
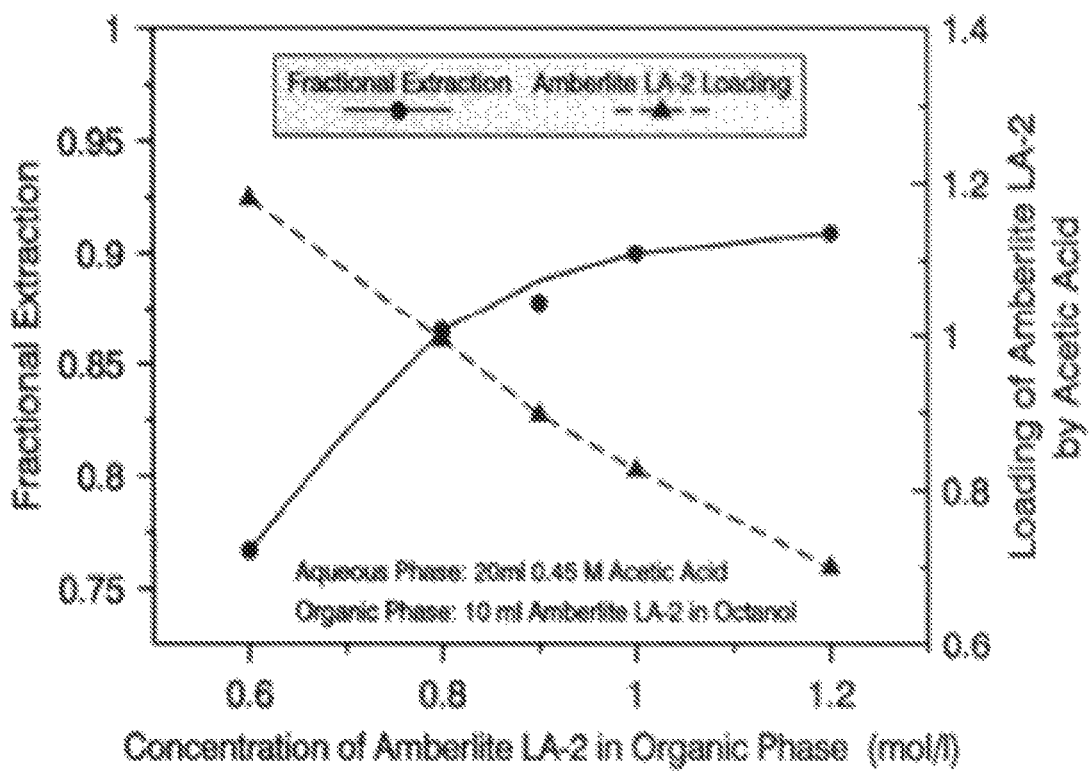
FIG. 12K shows extraction of acetic acids at 25 C by varying concentrations of Amberlite LA-2 in 1-octanol.

FIGS. 12E to 12K show literature data that describes the extraction of acetic acid. The data are presented as follows:

| Operating Parameter | Liquid extractant | Ion-exchange resin |
|---|---|---|
| pH | FIG. 12E | FIG. 12F |
| Temperature | FIG. 12F | FIG. 12H |
| Acid concentration in fermentation broth | FIG. 12I | FIG. 12J |
| Concentration of extractant in liquid | FIG. 12K | — |

A discussion of the operating parameters follows:

pH

FIGS. 12E and 12F show that lower pH increases the fraction extracted. One exception is the chloride form of Amberlite IRA-910; however, this is not of interest because the resin will be regenerated with hydroxide and not chloride. Based on the data in FIGS. 12E and 12F, the following conclusions can be made:
TOPO (trioctylphosphine oxide) has a low loading and requires excessively low pH (~4); therefore, it is not recommended.
Strong-base extractants bind acid too strongly and do not fully regenerate even at high pH, therefore, they are not recommended.
Secondary-amine liquid extractant binds acid slightly more tightly than tertiary-amine liquid extractant.
Amberlite IRA-35 (3° amine) binds acid more strongly than Dowex MWA-1 (3° amine).
Amberlite IRA-35 (3° amine) binds acid at a higher pH than Dowex MWA-1 (3° amine).
Amberlite IRA-35 (3° amine) binds acid at a higher pH than liquid extractants (2° and 3° amine)
For the weak-base ion-exchange resin and liquid extractants, the binding profile is consistent with the one-step model dominating at low pH (<~4) and the two-step model dominating at moderate pH (5 to 8).

It should be noted that the authors of this literature study acknowledge that the fermentation pH should be near-neutral (pH ~7). However, the extraction data show that to achieve good loadings, the extraction pH should be acidic (pH ~5 or less). The authors describe that it would be possible to allow the fermentation to operate at neutral pH and add a mineral acid prior to extraction to lower the pH. However, to avoid the need for adding mineral acids—which are costly and generate waste salt—the authors recommend operating both the fermentation and extraction at a compromise pH of about 6.0. Unfortunately, this slightly acidic pH severely negatively impacts the fermentation, which much prefers neutrality.

An alternative to adding mineral acids prior to the extraction is to adjust the extraction pH by regulating the partial pressure of carbon dioxide in the extraction. This novel approach accomplishes two benefits: (1) carbon dioxide is an inexpensive acid that is easily recovered and does not generate waste salt, and (2) because the carbon dioxide is added in the extractor, it is not necessary to over acidify prior to the extractor.

Temperature

In the tested range (25 to 60 C), FIGS. 12G and 12H show the following effects of temperature:
Among liquid extractants, 2° amines are less affected by temperature than 3° amines.
Ion-exchange resins are largely unaffected by temperature.

Acid Concentration in Fermentation Broth

FIGS. 12I and 12J show the following effects:
For 2° amine liquid extractant, there is a sharp transition at 25-mM acetic acid (1.5 g/L). Below the transition, the slope is very steep and above the transition, the slope is less steep. In all cases in the tested range, binding of acid is enhanced significantly as the acid concentration increases.
For 3° amine ion-exchange resin, there is a sharp transition at about 50-mM acetic acid (3.0 g/L). Below the transition, the slope is very steep and above the transition, the slope is less steep. In all cases in the tested range, binding of acid is enhanced as the acid concentration increases.

Concentration of Extractant in Liquid

At an initial acid concentration of 0.45 M (27 g/L) and 2:1 aqueous:organic phase, FIG. 12K shows the following:
At a concentration of 1.0 mol/L of 2° amine dissolved in octanol, 90% recovery is achieved.
At a concentration of 0.6 mol/L of 2° amine dissolved in octanol, the loading is 120% of stoichiometric.

Achieving greater than 100% stoichiometric is commonly reported in the literature and can be explained by (1) hydrogen bonding of additional acids to the 1:1 complex or (2) dissolution into the octanol solvent.

Recommended Operating Conditions

Compared to 3° amines ($pK_a$=9.77), the data show that 2° amines ($pK_a$=10.73) are preferred because they have higher loading, presumably because they are a stronger base. It is well known that when heated, 2° amines form amides with carboxylic acids, whereas this adverse reaction does not occur with 3° amines.

Based on the analysis of the above data, the following operating conditions are recommended for certain configurations. Although such recommendations are provided, others may also be utilized.

Figure 13:
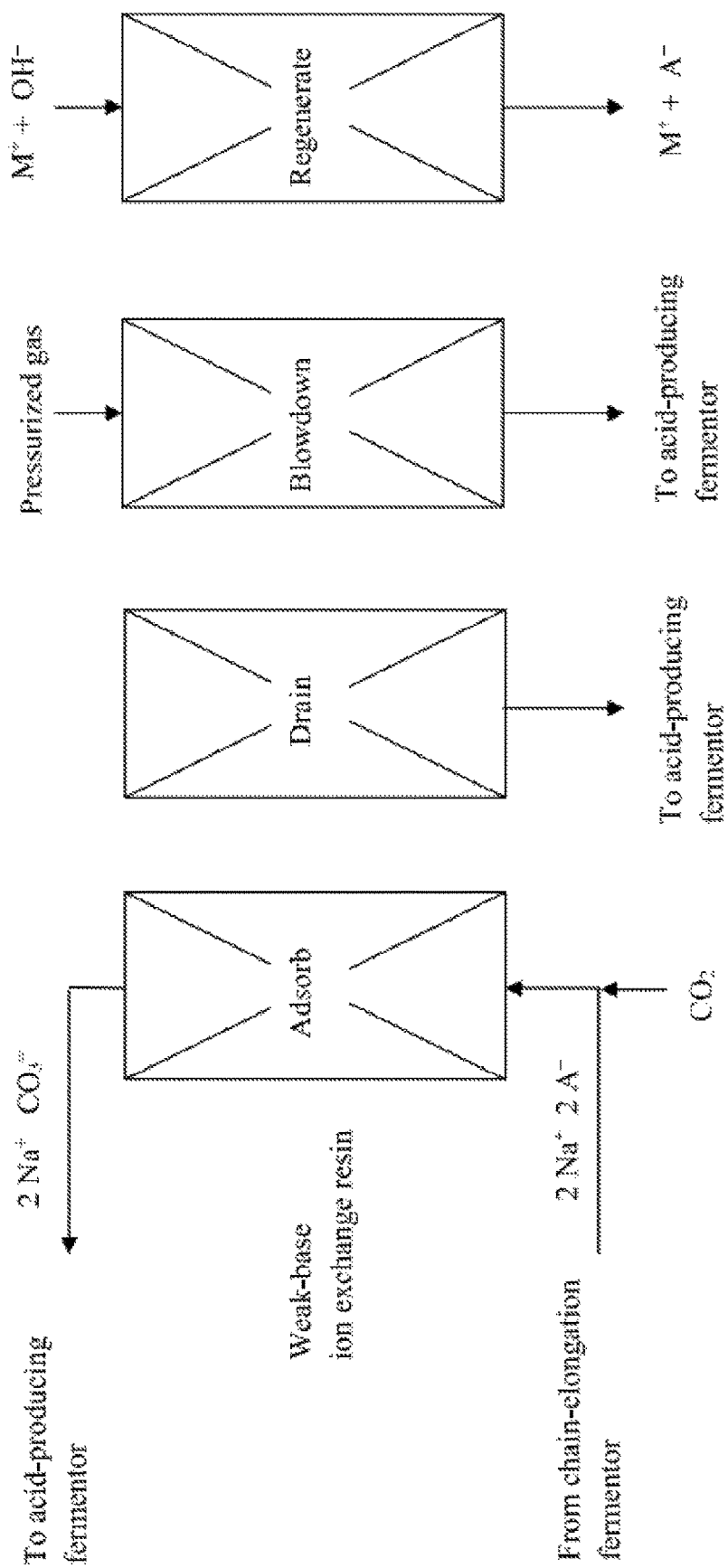
FIG. 13 shows concentration/purification of salts using weak-base ion exchange resins regenerated with hydroxide ions.

Liquid Extractant (No Heating)
  Preferred extractant=2° amine
  Approximate concentration in octanol=1.0 mol/L
  Extraction pH<~5.5
  Extraction temperature=25 to 60° C., with lower temperature slightly preferred
Liquid Extractant (with Heating)
  Preferred extractant=3° amine
  Approximate concentration in octanol=1.0 mol/L
  Extraction pH<~5.0
  Extraction temperature=25 to 60° C., with lower temperature strongly preferred
Ion-Exchange Resin
  Preferred resin=Amberlite IRA-35
  Extraction pH<~7.0
  Extraction temperature=25 to 60° C., with lower temperature only slightly preferred Extraction Schemes FIG. 13 shows an extraction/concentration/purification option that employs weak-base ion-exchange resins. To maintain pH ~5.5, carbon dioxide is added to the ion exchange resin bed; thus, as the carboxylate is removed, it is replaced with carbonate. As shown in Table 4, achieving pH ~5.5 can be achieved with a very low partial pressure of carbon dioxide (less than 1 atm).

Once the resin bed becomes saturated, or nearly saturated, it is taken off-line and the liquid is drained from the column. To remove interstitial water, it can be blown down with pressurized gas, such as air or nitrogen. To regenerate the column, a high-concentration base (e.g., ammonium, sodium, or calcium hydroxide) flushes through the column. After the acids are recovered from the column, the high-concentration base is drained from the column, which is followed by an optional blow-down with pressurized gas. To remove most of the bound carboxylate, the pH of the base should be greater than about 10.5 (FIG. 12C).

The fermentation liquid exiting the ion-exchange resin contains high concentrations of carbonate. The cation is determined by the conditions in the fermentor. FIG. 6A indicates the cations that are best (sodium, potassium), moderate (magnesium, ammonium), and worst (calcium). Ammonium ions will always be present as a nitrogen source for the microorganisms. Biomass sources contain many cations (e.g., potassium, sodium, calcium, magnesium), so a wide variety of cations will be present naturally. Sodium cation can be added from external sources, such as trona ore or sodium hydroxide.

The carbonate solution exiting the ion-exchange resin is returned to the fermentors—predominantly the acid-forming fermentation—as buffer. To increase the pH of the returned stream, the pressure can be reduced to strip dissolved carbon dioxide. If biomass pretreatment is required, a portion of the carbonate solution can be converted to alkali, as described previously.

Figure 14:
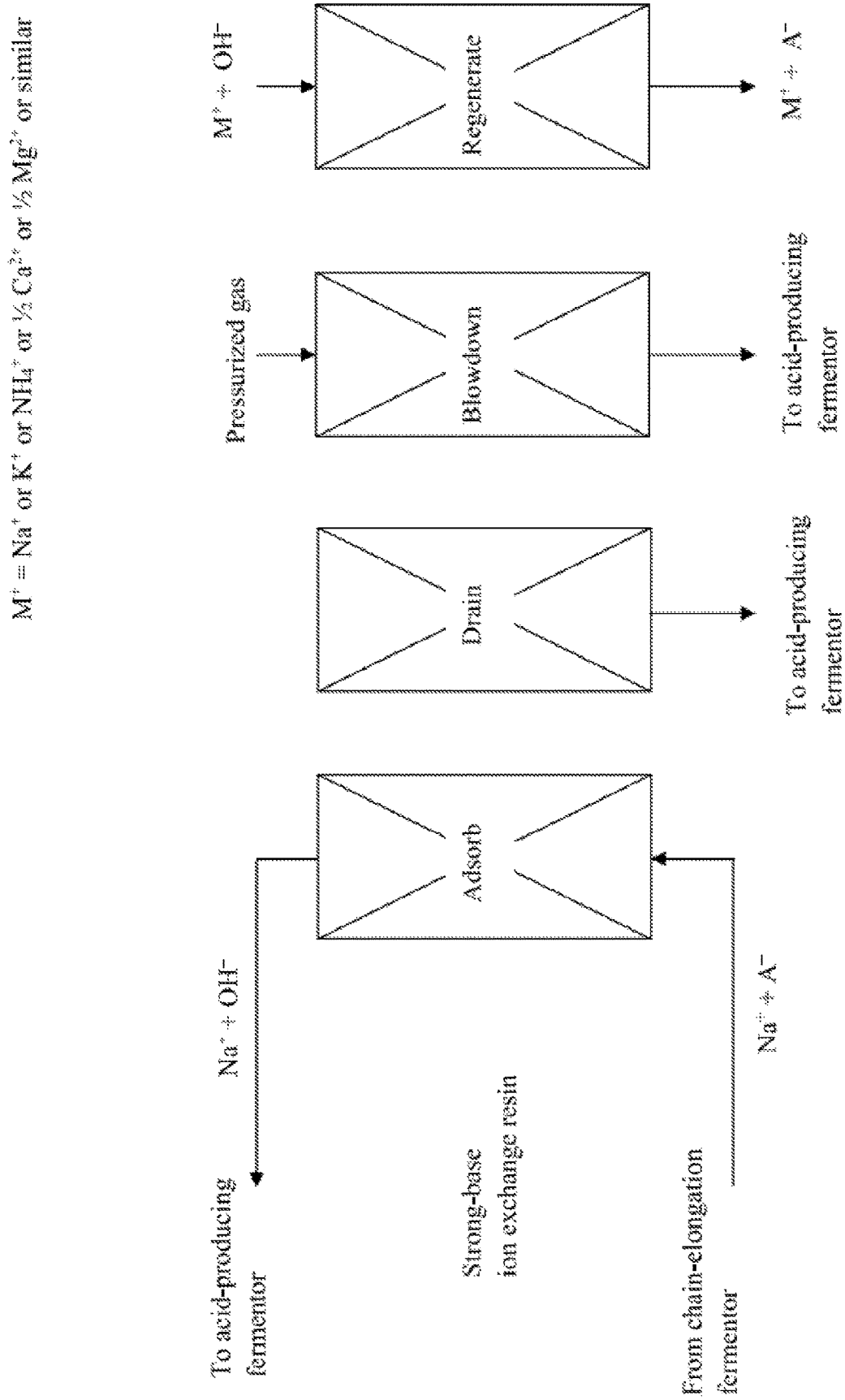
FIG. 14 shows concentration/purification of salts using strong-base ion exchange resins regenerated with hydroxide ions.

FIG. 14 shows acid concentration/purification using strong-base ion-exchange resins. The process is very similar to FIG. 13, except that no carbon dioxide is added during the extraction. The carboxylate anions are replaced with hydroxide anions, which can be returned to the fermentor as buffer or used directly in biomass pretreatment. If used for pretreatment, the hydroxide must be concentrated by appropriate means (e.g., multi-effect evaporator, vapor-compression evaporation, reverse osmosis).

Table 13 shows the capacity of various weak-base and strong-base ion exchange resins.

TABLE 13

| Capacity of weak-base and strong-base ion exchange resins | |
|---|---|
| Resin | Capacity (equivalents/liter) |
| Weak base | 0.8-1.1 |
| Strong base | |
| Polystyrene Type I | |
| Gel | 0.5 |
| Macroporous | 0.36-0.4 |
| Polystyrene Type II | |
| Gel | 0.6-0.72 |
| Macroporous | 0.5-0.58 |
| Polyacrylic Type I | |
| Gel | 0.5-0.65 |
| Macroporous | — |

Figure 15:
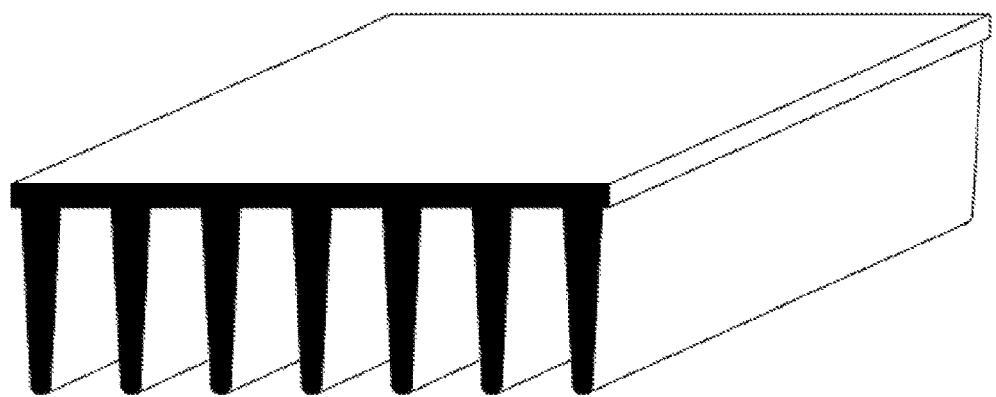
FIG. 15 shows a casting of ion exchange resin into a high-surface-area geometry.
Figure 16:
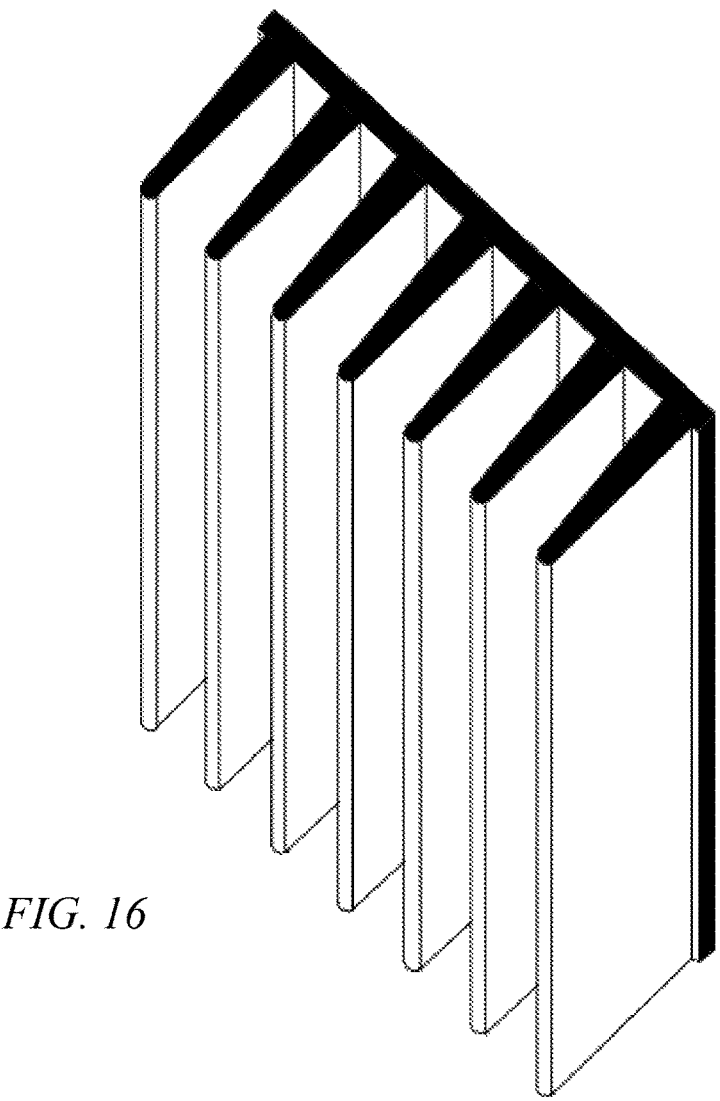
FIG. 16 shows a high-surface-area ion exchange resin mounted vertically.
Figure 17:
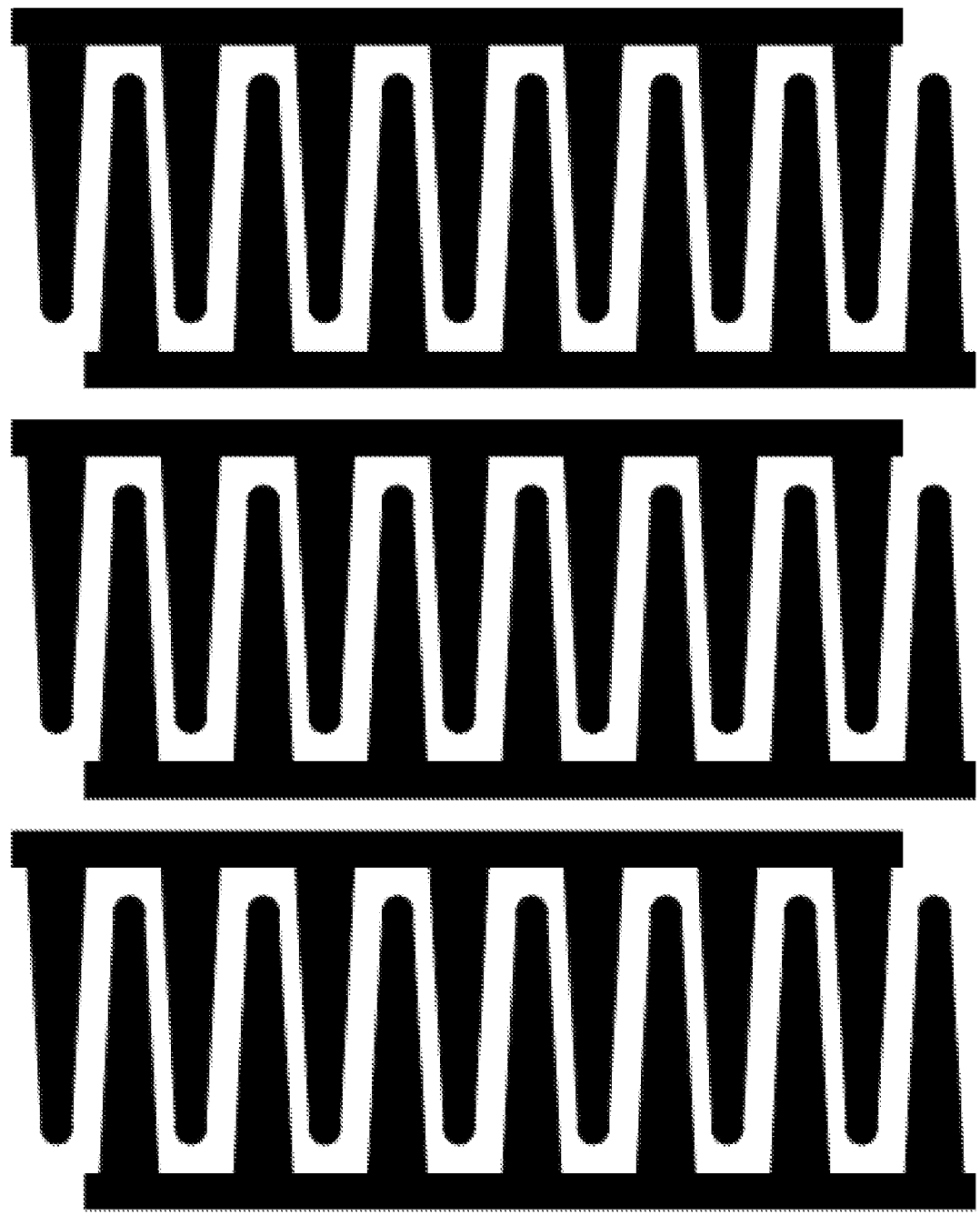
FIG. 17 shows interleafing of high-surface-area ion exchange resins.

Traditionally, ion-exchange resins are formed into small beads that are dump packed into a column. This approach has a number of disadvantages:
  Beads are readily broken from abrasion and swelling, and therefore must be replaced periodically
  Beads entrap solid particles, which requires the filtered fermentation broth to be substantially free of solids and debris
  When drained, beads hold up water, which will dilute the recovered product
  Beads have a lot of pressure drop The above problems with dump-packed beads can be solved by using a structured packing. As shown in FIG. 15, the resins can be cast into a shape with projections that give high surface area and strength. When mounted vertically (FIG. 16), the projections can be arranged so there is tight spacing through which the liquid flows (FIG. 17).

Figure 18:
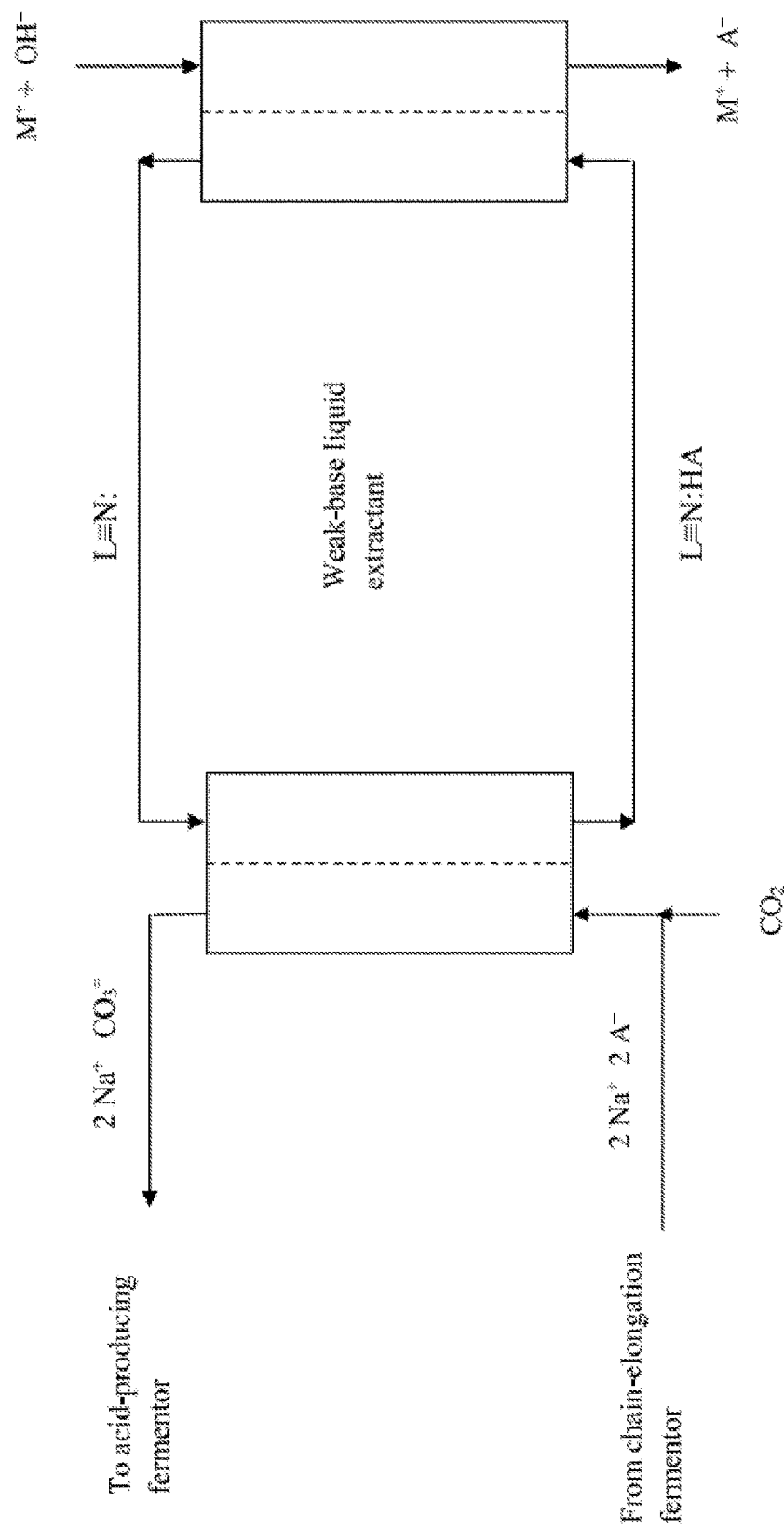
FIG. 18 shows concentration/purification of fermentation salts using a weak-base liquid extractant.

FIG. 18 shows salt concentration/purification using a weak-base liquid extractant. The process is analogous to the one shown in FIG. 13, except the solid weak-base ion-exchange resin is replaced with a weak-base liquid extractant.

Figure 19A:
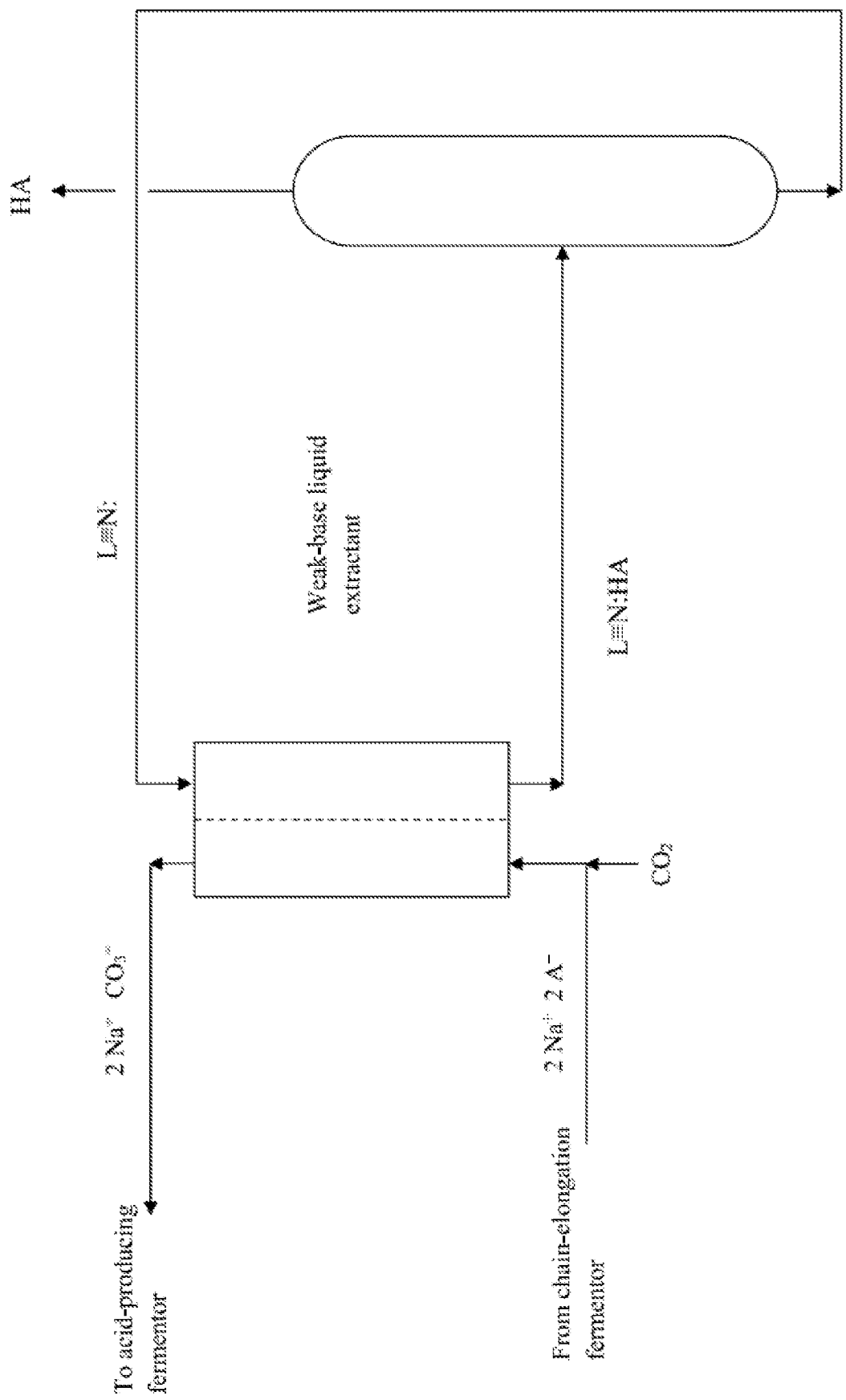
FIG. 19A shows recovery of fermentation acids using a weak-base liquid extractant. The absorbed acid is directly recovered by evaporation or distillation.

FIG. 19A shows acid recovery using a weak-base liquid extractant in which the adsorbed acid is separated from the extractant by evaporation or distillation. At 1 atm pressure, approximately 170° C. is required to free the acid from the weak-base liquid extractant. To reduce the evaporation or distillation temperature, the pressure is reduced. To prevent oxidative destruction, an oxygen scavenger can be employed. Examples include tannins (Accepta 2812, Accepta 2899), natural organic compounds (Accepta 2603), and hydrophobic oxygen scavengers (Brizon Inc.). A particularly attractive oxygen scavenger is diethylhydroxylamine (DEHA) which reacts with oxygen according to the following chemistry

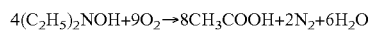
$$4(C_2H_5)_2NOH+9O_2\rightarrow 8CH_3COOH+2N_2+6H_2O$$

The reactant is an amine, which is compatible with the weak-base liquid extractant. The product is acetic acid, which is compatible with the product stream.

Figure 19B:
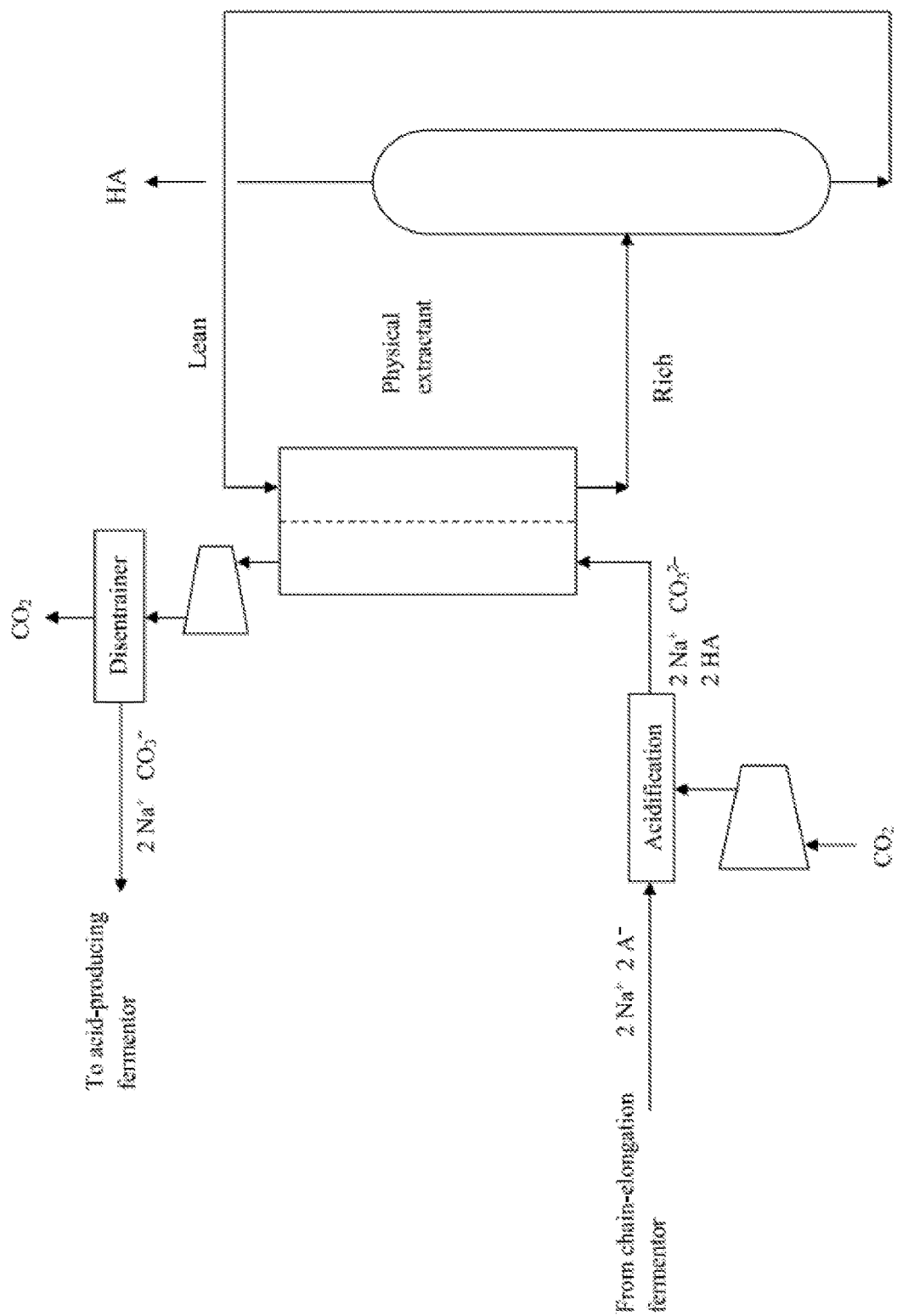
FIG. 19B shows recovery of fermentation acids using a physical extractant whereby the absorbed acid is recovered by evaporation or distillation.

FIG. 19B shows acid recovery using a physical extractant. The partial pressure of carbon dioxide is increased (~10 atm), which acidifies the pH to about 3.4. The $pK_a$ for carboxylic acids is about 4.8, so the Henderson Hasselbalch equation indicates that 4% of the acid will be dissociated ($A^-$) and 96% will be undissociated (HA). The physical extractant (Table 5) is selected to absorb undissociated acids from the fermentation broth. The absorbed acid is separated from the extractant by evaporation or distillation. To reduce the evaporation or distillation temperature, the pressure is reduced. An expander can be used to recover energy from the high-pressure liquid exiting the extractor.

Figure 19C:
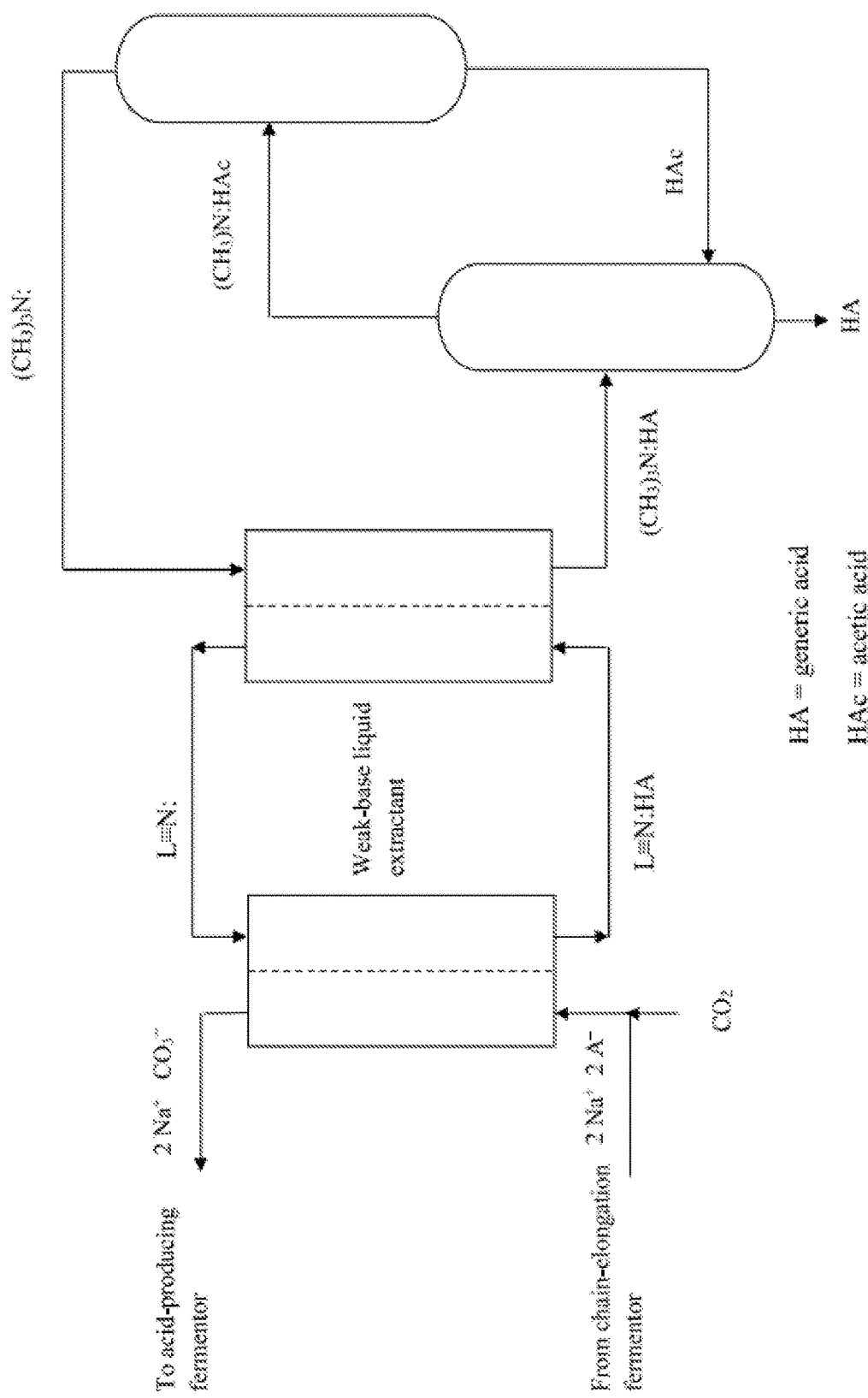
FIG. 19C shows recovery of fermentation acids using a weak-base liquid extractant whereby the absorbed acid is indirectly recovered by distillation.

FIG. 19C shows an extraction method in which the absorbed acids are recovered indirectly via distillation. In this embodiment, the mixed acids that were absorbed to the weak-base liquid extractant are recovered into an alkaline aqueous solution of a concentrated low-molecular-weight (LMW) tertiary amine (e.g., trimethyl amine, methyl diethyl amine, ethyl dimethyl amine, triethyl amine). Tertiary amines are selected because the tertiary amine is chemically stable whereas other amines are reactive and can produce undesired degradation products. The extracted products are sent to a reactive distillation column to which a light acid is added. (See Table 14 for normal boiling points.) In principle, formic acid could be used; however, it tends to be unstable so acetic acid is preferred. The acetic acid is added in sufficient quantity that it exceeds the stoichiometric amount of LMW amine in the distillation column and therefore can replace the mixed acids. In essence, acetic acid switches with the other acids that are present. Being more volatile, acetic acid travels to the top of the reactive distillation column and carries the volatile LMW tertiary amine with it. The LMW tertiary amine acetate is sent to another distillation column that operates at sufficiently high temperature (~170° C.) that the amine/acid complex cracks allowing LMW amine to exit the top of the column and acetic acid to exit the bottom of the column. The LMW amine is recycled to the extractor.

TABLE 14

Normal boiling points

| Carboxylic Acids | Amine Carboxylates | Amines | $T_b$ (° C.) |
|---|---|---|---|
| | | Trimethylamine | 2.9 |
| | Trimethylammonium acetate | | 77.9 (est) |
| | | Triethylamine | 89.5 |
| C1-Formic acid | | | 101 |
| C2-Acetic acid | | | 118 |
| C3-Propanoic acid | | | 141 |
| C4-Butanoic acid | | | 164 |
| | Triethylammonium acetate | | 164.5 |
| C5-Pentanoic | | | 186 |
| C6-Hexanoic | | | 205 |
| C-Heptanoic | | | 223 |
| C8-Octanoic | | | 239 |

Figure 20:
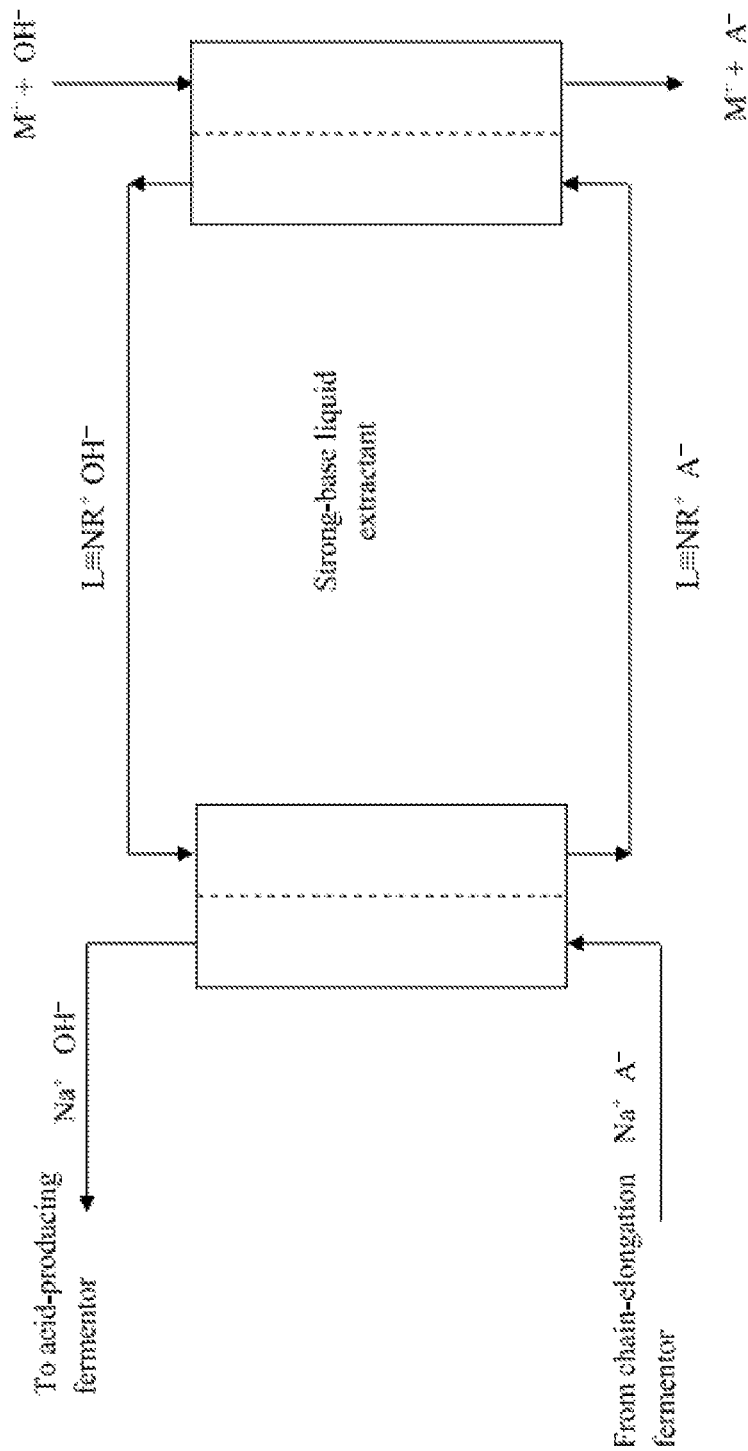
FIG. 20 shows concentration/purification of fermentation salts using a strong-base liquid extractant.

FIG. 20 shows salt concentration/purification using a strong-base liquid extractant. The process is analogous to the one shown in FIG. 14, except the solid strong-base ion-exchange resin is replaced with a strong-base liquid extractant.

The extractions can occur by traditional means, such as direct contact between the aqueous fermentation broth and an immiscible liquid extractant.

Figure 21:
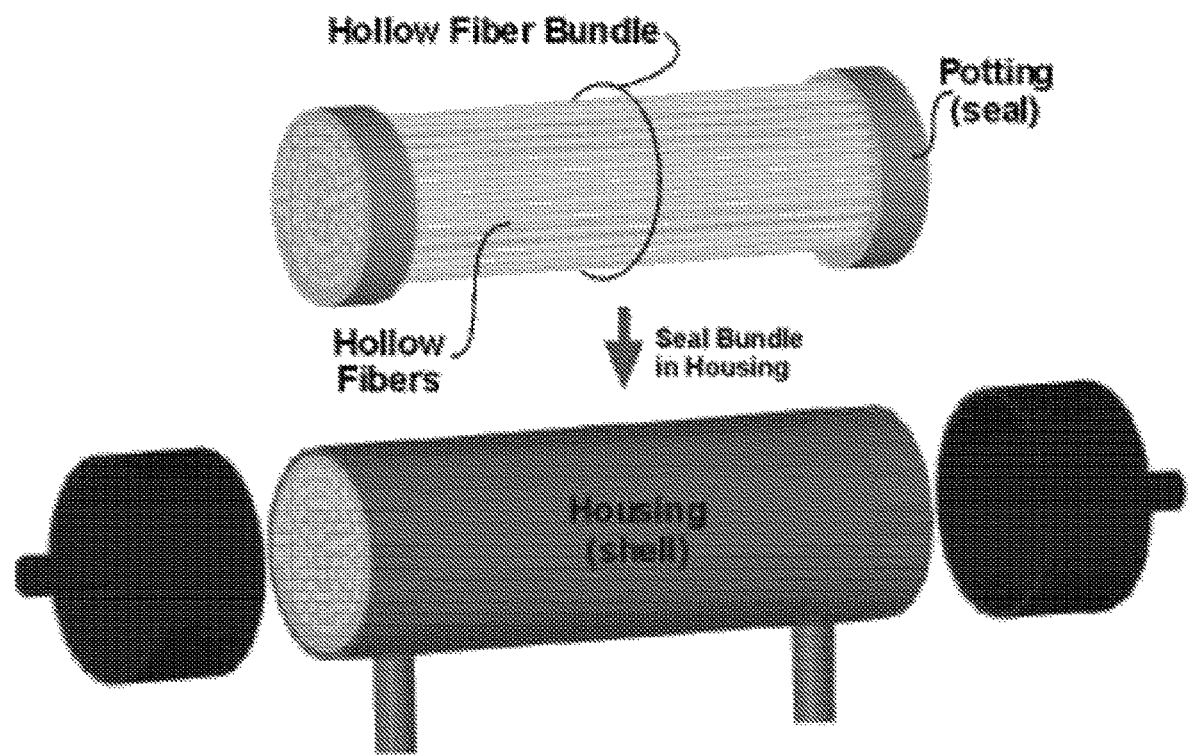
FIG. 21 shows hollow-fiber membrane extractor.

Alternatively, more advanced methods can be employed, such as extractors that employ hollow-fiber membranes (FIG. 21). Membrane extractors have some practical advantages such as very high surface area in a small volume. Further, the membranes can exclude particles and contaminants, which reduces the amount of pre-conditioning required prior to the extraction.

In principle, any type of membrane could be employed; however, a preferred embodiment employs hollow fiber membranes because they have a large amount of surface area per unit volume. The membrane material must satisfy the following conditions:
Resist fouling
Insoluble in the solvent (e.g., liquid high-molecular-weight amine, phosphine oxide dissolved in hydrocarbon carrier)
Resist degradation by enzymes or microorganisms
Cleanable using solvents
Thin walls for rapid mass transfer
Formed with controllable pores that retain solvent on the inside and water on the outside
Some examples of candidate membrane materials follow:
Teflon (PTFE, polytetrafluoroethylene)
Markel
Biogeneral
Polyvinylidene Difluoride (PVDF)
Spectrum Laboratories
Polypropylene
Spectrum Laboratories
Polysulfone/Polvethersulfone
Spectrum Laboratories
Polyester
Spectrum Laboratories FIG. 22 shows yet another alternative is to incorporate the extractant into micelles that are surrounded by surfactant.

Chemical Conversion

Figure 23:
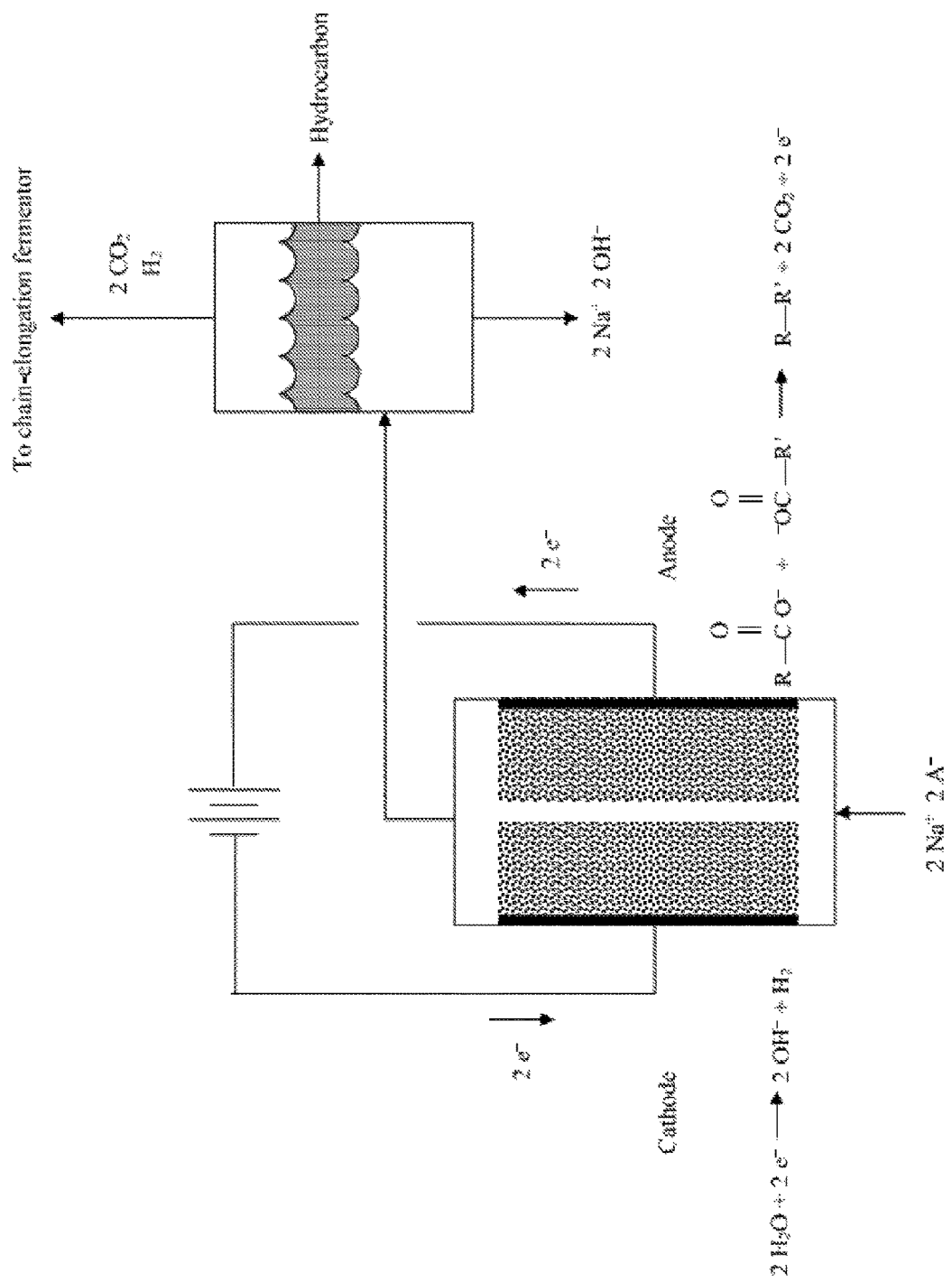
FIG. 23 shows Kolbe electrolysis.

FIG. 23 shows Kolbe electrolysis, which converts carboxylic acids and their carboxylate salts to hydrocarbons, carbon dioxide, and hydrogen. Theoretically, the reaction is exergonic meaning the products have less Gibbs free energy than the reactants; thus, the reaction has the potential to produce electricity. In practice, the reaction requires input of electrical energy to overcome voltage gradients at the electrode surface.

For Kolbe electrolysis, the amount of electricity input can be reduced by employing electrodes with an extremely high surface area, such as foamed nickel. The electrode surface can be coated with appropriate catalyst, such as platinum. Such electrodes have been developed for water hydrolysis and can be adapted to Kolbe electrolysis. Examples of such electrodes have been developed by Robert B. Dopp of DoppStein Enterprises, Inc. and are marketed under the trade name Gridshift 3D Coated Electrodes.

A further benefit of reducing the electrode voltage is that it reduces the probability of producing non-hydrocarbon byproducts, such as esters and alcohols.

Figure 24:
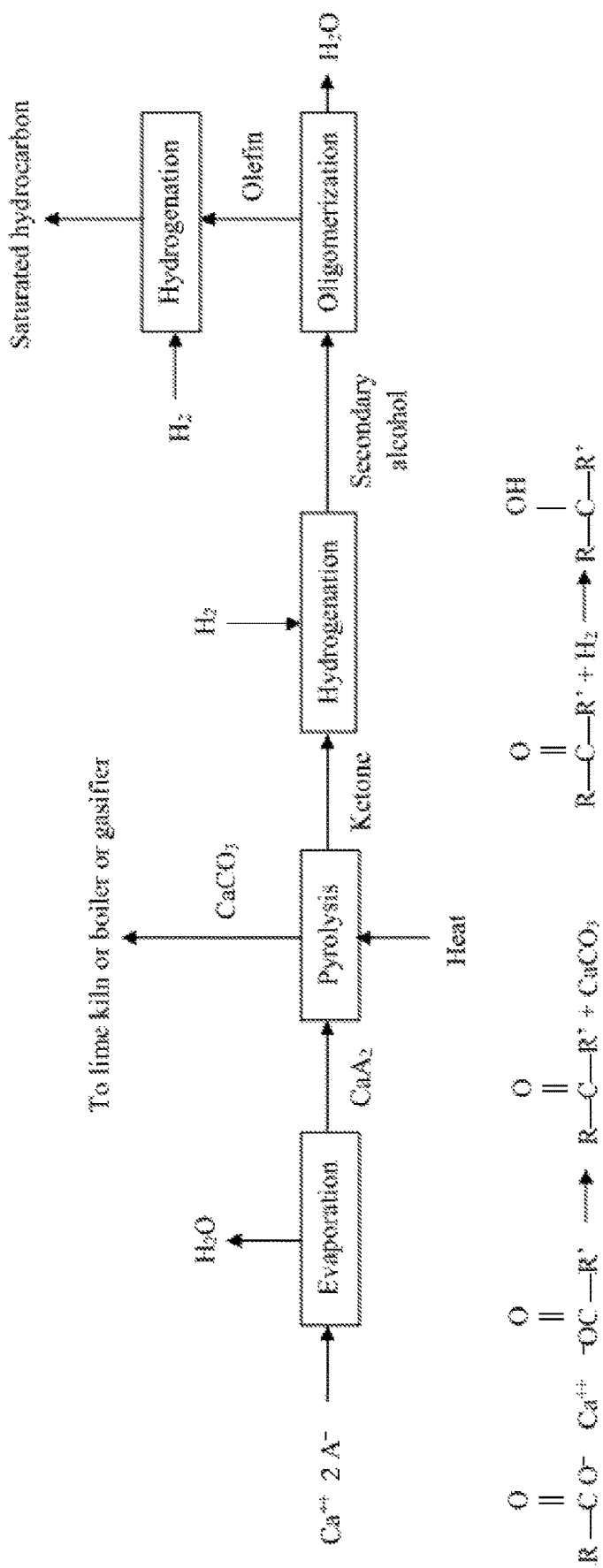
FIG. 24 shows hydrocarbons via pyrolysis of calcium carboxylate.

FIG. 24 shows an alternative embodiment where the ion-exchange resin or extractant is regenerated using a divalent base, such as calcium or magnesium hydroxide. The solution is concentrated by evaporation. If desired, the salts can be fractionated during the evaporation process; high-molecular-weight salts are less soluble and precipitate before low-molecular-weight salts. The resulting carboxylate salt is pyrolyzed at temperatures of approximately 400°

C., which produces ketones. Divalent cations are preferred to monovalent cations because ketone yields are higher. The ketones can be hydrogenated to alcohols using an appropriate catalyst (e.g., Raney nickel), which can then be oligomerized using a zeolite (e.g., ZSM-5, Beta) to olefins. Finally, the olefins can be hydrogenated to paraffins.

Figure 25:
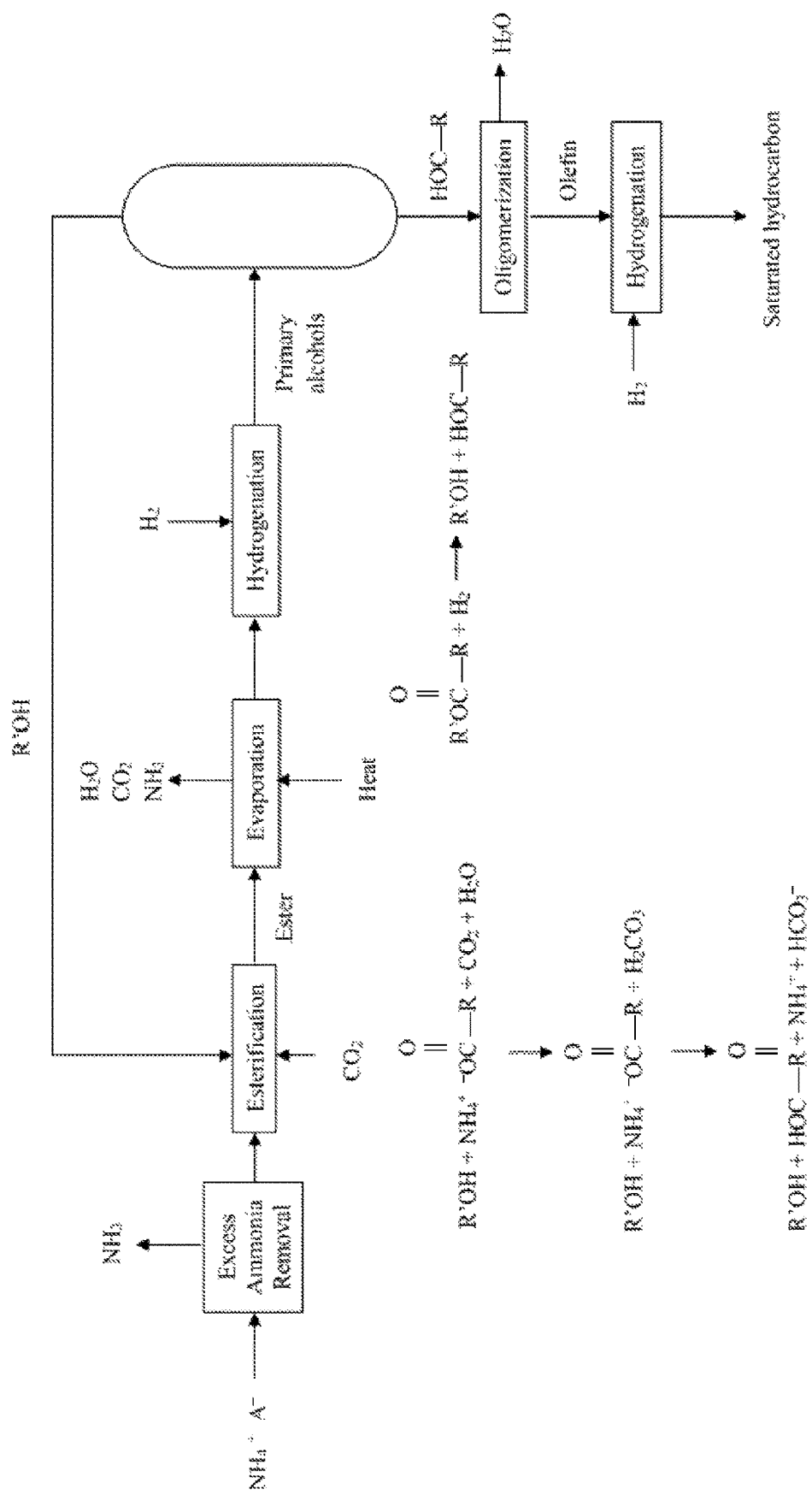
FIG. 25 shows hydrocarbons via esterification of ammonium carboxylate.

FIG. 25 show an alternative embodiment where the ion-exchanger resin or extractant is regenerated using ammonium hydroxide to form ammonium carboxylate. The ammonia can be replaced with an amine. Preferably, a 3° amine is employed to prevent formation of amides at high temperature. The 3° amine must be volatile so it is easily recovered. Examples include trimethyl amine, trieethyl amine, and similar.) First, excess ammonia is removed using an appropriate method, such as pulling vacuum or steam stripping. Then, to lower the pH, an acid is added. Any number of acids could be added (e.g., acetic, sulfuric, hydrochloric, p-toluenesulfonic acid); however, carbon dioxide is preferred because it is inexpensive and easily recovered. Using an acid catalyst, the resulting carboxylic acid reacts with an alcohol to form an ester. The resulting carbon dioxide, water, and ammonia are removed. If desired, the ammonia/water solution can be distilled (not shown) to concentrate the ammonia for recycle. Ideally, the alcohol has a low molecular weight (e.g., methanol, ethanol), which makes it volatile and readily recycled. The ester is hydrogenated using an appropriate catalyst (e.g., Raney nickel, platinum) to form two alcohols. Via distillation, the low-molecular-weight alcohol is separated and recycled. The high-molecular-weight primary alcohols may be further oligomerized using an appropriate zeolite catalyst (e.g., ZSM-5, Beta) to form olefins. Finally, the olefins can be hydrogenated to form saturated hydrocarbons.

Figure 26:
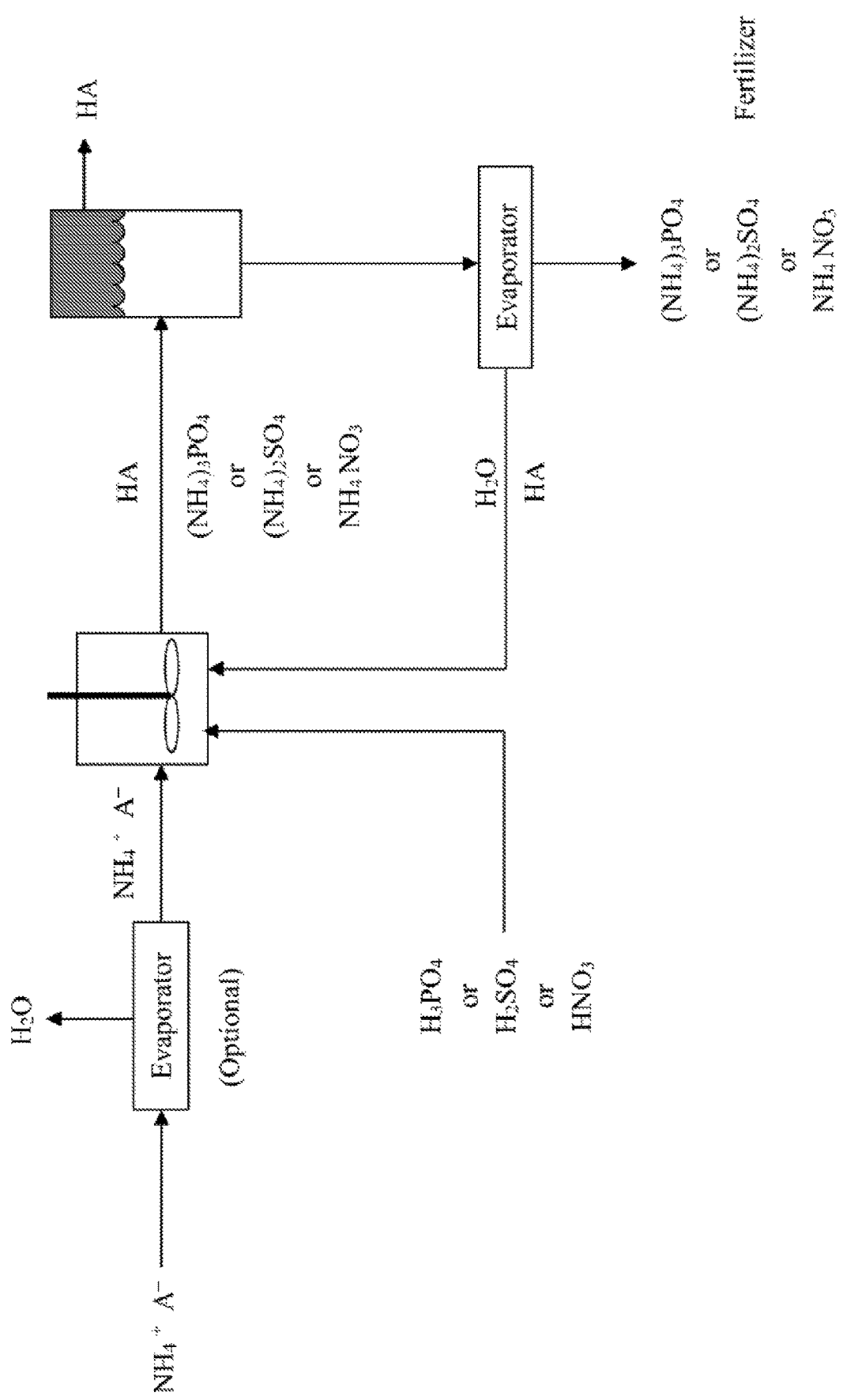
FIG. 26 show fertilizer production from ammonium carboxylate.

FIG. 26 shows an alternative embodiment where the ion-exchanger resin or extractant is regenerated using ammonium hydroxide to form ammonium carboxylate. Optionally, the ammonium carboxylate is concentrated by suitable means, such as evaporation. Then, concentrated acid (e.g., nitric, sulfuric, phosphoric) is added, which reacts with ammonia to form fertilizer (e.g., ammonium nitrate, sulfate, or phosphate). The fertilizer is concentrated and sold to the market. During the concentration step, MCFAs form a separate phase that absorbs SCFAs. Because ammonia is consumed in the reaction, it must be supplied from an external source.

Figure 27A:
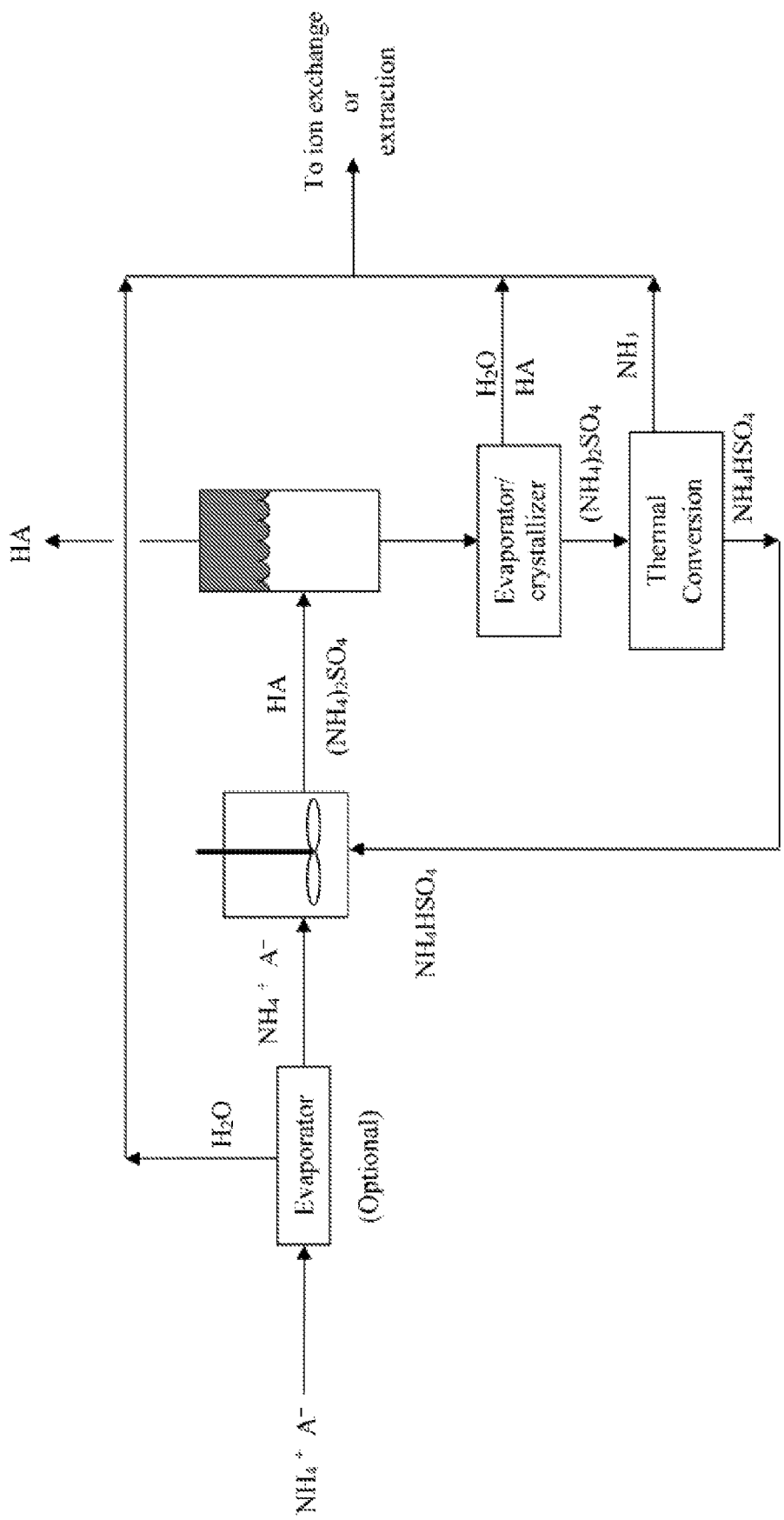
FIG. 27A shows carboxylic acid production using multivalent ammonium salts (ammonium sulfate)
Figure 27B:
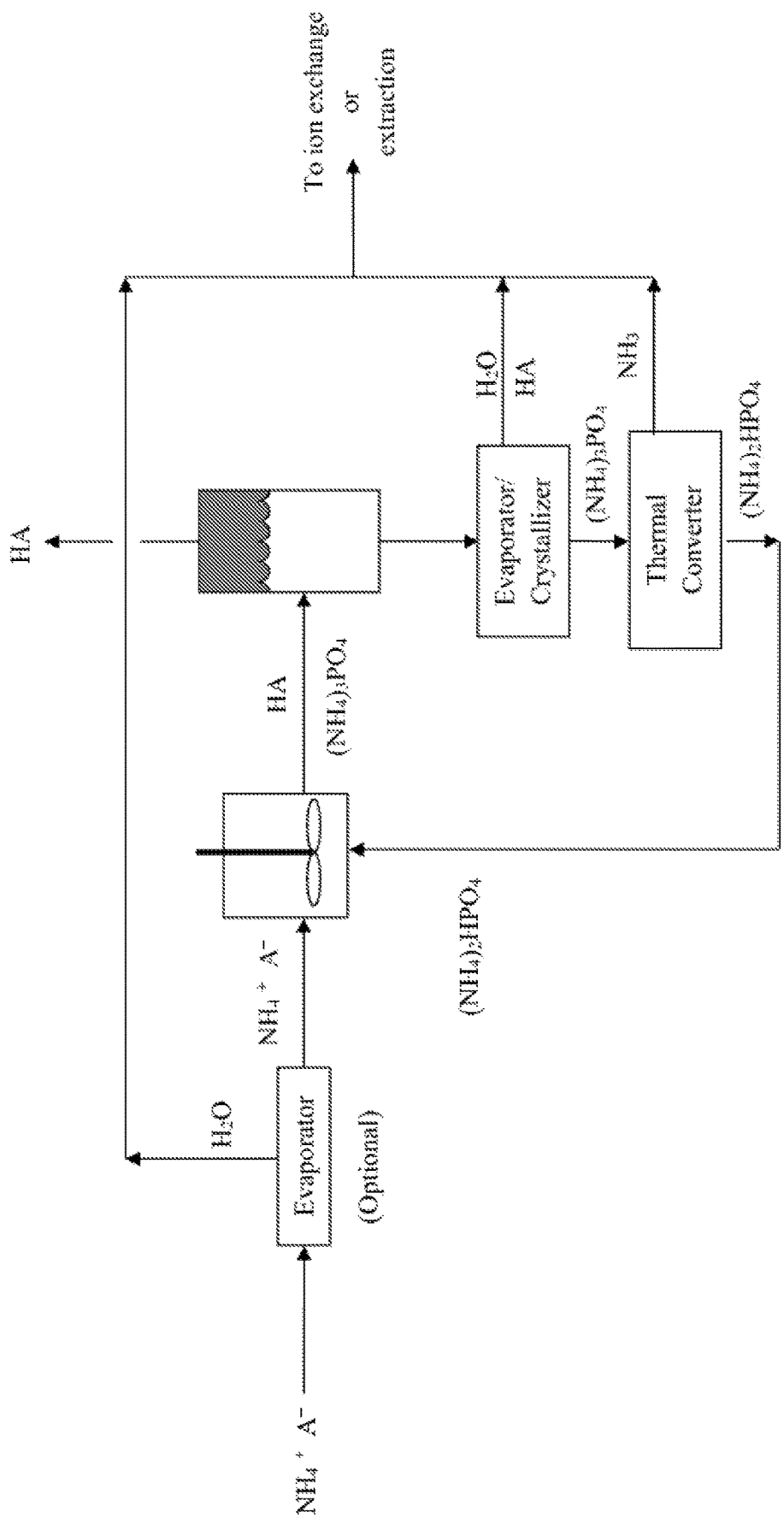
FIG. 27B shows carboxylic acid production using multivalent ammonium salts (ammonium phosphate)

FIGS. 27A and 27B show an alternative embodiment where the ion-exchanger resin or extractant is regenerated using ammonium hydroxide to form ammonium carboxylate. Optionally, the ammonium carboxylate is concentrated by suitable means, such as evaporation. The ammonium carboxylate is contacted with a multi-valent acid (e.g., sulfuric, phosphoric) that has at least one hydrogen cation. The pH of the solution is acidic which causes MCFAs to form a separate phase that absorbs SCFAs. The resulting ammonium salt is concentrated by suitable means, such as evaporation. Then, the ammonium salt is heated to a suitable temperature, which drives off ammonia that can be recycled to regenerate the ion-exchange resin or extractant. The resulting concentrated salt is recycled to acidify the ammonium carboxylate solution. Decomposition temperatures for various candidates follow:

| | |
|---|---|
| $(NH_4)_3PO_4$ | >25° C. |
| $(NH_4)_2HPO_4$ | >155° C. |
| $(NH_4)H_2PO_4$ | >200° C. |
| $(NH_4)_2SO_4$ | >250° C. |

Figure 27C:
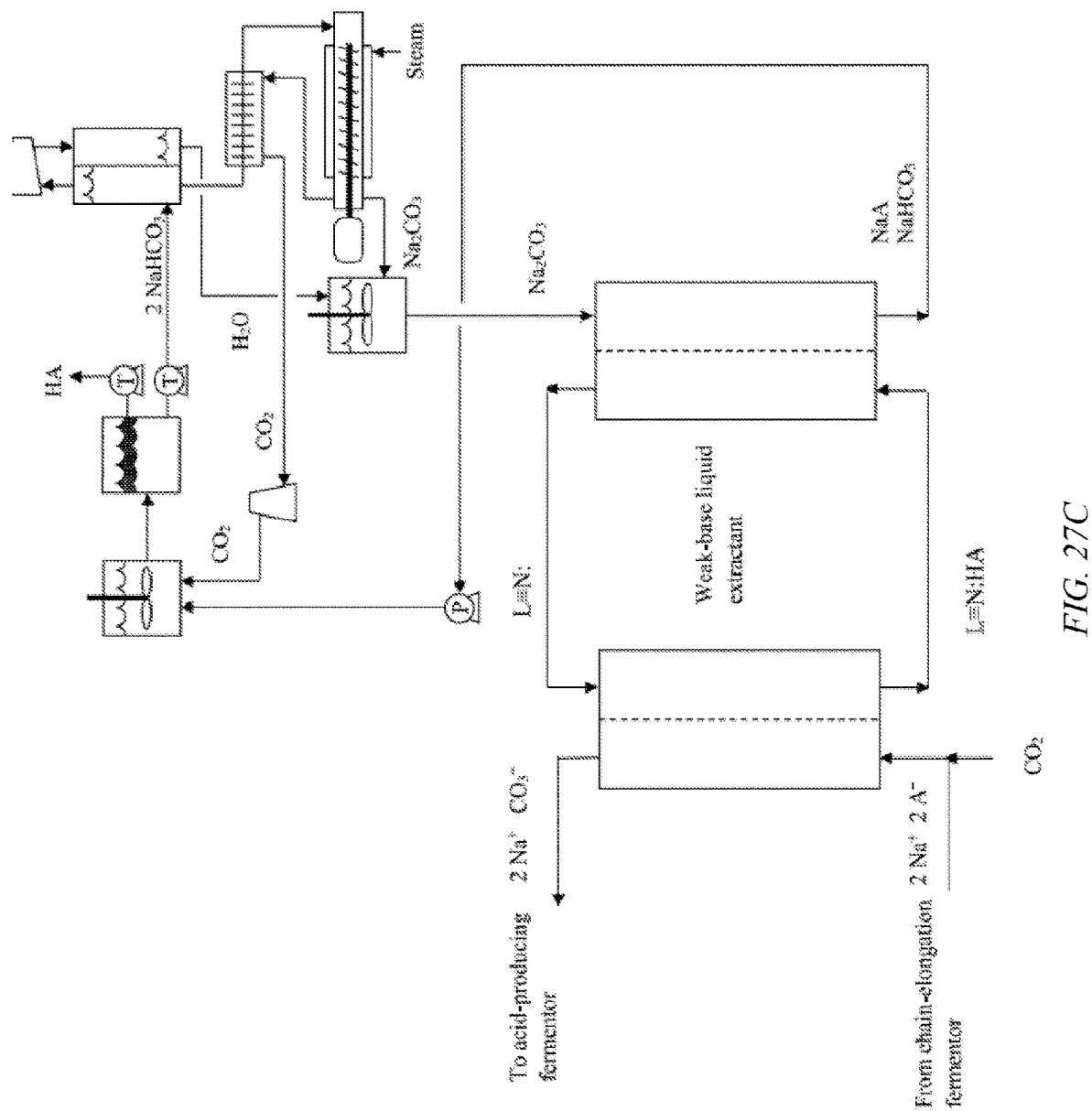
FIG. 27C shows carboxylic acid production using sodium carbonate/bicarbonate shift.

FIG. 27C shows the production of carboxylic acids from the carboxylate salts in the fermentation broth. In this example, liquid extraction is used to remove carboxylates, but ion exchange could be used as well. In the regeneration cycle, alkalinity is provided by sodium carbonate. Sodium carbonate is very soluble in water (~500 g/L) and a 0.1-M solution (10.6 g/L) has a pH of 11.26.

As the carboxylate anions are released from the extractant during regeneration, the pH will become neutral where bicarbonate ($HCO_3^-$) is the dominant species (FIG. 2). The solution is pumped into a high-pressure mixer (~10 atm), where the pH is about 3.4. The $pK_a$ for carboxylic acids is about 4.8, so the Henderson Hasselbalch equation indicates that 4% of the acid will be dissociated ($A^-$) and 96% will be undissociated (HA). In the case of sodium hexanoate, the maximum solubility is 475 g/L (3.45 M), which is highly soluble. In contrast, the maximum solubility of hexanoic acid is only ~10 g/L, so about 95% of it will phase out of solution and form a separate layer that can be skimmed from the surface. The sodium cations are balanced by bicarbonate anions. Using vapor-compression evaporation (or other suitable means), the sodium bicarbonate is dewatered. and sent to a reactor where it is heated to 50 to 200° C., where it decomposes to sodium carbonate, thus allowing the regeneration cycle to continue. If the dewatering and thermal decomposition are performed at different temperatures, to conserve energy, a countercurrent heat exchanger is employed between the two unit operations.

Figure 28:
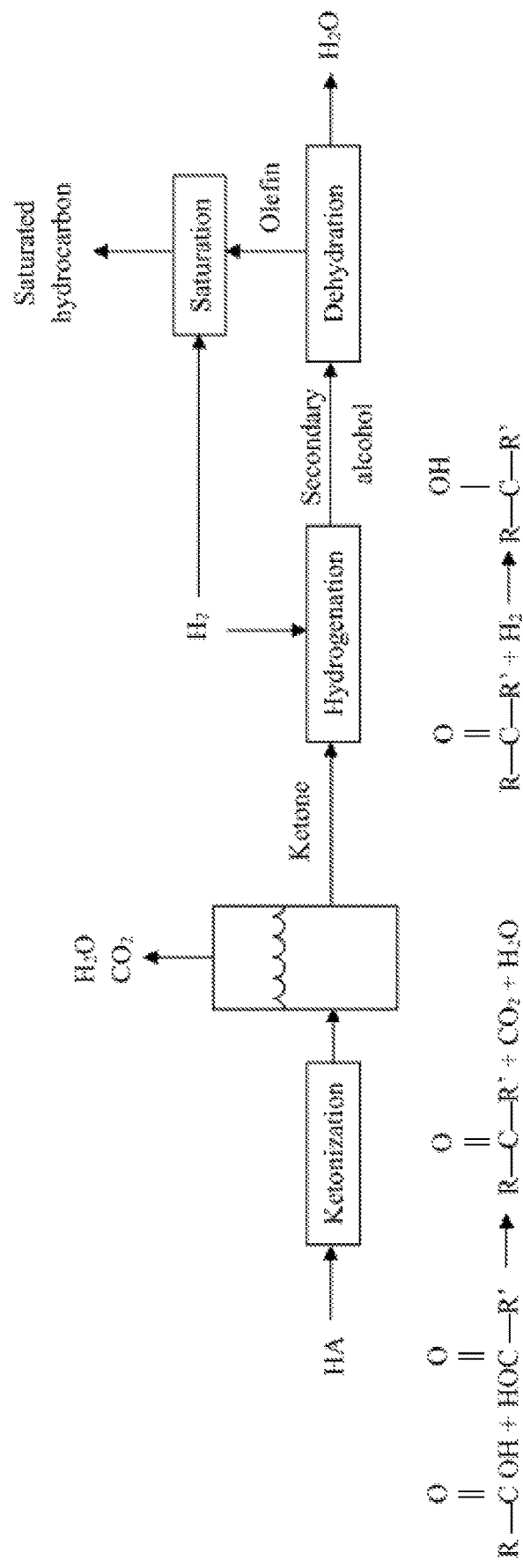
FIG. 28 shows conversion of carboxylic acids to hydrocarbons via dehydration of secondary alcohols.

FIG. 28 shows a means for converting carboxylic acids to hydrocarbons. The carboxylic acids are converted to ketones using an appropriate catalyst (e.g., zirconium or cesium oxide). Then, the ketones are hydrogenated to form secondary alcohols using an appropriate catalyst (e.g., Raney nickel). The secondary alcohols can be dehydrated to olefins using an appropriate dehydration catalyst (e.g., alumina). Finally, the olefins can be hydrogenated to saturated hydrocarbons.

Figure 29:
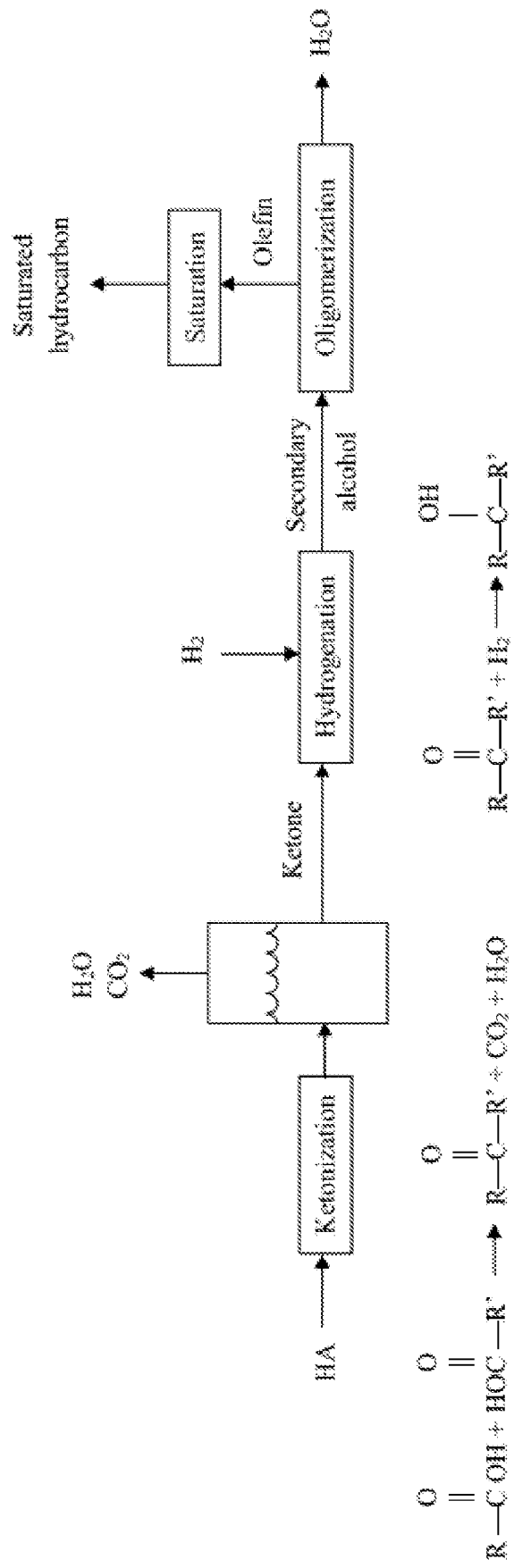
FIG. 29 shows conversion of carboxylic acids to hydrocarbons via oligomerization of secondary alcohols.

FIG. 29 is similar to FIG. 28, except an oligomerization catalyst (e.g., ZSM-5, Beta) replaces the dehydration catalyst, which increases the molecular weight of the resulting hydrocarbon.

Figure 30:
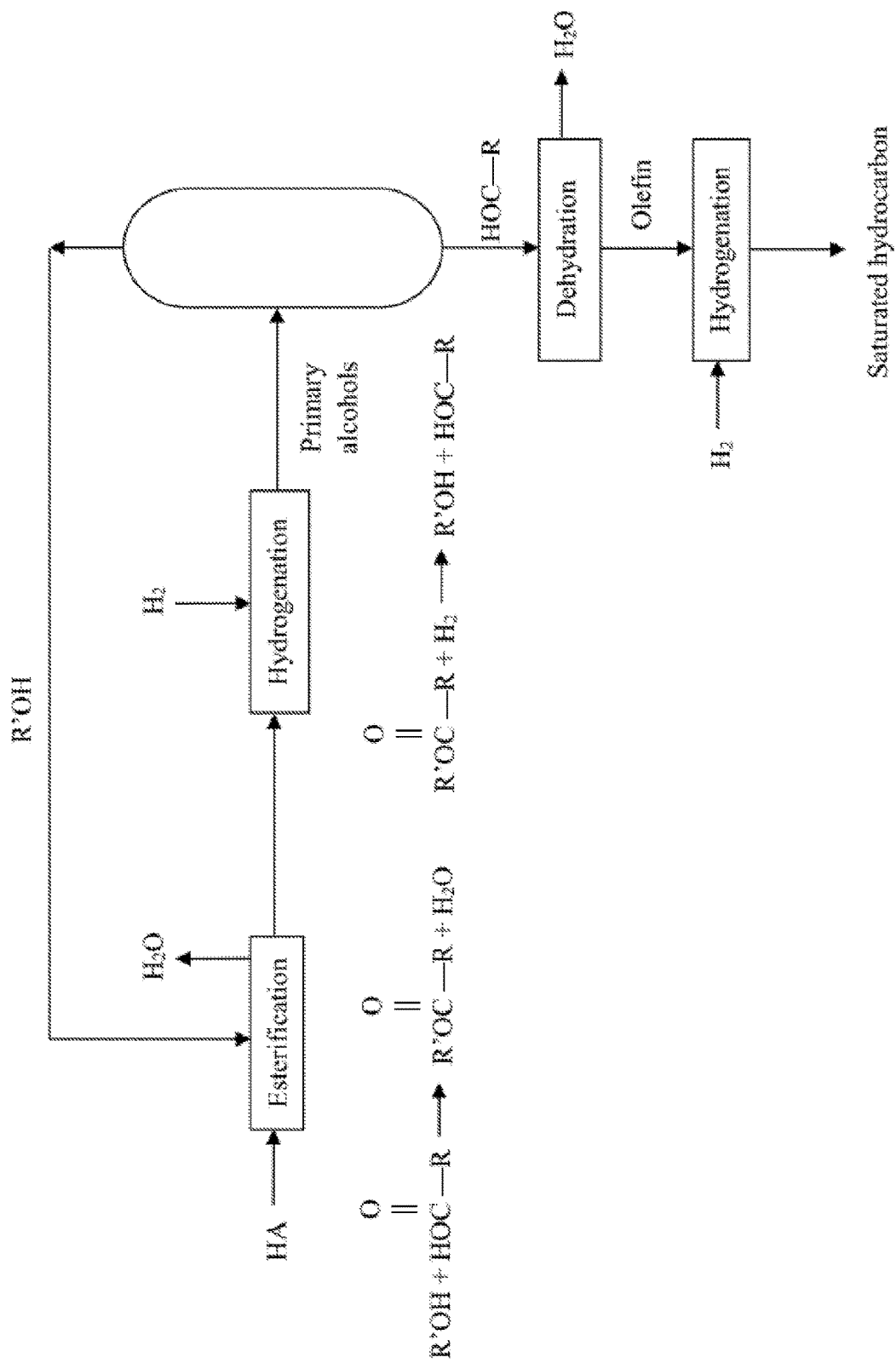
FIG. 30 shows conversion of carboxylic acids to hydrocarbons via dehydration of primary alcohols (Option 1)

FIG. 30 shows a means for converting carboxylic acids to hydrocarbons via primary alcohols. The carboxylic acids react with an alcohol to form an ester using an appropriate catalyst (e.g., solid acid ion-exchange resin). Ideally, the alcohol has a low molecular weight (e.g., methanol, ethanol), which makes it volatile and readily recycled. The water product can be removed from the ester using distillation or other appropriate means. The ester is hydrogenated to form two primary alcohols using an appropriate catalyst (e.g., Raney nickel, platinum). The low-molecular-weight alcohols are separated by distillation and recycled. The high-molecular-weight alcohols are dehydrated using an appropriate catalyst (e.g., alumina). Finally, the olefins can be hydrogenated to saturated hydrocarbons.

Figure 31:
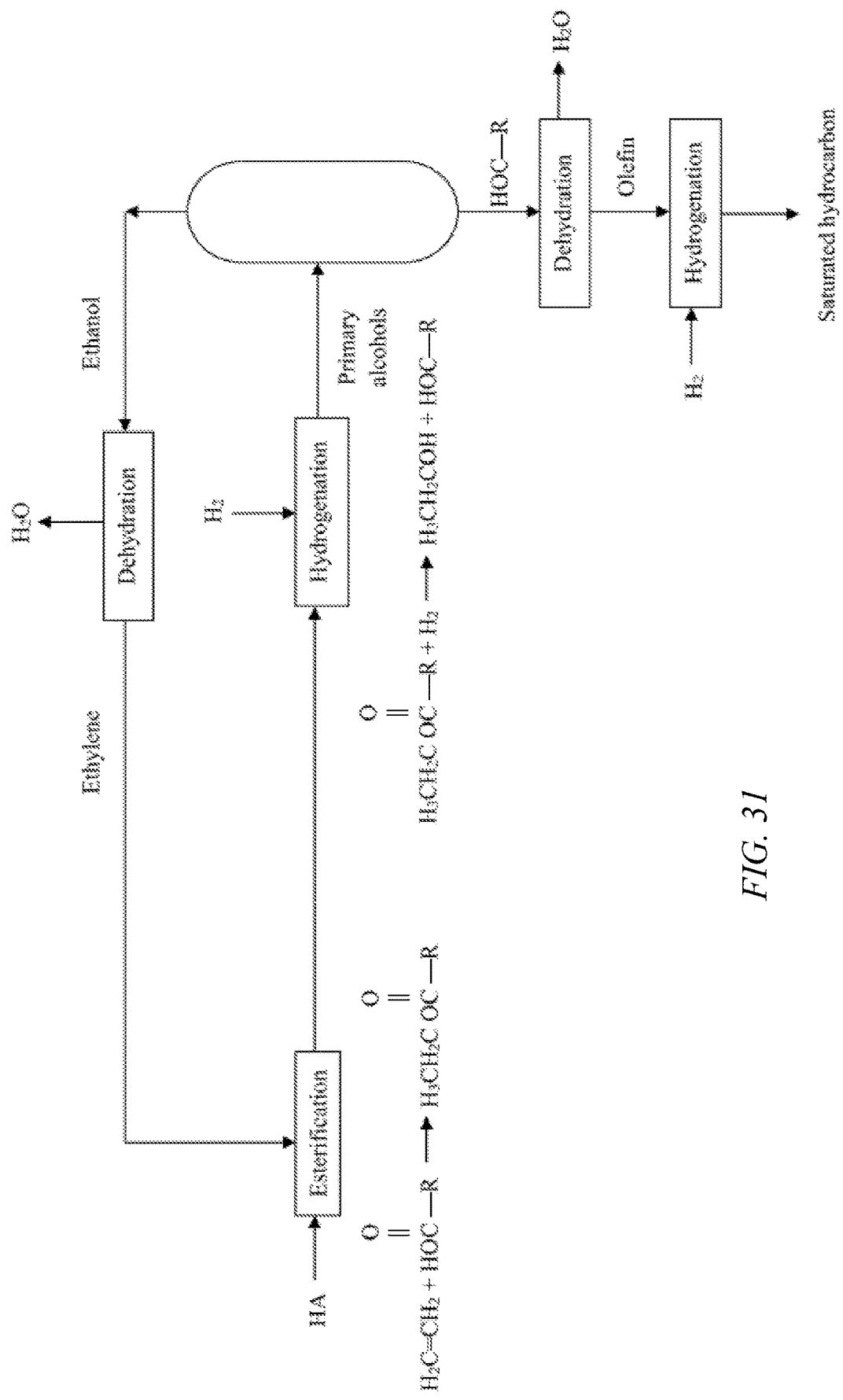
FIG. 31 shows conversion of carboxylic acids to hydrocarbons via dehydration of primary alcohols (Option 2)

FIG. 31 is similar to FIG. 30, except the ester is made by reaction with ethylene rather than ethanol.

Figure 32:
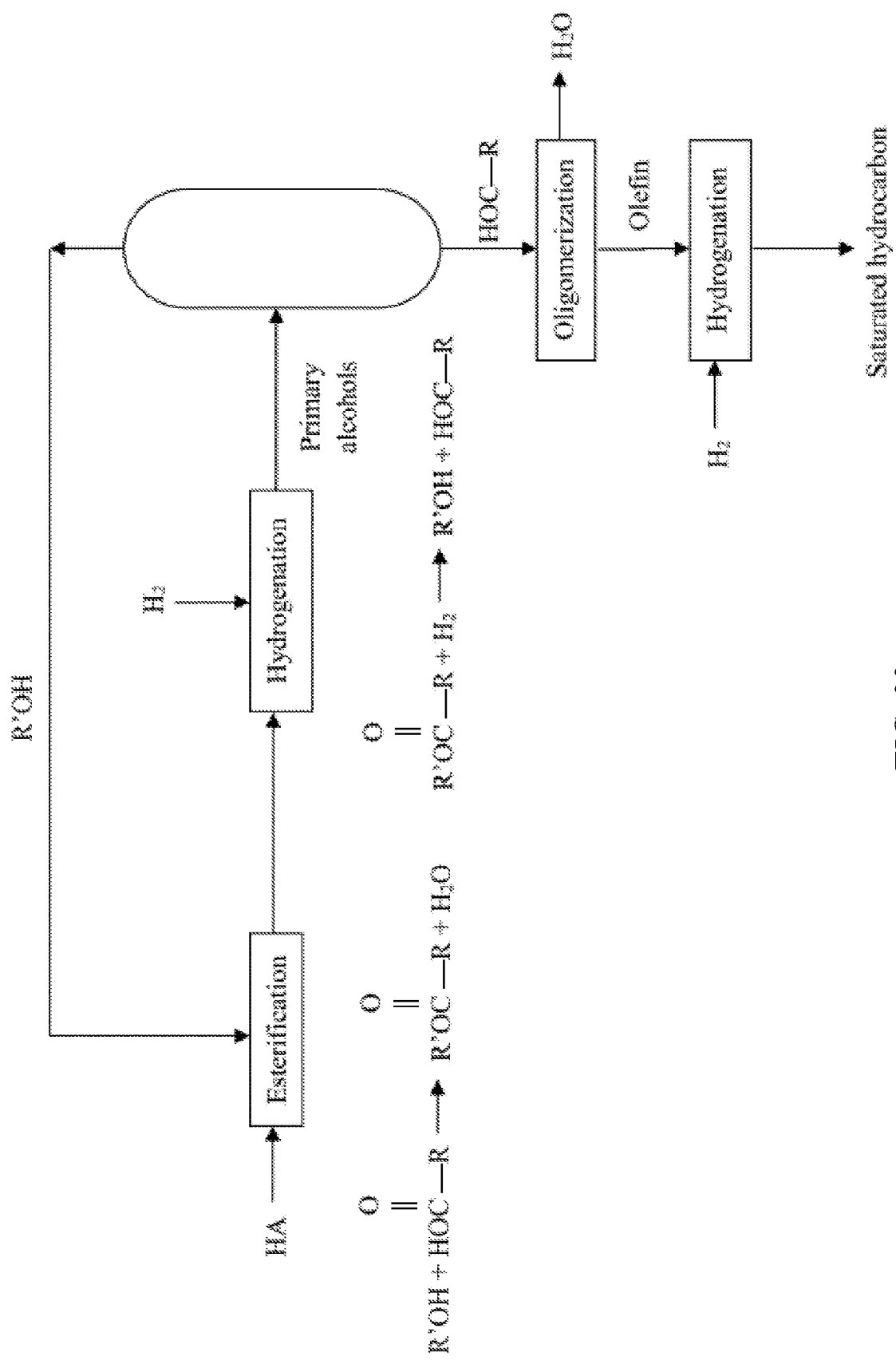
FIG. 32 shows conversion of carboxylic acids to hydrocarbons via dehydration of primary alcohols (Option 3)

FIG. 32 is similar to FIG. 30, except that the primary alcohols are oligomerized by an appropriate zeolite catalyst (e.g., ZSM-5, Beta).

Figure 33:
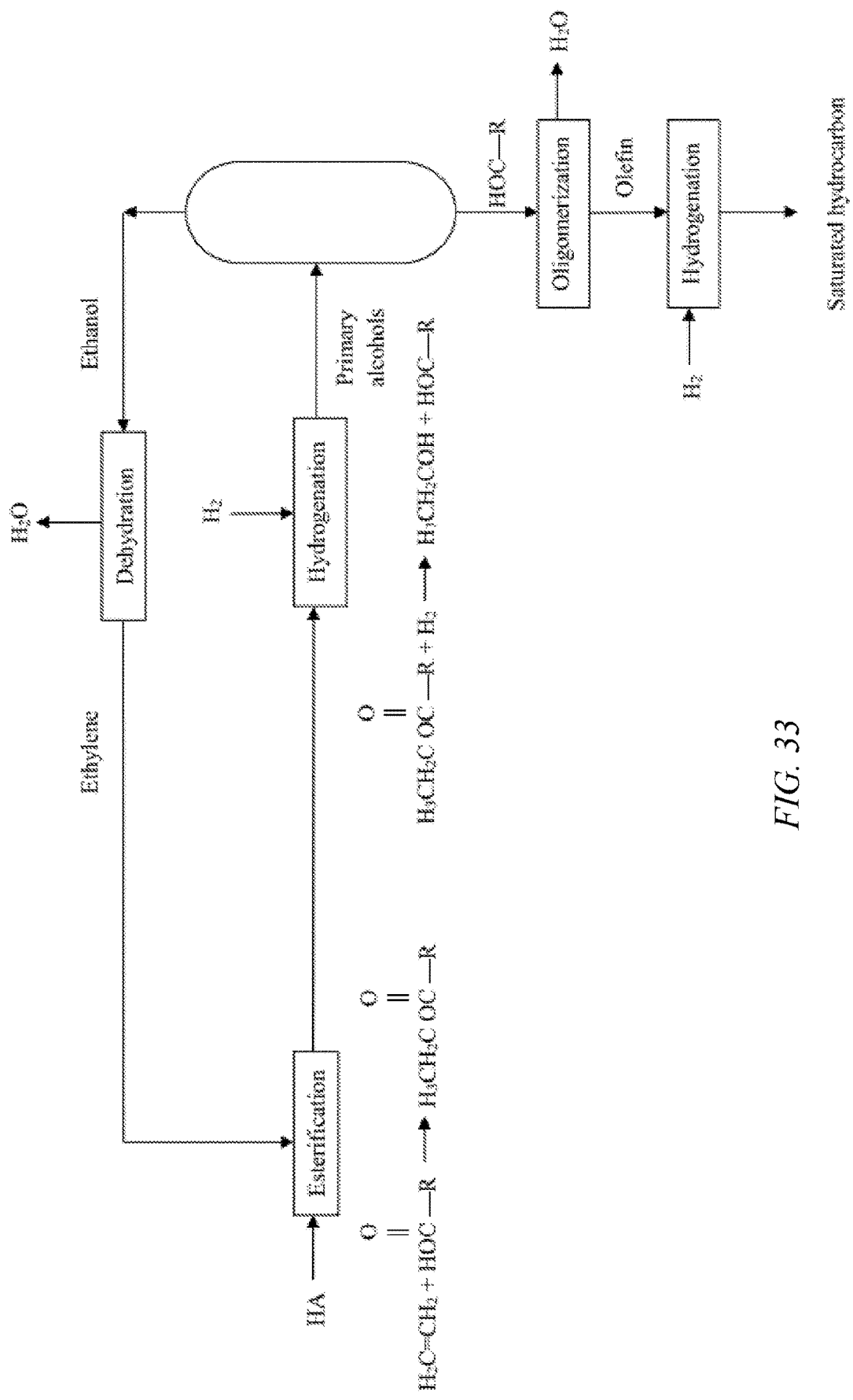
FIG. 33 shows conversion of carboxylic acids to hydrocarbons via dehydration of primary alcohols (Option 4)

FIG. 33 is similar to FIG. 31, except that the primary alcohols are oligomerized by an appropriate zeolite catalyst (e.g., ZSM-5, Beta).

Figure 34A:
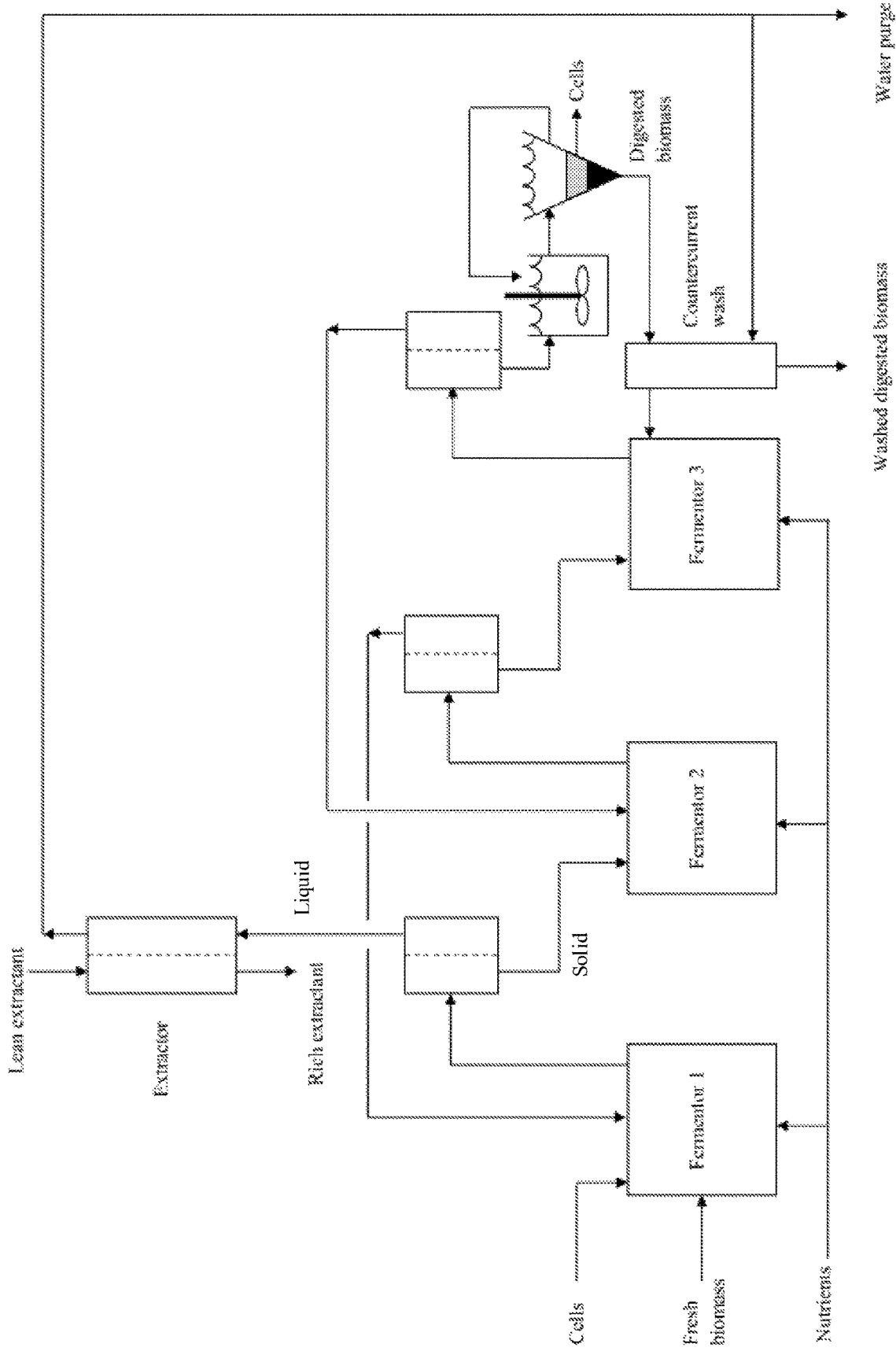
FIG. 34A show countercurrent fermentation coupled with extraction (Version A)

FIG. 34A shows countercurrent fermentation coupled with extraction. In this case, three fermentation stages are shown, but more or fewer could be used. The solid/liquid slurry from Fermentor 1 is separated into solid and liquid fractions using an appropriate separator (e.g., filter, settler, centrifuge, and the like). The solids are sent to Fermentor 2 and the liquid is sent to the extractor. In each successive fermentor, this process is repeated in which solids go to Fermentor x+1 and liquid goes to Fermentor x−1. The solids exiting the last fermentor—in this case, Fermentor 3—are countercurrently washed using recycled water to remove residual acids from the undigested residue. If the fresh biomass is wet, this incoming water must be purged from the system. The washed undigested residue is wet. Accordingly, if the fresh biomass is dry, then make-up water may need to be added in the countercurrent wash. The wash water contains acids recovered from the undigested solids. As shown in FIG. 34A, this wash water is returned to the last fermentor (Fermentor 3); thus, the recycled water flows countercurrently through the series of fermentors.

The solids recovered from Fermentor 3 are rich in cells. A portion of the cells is recovered by vigorously agitating a slurry of the biomass (e.g., stirred tank, in-line homogenizer, high-shear mixer), which dislodges cells that adhere to the biomass surface. Then, the slurry is placed in a settling tank. Generally, the undigested biomass particles are larger than the cells, so they settle more rapidly and the cells settle more slowly. The aqueous layer from the settler is returned to the agitator. The cells can be recovered as a "cream layer" from the settled solids and thereby recycled to Fermentor 1. Alternatively, if a cream layer of cells does not form, cells can be recovered directly from the liquid via centrifugation or filtration. Alternatively, the cells can be sold as a high-protein animal feed. If the live cells are fed to ruminants, they will accelerate digestion, which increases their value beyond the protein alone.) Recycling cells maintains a high cell density in the fermentors, which increases the reaction rate. Furthermore, recycled dead cells provide nutrients to actively growing live cells. The use of cell recycle has been described in the following dissertation:

Kristina Golub, Effect of Bioreactor Mode of Operation on Mixed-Acid Fermentations, PhD dissertation, Texas A&M University, College Station, TX (2012).

To achieve greater recovery of cells, the undigested residue can be exposed to another cycle of vigorous agitation and settling.

Nutrients (e.g., manure, sewage sludge, food waste) are added to each fermentor in parallel, a strategy that has proven to optimize the performance of each fermentor:

A. D. Smith, N. A. Lockman, M. T. Holtzapple, Investigation of Nutrient Feeding Strategies in a Countercurrent Mixed-Acid Multi-Staged Fermentation: Experimental Data, *Applied Biochemistry and Biotechnology*, 164 (4): 426-442 (2011).

Normally, the nutrients are added with the fresh biomass; however, many of the nutrient components are water soluble, and simply are lost in the product water. This normal approach reduces the amount of cell growth because nutrients are washed out and unavailable. Furthermore, the nutrients contaminate the product making separation more difficult. Because of the high cell density that occurs from recycling cells, the demand for nutrients is high. Adding nutrients in parallel to each fermentor ensures adequate water-soluble nutrients are available in every fermentor and thus cause a synergistic increase in the reaction rate.

Figure 34B:
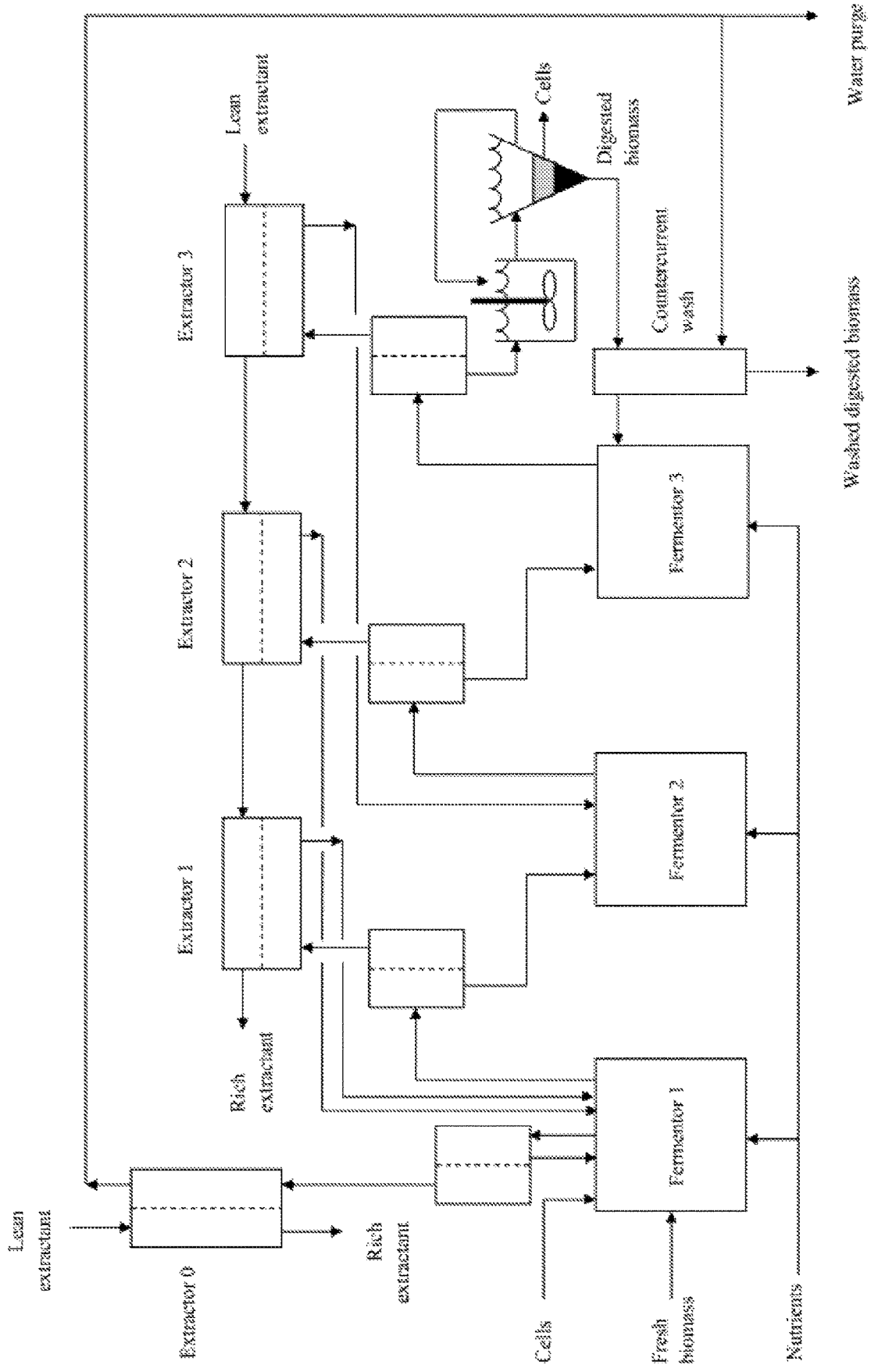
FIG. 34B shows countercurrent fermentation coupled with countercurrent extraction (Version B)

FIG. 34B shows countercurrent fermentation coupled with countercurrent extraction. Each fermentation stage can have independent extraction systems; however, performance is improved by using the countercurrent extraction shown in this figure. Countercurrent extraction maximizes the concentration of acid recovered from the extractant while minimizing the acid concentration in the last fermentor, thereby allowing higher conversions. In this case, three fermentation stages are shown, but more or fewer could be used. The solid/liquid slurry from Fermentor 1 is separated into solid and liquid fractions using an appropriate separator (e.g., filter, settler, centrifuge, or the like). The solids are returned to Fermentor 1 and the liquid is sent to Extractor 0, which recovers nearly all the acid from that aqueous stream. Additionally, the solid/liquid slurry from Fermentor 1 is separated into solid and liquid fractions using an appropriate separator (e.g., filter, settler, centrifuge). In this case, the solids are sent to Fermentor 2 and liquid is sent to Extractor 1. In each successive fermentor, this process is repeated in which solids go to Fermentor x+1 and liquid goes to Extractor x. The aqueous stream exiting Extractor 0 is essentially free of acids and is recycled to the countercurrent wash. The remaining steps are identical to the process described in FIG. 34A.

Figure 34C:
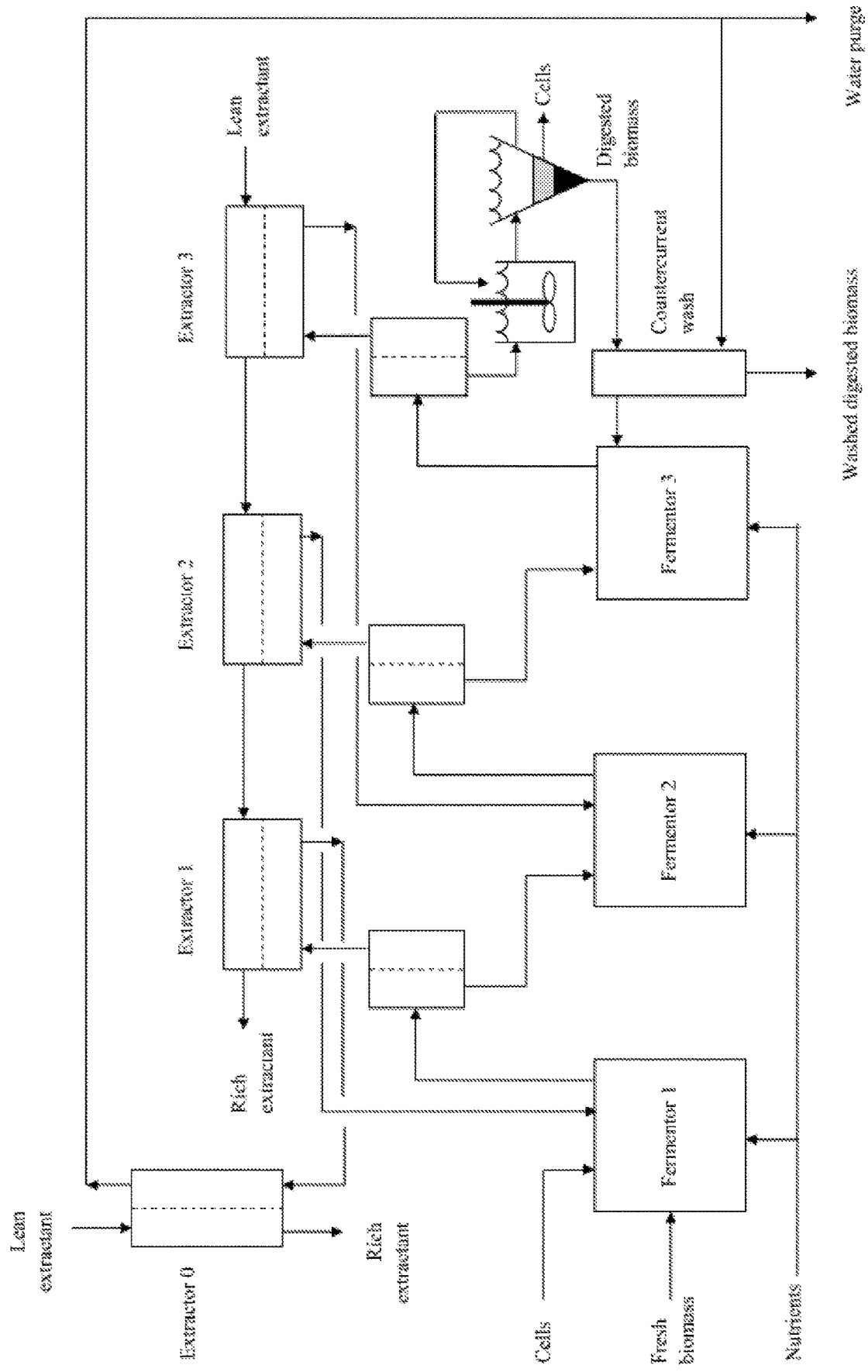
FIG. 34C shows countercurrent fermentation coupled with countercurrent extraction (Version C)

FIG. 34C shows a slight variation in which Extractor 0 receives liquid directly from Extractor 1 rather than Fermentor 1 (as in the previous version). The version shown in FIG. 34c has the benefit of one less separator, but it comes at the expense of a more dilute feed to Extractor 0

Figure 35A:
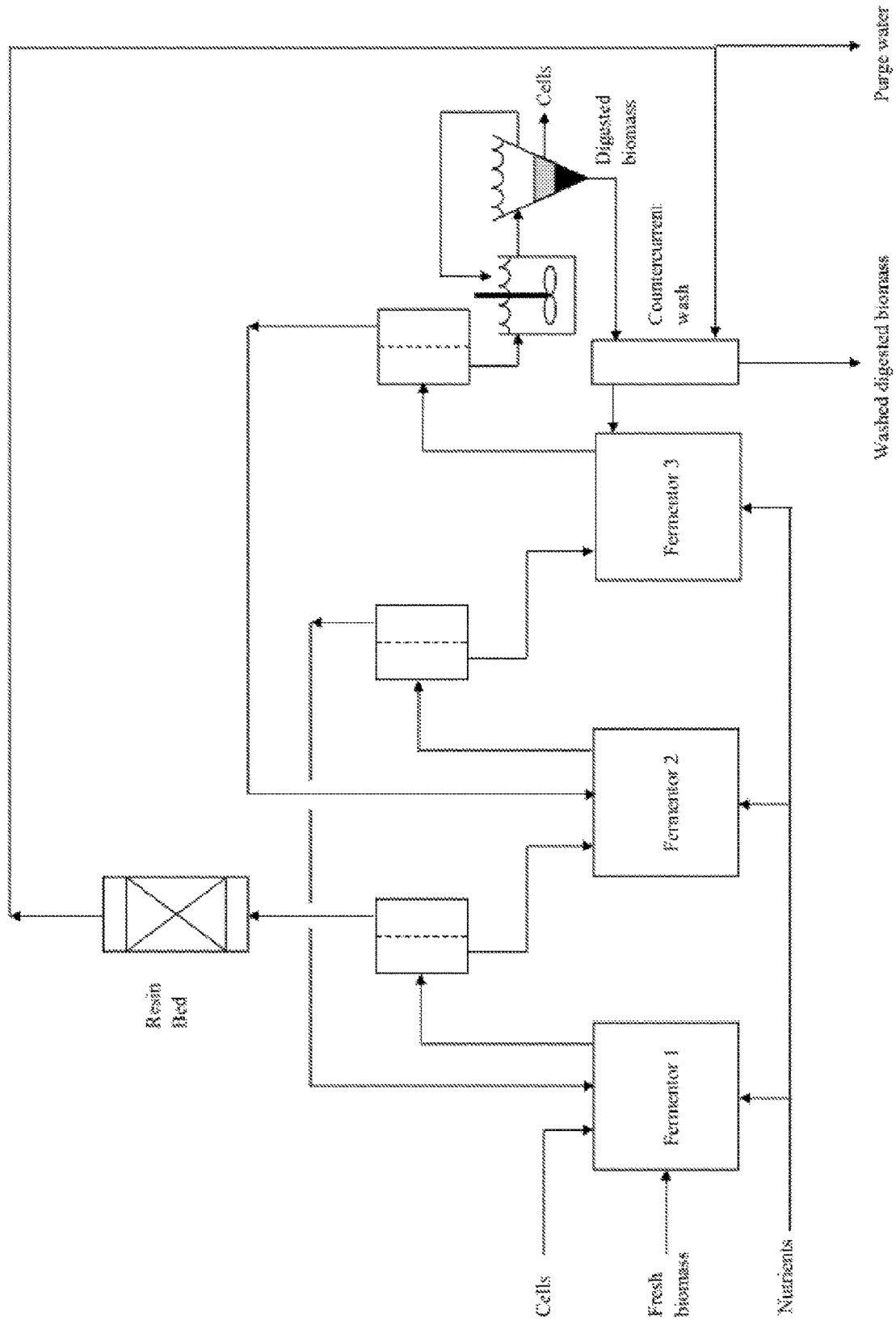
FIG. 35A show countercurrent fermentation coupled with ion exchange (Version A)
Figure 35B:
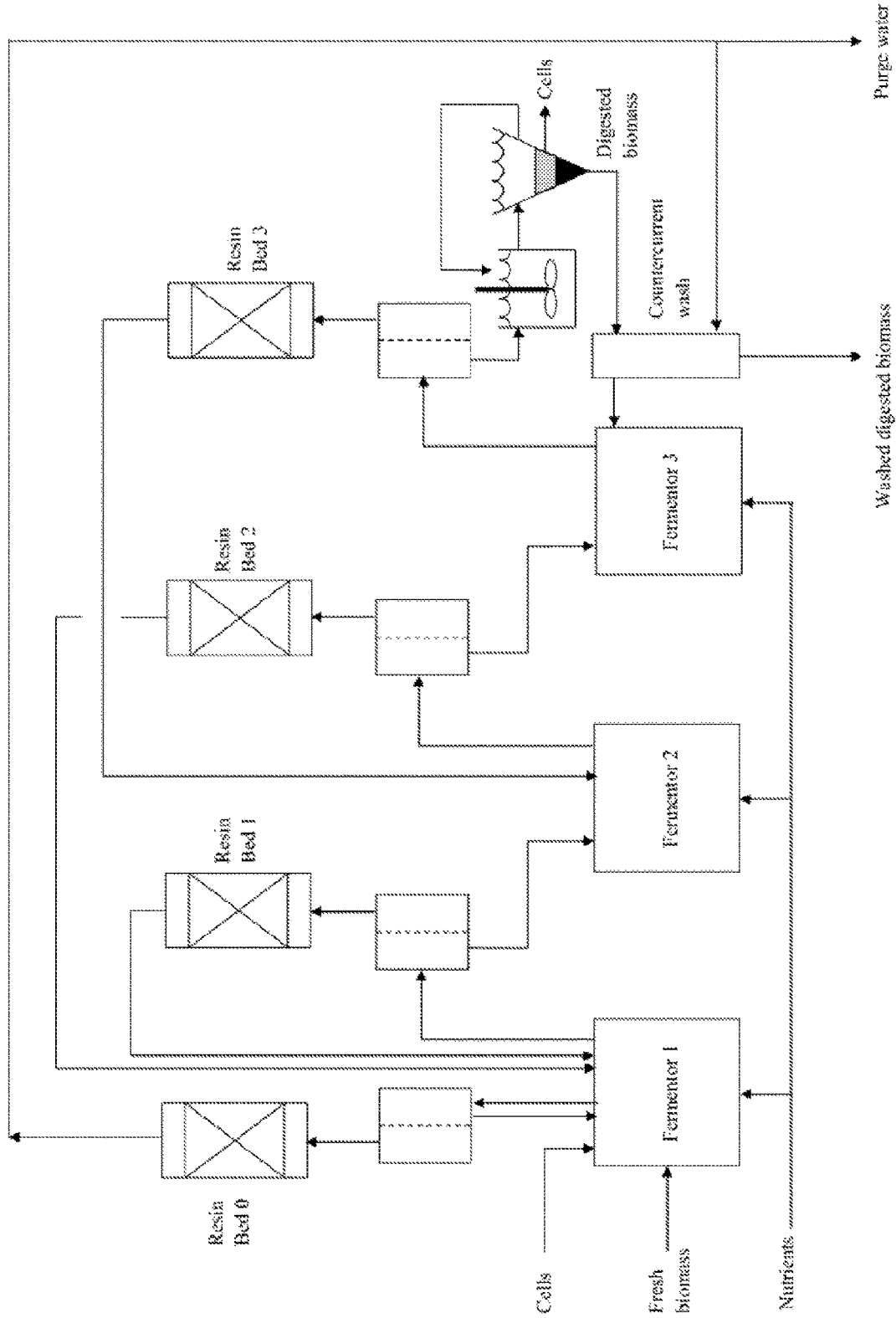
FIG. 35B shows countercurrent fermentation coupled with ion exchange (Version B)
Figure 35C:
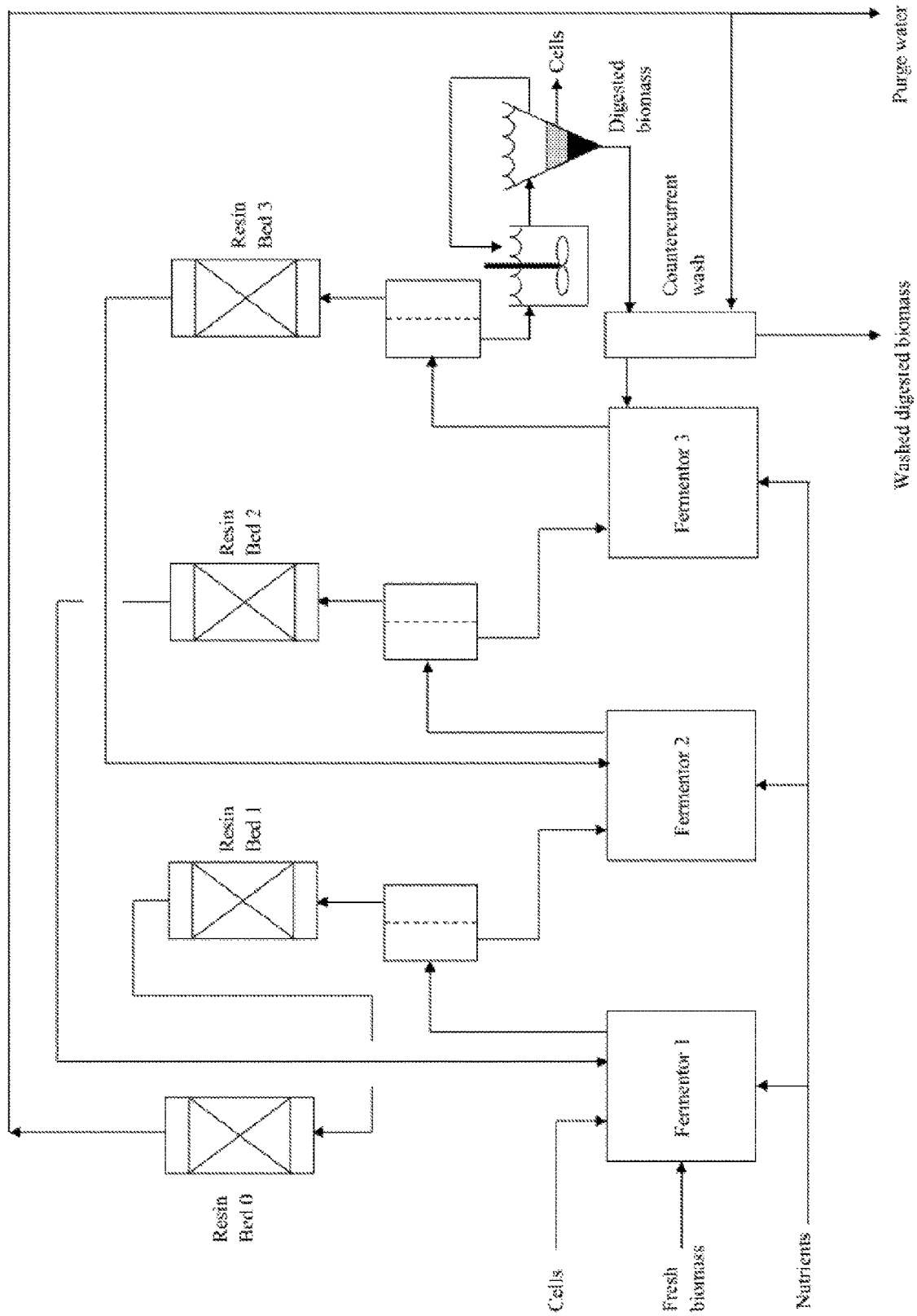
FIG. 35C shows countercurrent fermentation coupled with ion exchange (Version C)

FIGS. 35A, 35B, and 35C are analogous to FIGS. 34A, 34B, and 34C, respectively. FIGS. 35A, 35B, and 35C employ ion exchange resins whereas FIGS. 34A, 34B, and 34C employ liquid extraction.

FIG. 35A shows a resin bed that recovers acids from the liquid exiting Fermentor 1. When the resin bed becomes saturated, it is taken off line to be regenerated. A parallel resin bed, which was recently regenerated, takes its place. Effluent from the resin bed is essentially acid free and is recycled to the countercurrent wash. Cell recovery/recycle and nutrient addition were previously described and are not repeated here.

FIG. 35b shows countercurrent fermentation coupled with countercurrent ion exchange. When Resin Bed 3 becomes saturated with low-concentration acids from Fermentor 3, then it is "bank switched" so that it recovers medium-concentration acids from Fermentor 2. When this resin bed becomes saturated with medium-concentration acids from Fermentor 2, then it is "bank switched" so that it recovers high-concentration acids from Fermentor 1. In principle, "bank switching" could entail a physical movement of the resin bed to its corresponding fermentor. In practice, the resin beds will be stationary and "bank switching" will occur by switching valves and directing liquid flow to the appropriate resin bed. When Resin Bed 1 is saturated with the highest concentration acid from Fermentor 1, then it is regenerated as described previously. The liquid effluent from Fermentor 1 has its own Resin Bed 0, but this bed does not require "bank switching" because it is always exposed to the highest concentration acid. Each fermentation stage can have an independent ion exchange system without bank switching; however, performance is improved by using countercurrent extraction. The effluent from Resin Bed 0 is essentially free of acid and is recycled to the countercurrent wash.

FIG. 35C shows a similar system, except the effluent from Resin Bed 1 enters Resin Bed 0, thus eliminating one separator.

Figure 36:
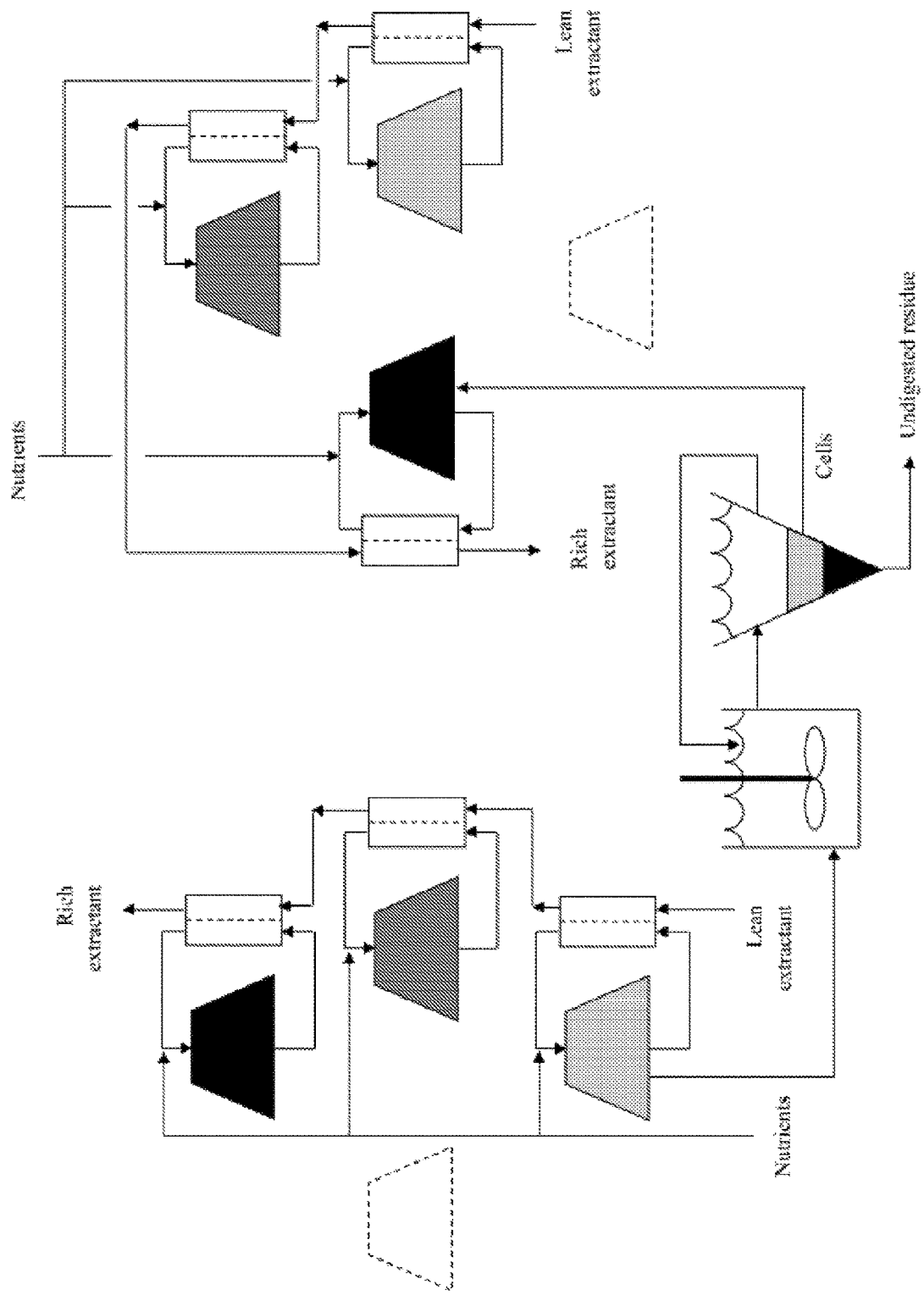
FIG. 36 shows countercurrent pile fermentation with countercurrent extraction.

FIG. 36 shows a countercurrent pile fermentation coupled with countercurrent extraction. Each fermentation stage can have independent extraction systems; however, performance is improved by using countercurrent extraction. Each truncated cone represents a pile of biomass. Three actively fermenting piles are shown, but more or fewer could be employed. The black pile was built recently and contains the freshest biomass. The medium-grey pile is a few weeks old and the light-grey pile is about a month old. The dashed pile is in the process of being deconstructed to remove undigested residue so a fresh pile can be constructed. Each pile has circulating liquid that extracts acids as the pile digests. The black pile has high-concentration acids (~30 g/L), the medium-grey pile has medium-concentration acids (~20 g/L), and the light-grey pile has low-concentration acids (~10 g/L). The circulating fermentation broth flows through an extractor to recover the acids. The extractant flows from the oldest pile (low-concentration acid) to the newest pile (high-concentration acid). This countercurrent flow allows complete digestion to occur because the oldest pile (least reactive) contacts low-concentration acid (less inhibitory). In addition, the countercurrent flow allows product to be recovered at the highest concentration possible because it last contacted the high-concentration acids in the fresh pile. The left side of FIG. 36 shows the initial system. As the piles age, the role of each pile shifts in a "round robin" manner, as shown on the right side of FIG. 36. The round robin shift occurs until the system returns to the initial state shown in the left side of FIG. 36.

As described earlier, nutrients are added in parallel to each actively fermenting pile. When the oldest pile is deconstructed, the solids are suspended in recycled water and vigorously agitated to dislodge cells from the undigested biomass. Then, the slurry enters a settling basin where the undigested residue is recovered from the bottom and cells are recovered as a "cream layer," which was described previously. Alternatively, if a cream layer of cells does not form, cells can be recovered directly from the liquid via centrifugation or filtration. The recovered cells are added to the freshest pile in the next phase of "round robin." Maintaining a high cell density in the piles ensures rapid digestion.

Figure 37:
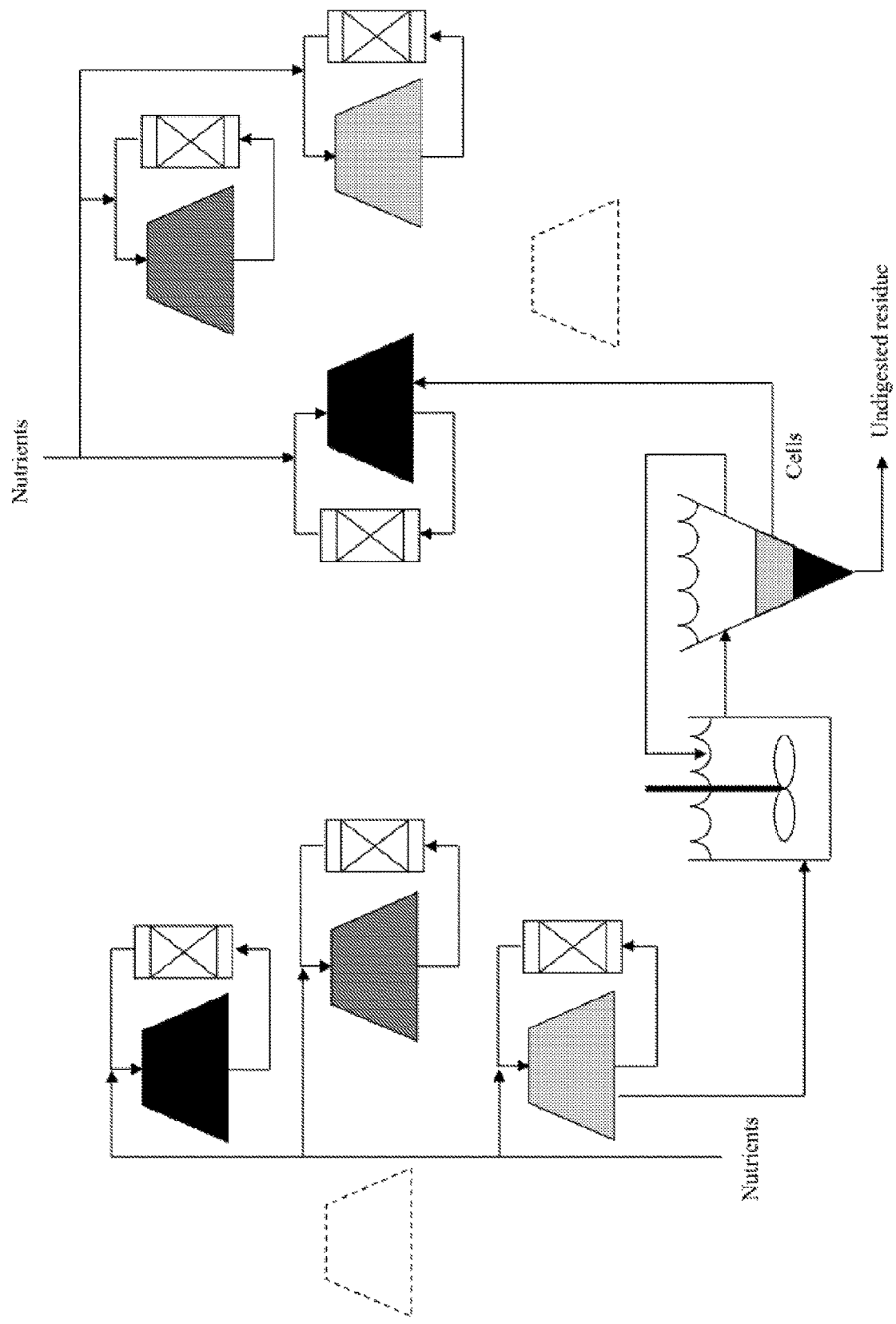
FIG. 37 shows countercurrent pile fermentation with countercurrent ion exchange.

FIG. 37 shows an analogous countercurrent pile fermentation coupled with countercurrent ion exchange. Each ion exchange resin bed services a given pile. When the low-concentration resin bed becomes saturated, it is "bank switched" to become the medium-concentration resin bed. When it becomes saturated, it is "bank switched" to become the high-concentration resin bed. When it becomes saturated, it is regenerated allowing the cycle to repeat. (Note: Each fermentation stage can have independent ion exchange system without bank switching; however, performance is improved by using countercurrent extraction.) As described earlier, nutrients are added to each pile in parallel. Cells are recovered from the oldest pile and are recycled.

TABLE 15

Digestibility of raw and lime-treated feedstocks using 48-hour in sacco rumen test

| Feedstock | Raw | Lime-treated |
|---|---|---|
| Bagasse | 31 | 63 |
| Millet straw | 45 | 90 |
| Sorghum straw | 54 | 83 |
| Tobacco stalks | 34 | 68 |

J. Gandi, M.T. Holtzapple, A. Ferrer, F.M. Byers, N.D. Turner, M. Nagwani, S. Chang, Lime Treatment of Agricultural Residues to Improve Rumen Digestibility, Animal Feed Science Journal, 68, 195-211 (1997).

Table 15 shows the 48-h digestibility of four biomass feedstocks placed in a nylon sack located in a rumen. Rumen microorganisms are similar to those in the fermentor, so these data are indicative of performance in an industrial fermentor. The data clearly show that lime pretreatment enhances digestion; however, it is surprising that raw biomass digests very well even without pretreatment. This observation is supported by fermentation of raw corn stover (Table E-5). In this case, 42 to 51% of the raw corn stover was digested without chemical pretreatment. Surprisingly, addition of $CO_2+H_2$ enhanced biomass digestion and thereby reduces the need for chemical pretreatment of the biomass.

Figure 38:
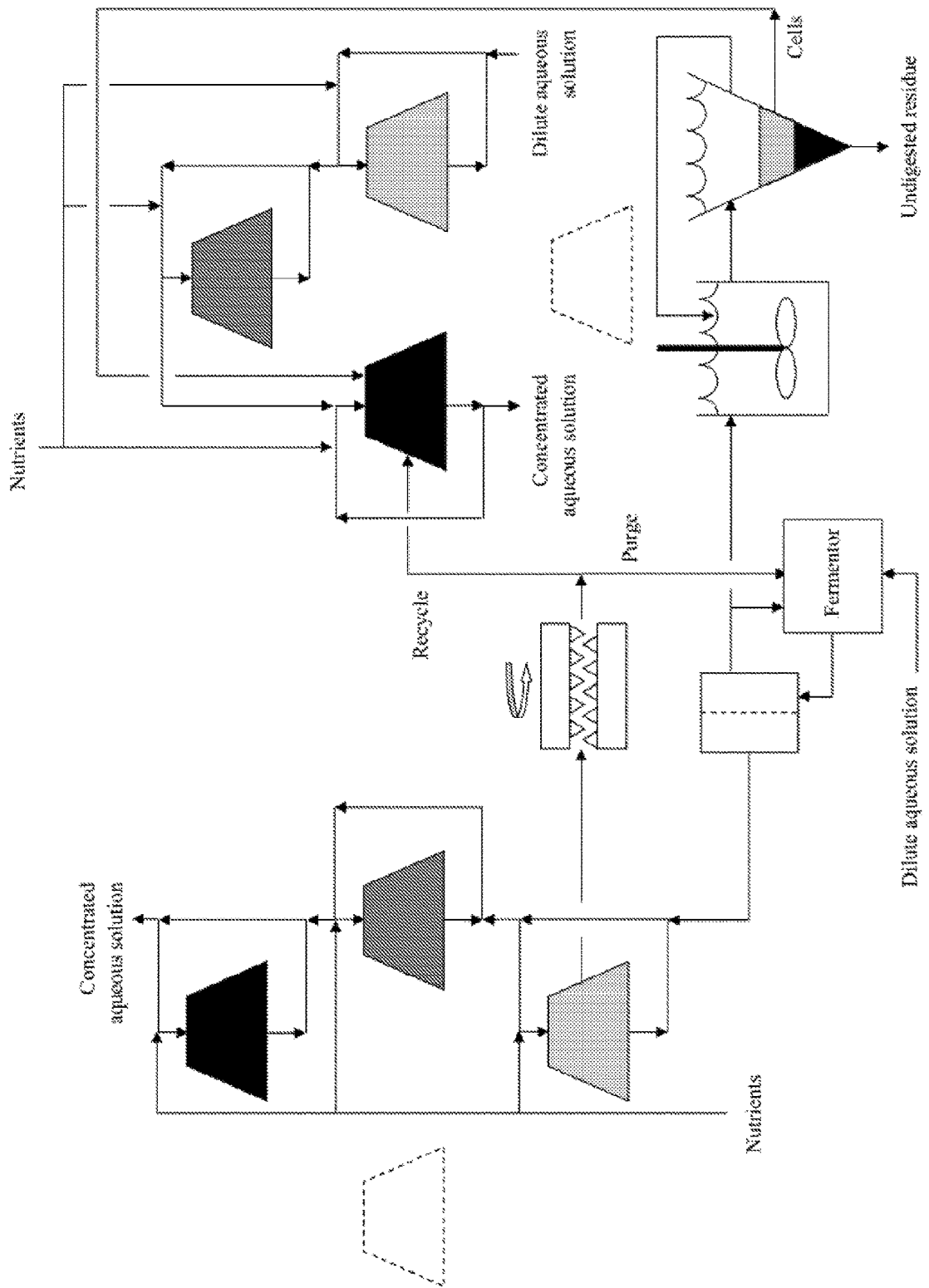
FIG. 38 shows countercurrent pile fermentation with grinding and cell recycle.

Chemical pretreatment is expensive. Furthermore, it changes the chemical composition of lignin, making it less suitable for applications where polymer integrity is important. The ability of mixed-culture microorganisms to digest raw biomass and preserve lignin integrity can be exploited in a novel fermentation process (FIG. 38). This fermentation process uses the "pile fermentations" described earlier. In this case, fresh raw biomass is placed in the pile (indicated as dark black in left side of FIG. 38). Liquid is circulated through the fresh pile (dark black), an older pile (dark grey), and also a very old pile (light grey). While three actively fermenting piles are shown, more or fewer could be employed. Fresh liquid is constantly added to the very old pile (light grey) while a small stream of liquid is withdrawn and constantly added to the older pile (medium grey). Similarly, a small stream of liquid is constantly withdrawn from the older pile (medium grey) and added to the fresh pile (dark black). Lastly, a small stream of liquid is constantly withdrawn from the fresh pile (dark black), which contains a high acid concentration from which product is recovered. In this manner, liquid passes countercurrently through the piles starting with the oldest pile (light grey) and moving to the youngest pile (dark black). High conversions result because the oldest pile is exposed to lower product concentrations, which minimizes product inhibition. High product concentrations result because the product liquid last contacted highly reactive fresh biomass. It should be noted that rather than recovering the product only from the concentrated liquid exiting the newest pile, it is possible to recover the acids from each pile as described in FIGS. 36 and 37.

As the fermentation proceeds, eventually the very old pile (light grey) must be removed so a new pile can be built in its place. The right side of FIG. 38 shows the next step in the "round robin" system where a new pile has been built and the oldest pile is being removed. Consequently, the liquid addition points have shifted. FIG. 38 shows that as the very old pile (light grey) is being removed, it passes through a mechanical grinder that subjects the biomass to shear forces and thereby "tears" the biomass thus allowing new surface area to be exposed to microbial attack. This mechanical grinding is analogous to a cow chewing its cud, which uses side-to-side motion to tear the biomass and expose surface area to enhance digestion. Pre-digestion prior to grinding softens the biomass making it more susceptible mechanical grinding. Furthermore, pre-digestion reduces the quantity of biomass that must be mechanically ground, thereby saving energy. To properly expose new surface area, the mechanical grinder must "shear" the biomass rather than "cut" the biomass. Examples of suitable grinders include burr mills, double disc mills, grindstone mills, attrition mills, in-line homogenizers, pin mills, ball mills, two-roll mills, PFI mills, extruders, and Szego mills. The appropriate mill is selected based on various practical considerations, such as capital cost, maintenance cost, energy cost, wear, throughput, etc.

The suggestion that fermentation be combined with mechanical grinding (e.g., burr mill) was made in the following paper:

P. J. Weimer, J. B. Russel, and R. E. Muck, Lessons from the cow: What the ruminant animal can teach us about consolidated bioprocessing of cellulosic biomass, *Bioresource Technology*, 100, 5323-5331 (2009).

Importantly, this paper did not describe details on how mechanical grinding would be properly integrated with fermentation, it only suggested broadly that mechanical grinding should be employed and thereby simulate cattle chewing their cud.

After the biomass is milled, a substantial portion is recycled to the new pile being constructed (dark black, right side of FIG. 38). Recycling accomplishes two objectives: (1) undigested biomass has an additional opportunity to digest and thereby increase yields, and (2) cells are recycled to maintain a high cell density in the pile and thereby increase the fermentation rate. Because lignin is a highly recalcitrant component of biomass, it is not possible to recycle biomass indefinitely; a purge stream is required.

Figure 39:
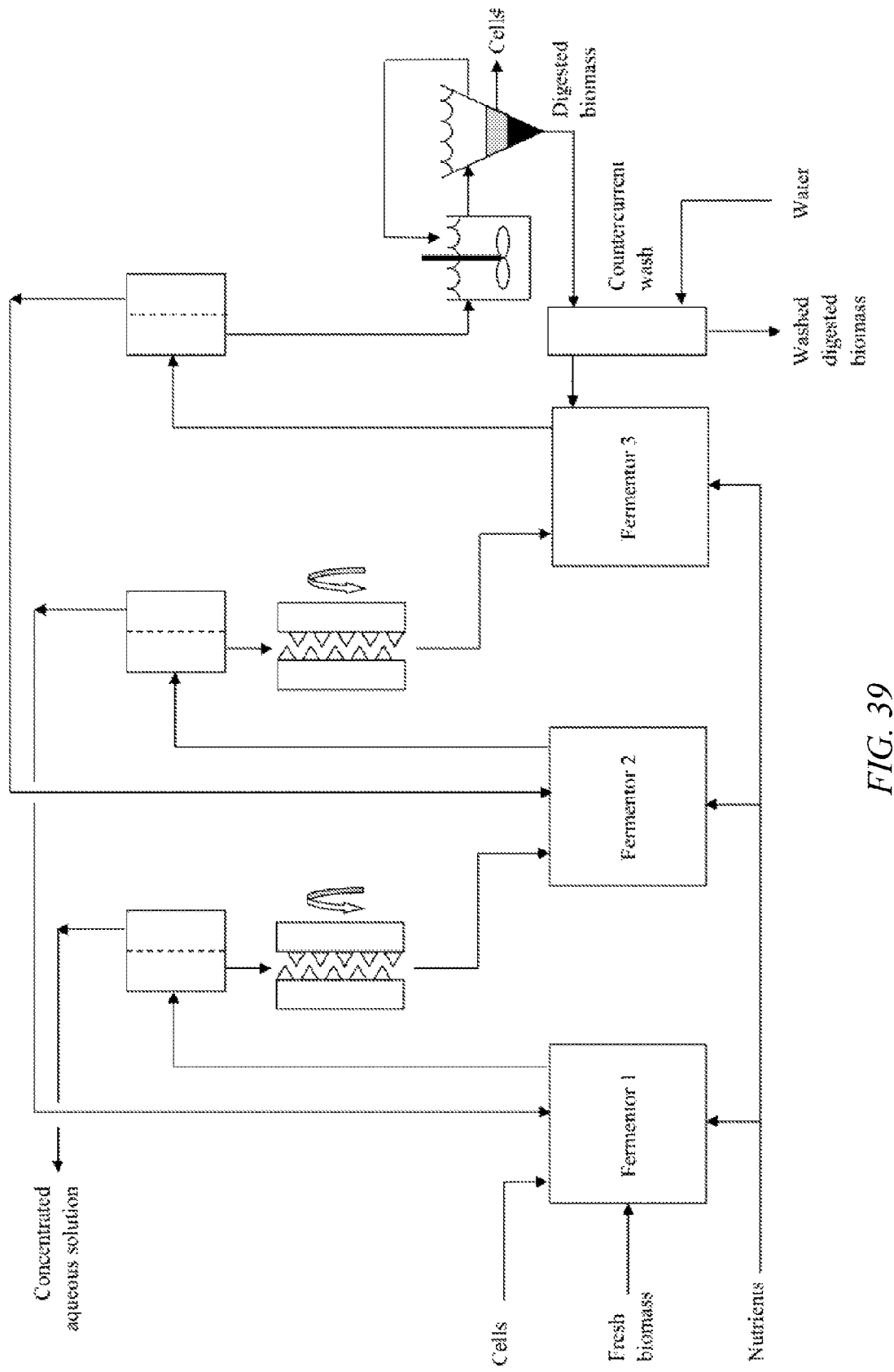
FIG. 39 shows countercurrent fermentation coupled with inter-stage grinding.

The purge stream is allowed to undergo additional fermentation to digest remaining components. After the final digestion, the biomass is vigorously mixed, which dislodges cells from the solid surfaces. Finally, the remaining solids are sent to a quiet settling basin. The undigested residue consists of large particles that settle rapidly whereas cells are much smaller and settle more slowly. Consequently, the cells will settle on the top as a "cream layer" which can be recovered separately from the undigested residue. Alternatively, if a cream layer of cells does not form, cells can be recovered directly from the liquid via centrifugation or filtration. The cells can be recycled to the new pile (dark black, FIG. 38B). Alternatively, the cells can be harvested and sold as an animal feed ingredient. The undigested residue consist primarily of lignin. The undigested residue can be subjected to additional processing, such as the following:

Combustion for process heat
Pyrolysis to produce biochar and combustible gases and liquids
Conversion to polymers
Conversion to carbon fibers
Hydrodeoxygenation (HDO) conversion to liquid fuels FIG. 39 shows countercurrent fermentation in which the solids that are transferred to each fermentor are subjected to shear grinding, which increases digestibility and thereby increases conversion. Shear grinding can be combined with the extraction and ion exchange systems described in FIGS. 34 and 35, respectively.

For feedstocks with higher lignin contents, using mechanical grinding to improve digestibility may result in significant quantities of undigested residue exiting the processes described in FIGS. 38 and 39. Improving digestion may require more energy input into grinding or implementing chemical pretreatment, both of which add significant expense. Rather than expend these additional resources, the undigested residue can be converted to biochar, which has significant value as a soil amendment; thus, synergies result from producing biochar from the undigested residues exiting the processes described in FIGS. 38 and 39.

The following are examples, according to certain teaching of the disclosure.

Example 1: IRA-67 Resin

Part 1: Forward Extraction

A 1-L solution was made with 18.7 g/L of acetic acid. Pure $CO_2$ was continuously sparged through the solution at atmospheric pressure. The solution was then titrated to a pH of 6.0 using $MgCO_3$. After titration, 20 g of IRA 67 resin was added to the solution. The solution was allowed to mix for 2 h at room temperature. The final concentration of acetic acid in the solution was measured as 17.5 g/L. The final pH of the system was 6.5, an acceptable operating pH for the fermentor.

Part 2: Drying

The acid-rich resin from Part 1 was recovered by filtration. The resin was then allowed to dry overnight wrapped in filter paper. After drying at atmospheric pressure, the resin was placed in a round bottom flask and dried by vacuum and moderate heating. The resin decreased in mass by 60% upon the application of vacuum. This indicates that saturated resin is 60% moisture.

Part 3: Back Extraction

Figure 40:
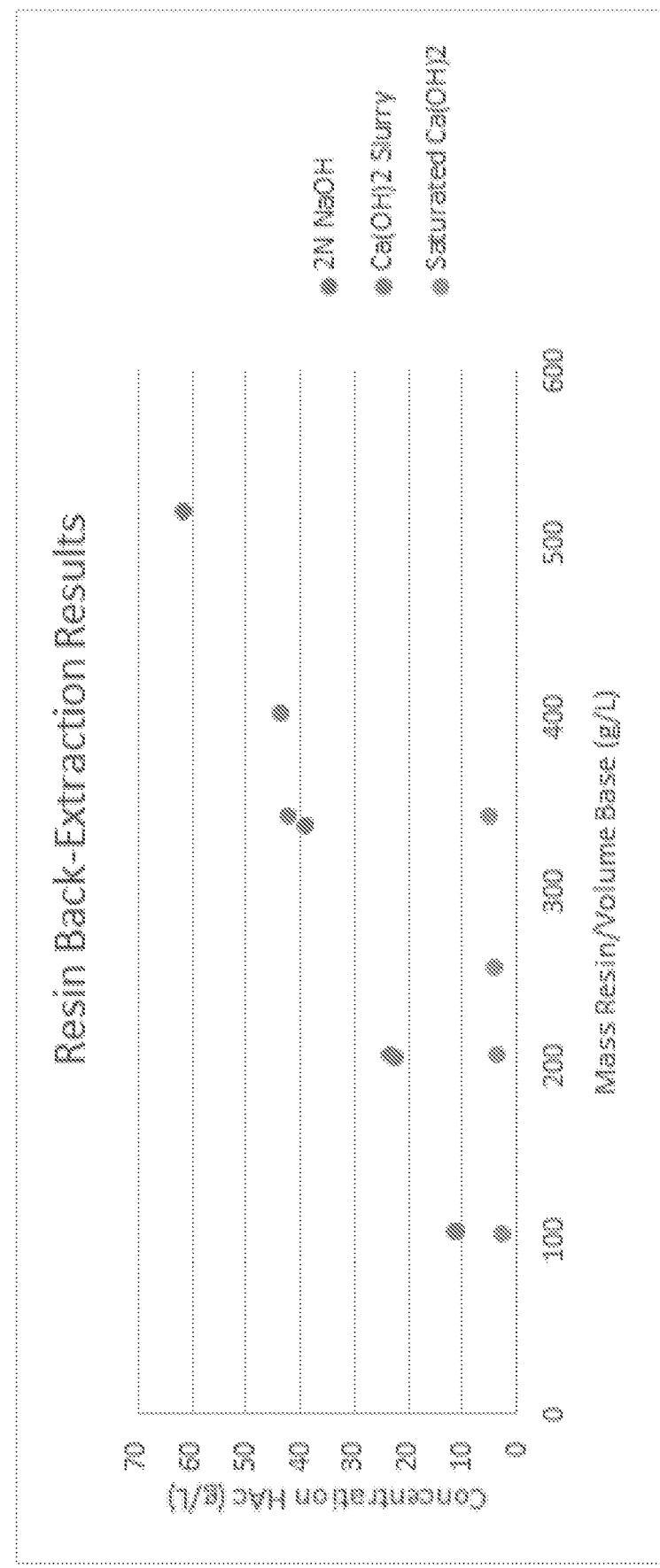
FIG. 40 shows a back extraction of IRA-7 resin.

The dry resin was partitioned equally into 12 vials. Four different base solutions were used to recover acetic acid from the resin: 2-M NaOH, saturated $Ca(OH)_2$, and saturated $Ca(OH)_2$ with excess $Ca(OH)_2$ powder as a slurry. Each of these bases were used in different quantities relative to the amount of resin in the vial. After shaking the vials to bring the system to equilibrium, the final acid concentration in each solution was measured. The results of this back-extraction are shown in FIG. 40.

This example shows that IRA-67 resin can be used to recover acetic acid from a solution at fermentation conditions and that the acid can be recovered by either aqueous NaOH or a slurry of $Ca(OH)_2$ and water. The recovery also allowed the acid to be concentrated by more than a factor of 2.0 if the ratio of resin to base solution was high enough.

Example 2: Trioctylamine and Octanol Example

Part 1: Multi-Stage Extraction

A solution was made to closely model the fermentation broth by adding appropriate concentrations of several carboxylic acids and adjusting the pH to 6.0 with NaOH. The concentrations of each of the acids in the fermentation model are shown in Table E-1.

TABLE E-1

| Concentration of simulated fermentation broth | |
|---|---|
| Acid Type | Aqueous Concentration (g/L) |
| Acetic | 13.93 |
| Butyric | 4.69 |

TABLE E-1-continued

Concentration of simulated fermentation broth

| Acid Type | Aqueous Concentration (g/L) |
|---|---|
| Pentanoic | 4.70 |
| Hexanoic | 4.74 |

Figure 41:
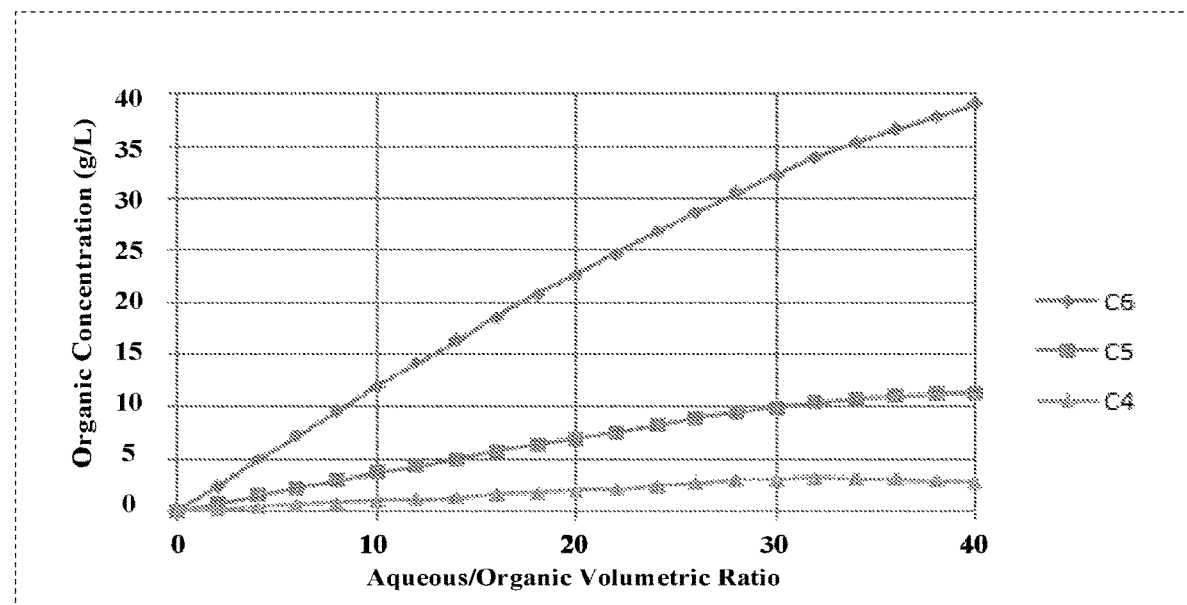
FIG. 41 shows the concentration of carboxylic acids in organic phase after repeated contacts with fresh simulated fermentation broth described in Table E-1.

The model solution was contacted with extractant (0.15 mole fraction trioctylamine (TOA) and 0.85 mole fraction octanol) and shaken vigorously. Afterwards, the phases were separated and the extractant was repeatedly contacted with a new batch of aqueous phase. A gas chromatograph was used to analyze the acid concentration in each of the outgoing aqueous solutions. By using mass balances and summing each iteration of the experiment, the acid concentration in the extractant organic phase could be determined for a wide range of aqueous/organic volumetric ratios. The organic concentration after each iteration of this experiment is shown in FIG. 41.

Part 2: Back Extraction

In the second experiment, back-extraction with an alkaline solution was tested. An organic solution was made to closely resemble the concentration of acids determined at an aqueous to organic ratio of 30:1 (Stage 15) in Part 1 of this example. The concentrations of the acids in the organic phase are shown in Table E-2. This organic solution was then contacted with 1-M NaOH solution in various aqueous/organic ratios in individual batches.

TABLE E-2

Carboxylic acid concentration in the organic phase

| Acid Type | Organic Concentration (g/L) |
|---|---|
| Acetic | 0.00 |
| Butyric | 2.96 |
| Pentanoic | 9.56 |
| Hexanoic | 31.40 |

Figure 42:
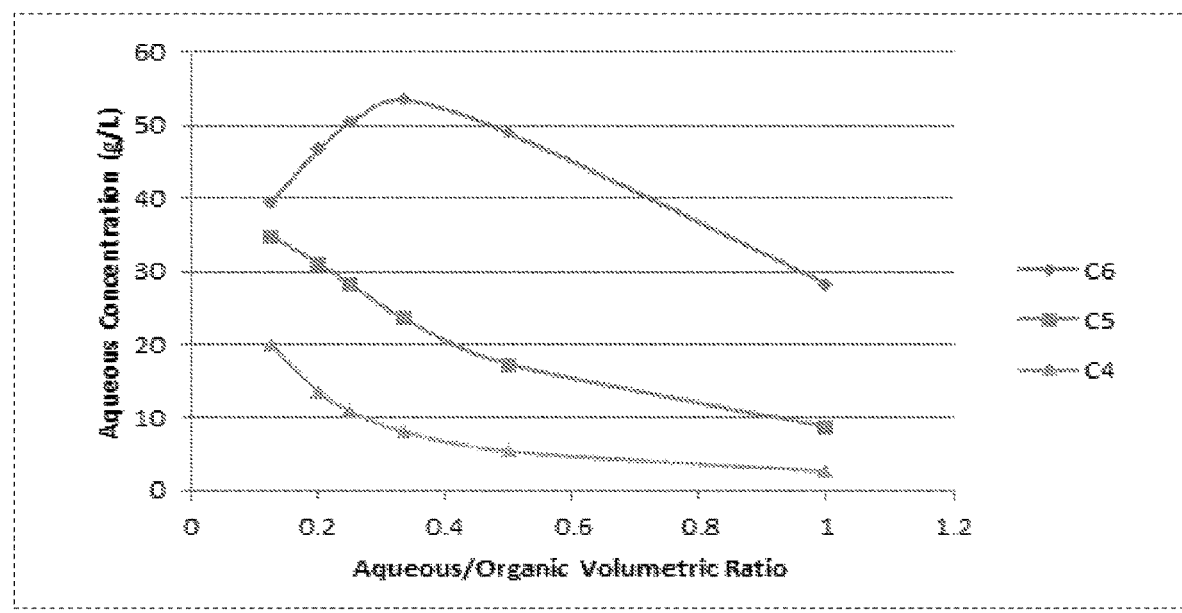
FIG. 42 shows the aqueous-phase concentration after back extraction.

The second experiment showed the relationship between concentration of acid back-extracted into the aqueous phase and the volume of organic phase contacted. The results of this experiment are shown in FIG. 42.

This example shows that acids can be extracted successfully by TOA/octanol extractant. The acids can be recovered at much higher concentrations than exist are present in the fermentation broth using NaOH. Additionally, the composition of the acid mixture recovered during back extraction can be controlled by modifying the ratio of the aqueous and organic phases in the back extraction.

Example 3: Aliquat 336 Extraction

Aliquat 336 is a quaternary amine with a positive charge located on the central nitrogen atom. Because it is positively charged, it is sold as a salt with chloride ions. This salt is a very viscous liquid, so it must be diluted by a factor of 2 with decane, kerosene, or another alkane solvent. In this experiment, the Aliquat was diluted with dodecane.

A portion of the Aliquat/dodecane solution was contacted with 4-N aqueous NaOH at ratio of 2:1 aqueous:organic three times successively. This repeated contact with a concentrated, strong base replaced the chloride ions in the Aliquat solution with hydroxide ions.

Figure 43:
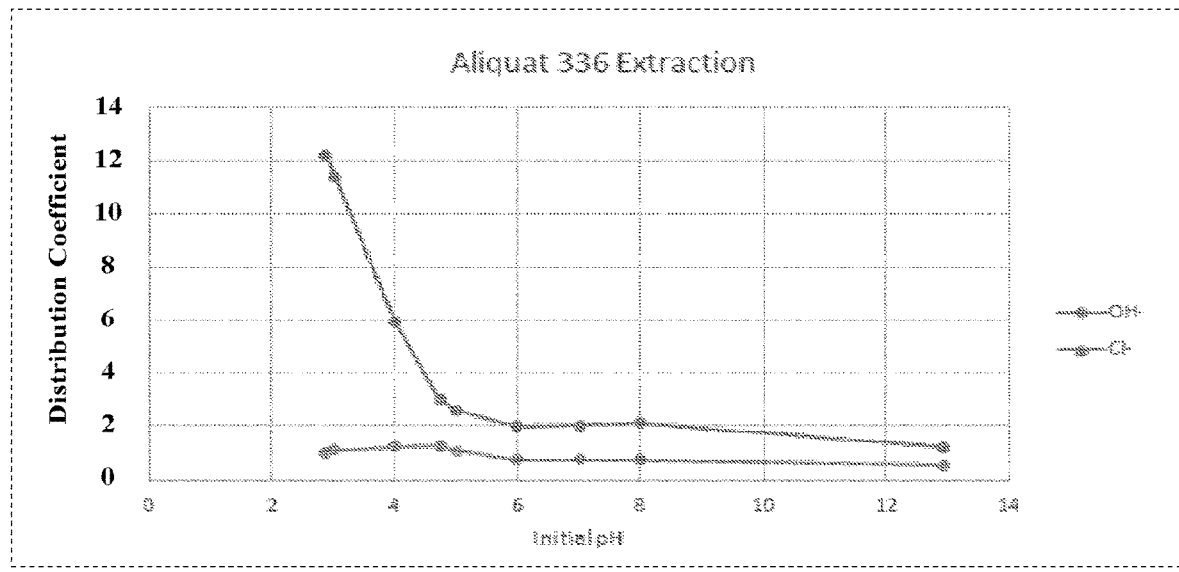
FIG. 43 shows the distribution coefficient of acetic acid in Aliquat/dodecane versus water.

The extracting ability of each Aliquat solution was tested in an identical manner. The organic phase was contacted in a 1:1 ratio with 10 g/L aqueous acetic acid solutions that had been titrated to a range of pH values with NaOH. The final aqueous acetic acid concentration was measured after each aqueous-organic system had time to equilibrate. For each experiment, FIG. 43 shows the distribution coefficient, which is equal to the final organic concentration divided by the final aqueous concentration.

Figure 44:
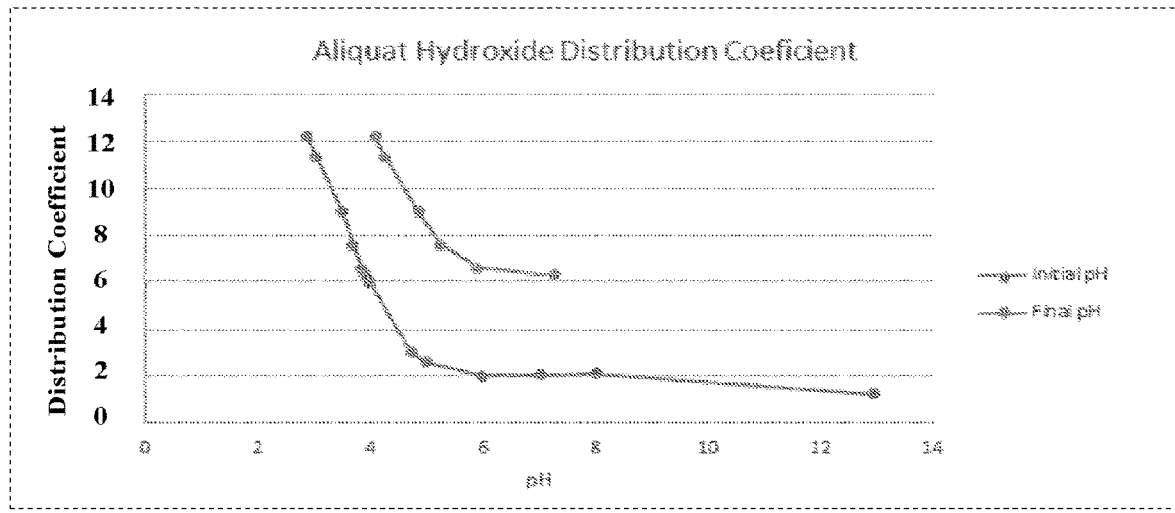
FIG. 44 shows an initial (measured) and final (calculated) pH for the experiment.

The results of this experiment show that Aliquat hydroxide outperforms Aliquat chloride in the extraction of acetic acid, especially in more acidic solutions. FIG. 44 shows the results of a Henderson-Hasselbalch calculation to determine the final pH of the aqueous phases in this experiment.

This final pH calculation was necessary to show that Aliquat with hydroxide ions could be used as an effective extractant at the pH of fermentation broth (~7.0).

Example 4: Cyanex 923 Extraction

Figure 45:
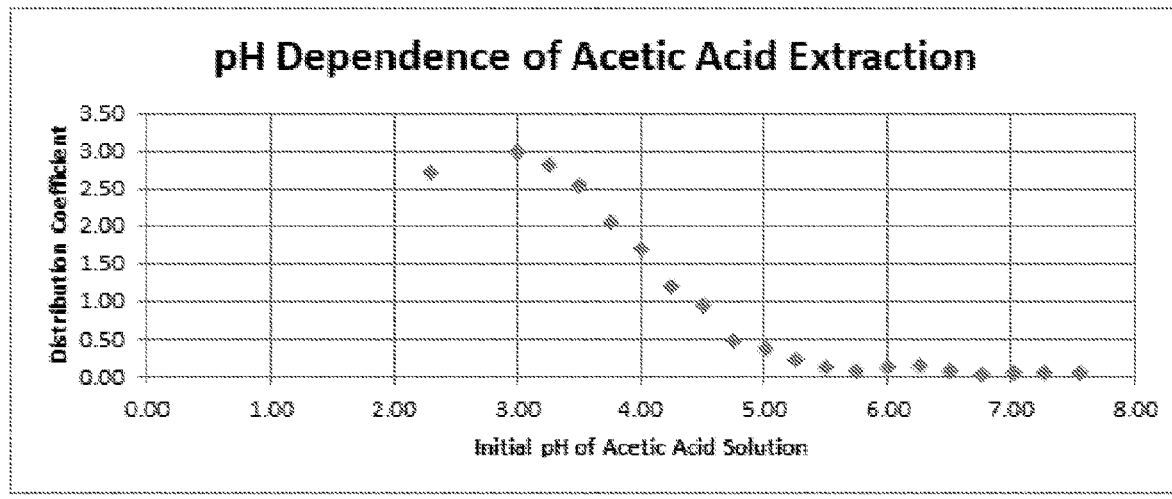
FIG. 45 shows the distribution coefficient of acetic acid in Cyanex 923/decane vs. water.

Cyanex 923 is an extractant comprised primarily of trioctyl-phosphine oxide (TOPO). It is a viscous liquid, so it was blended to 50% concentration by volume with decane. A solution of 60 g/L acetic acid was titrated to various pH values between 3.0 and 7.5 using NaOH. The organic phase was then contacted with each of these aqueous solutions in a 1:1 volumetric ratio. The final acid concentration of each aqueous phase was measured. The distribution coefficient shown in FIG. 45 is equal to the final organic concentration divided by the final aqueous concentration of acetic acid.

Figure 46:
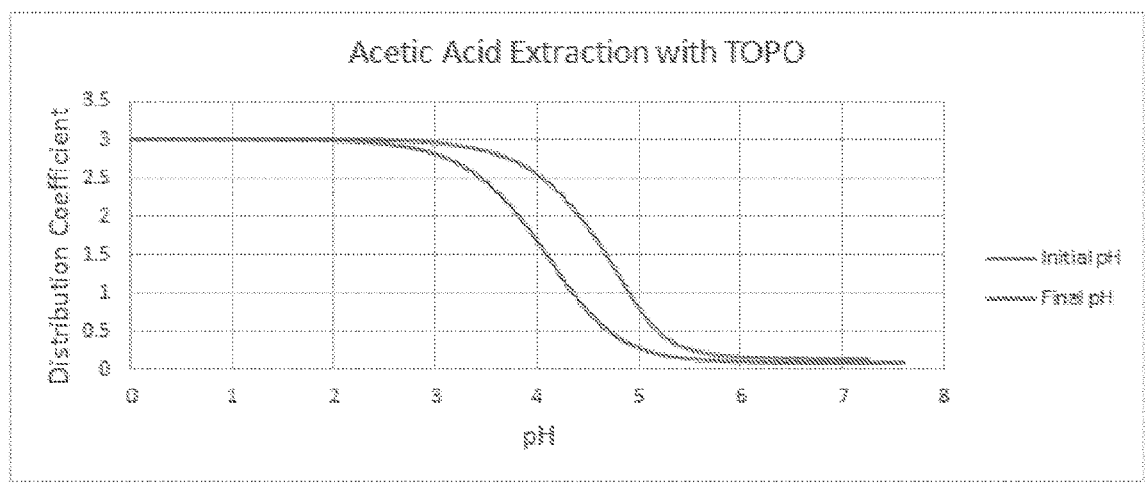
FIG. 46 shows the distribution coefficient of acetic acid in Cyanex 923/decane vs. water.
Figure 47:
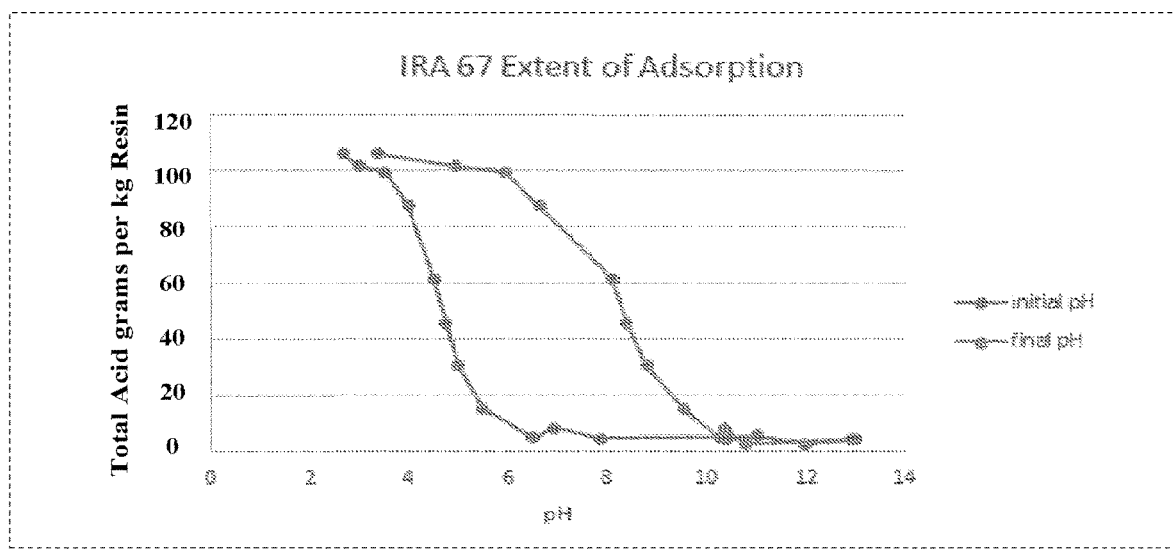
FIG. 47 shows acid loading for IRA 67.
Figure 48:
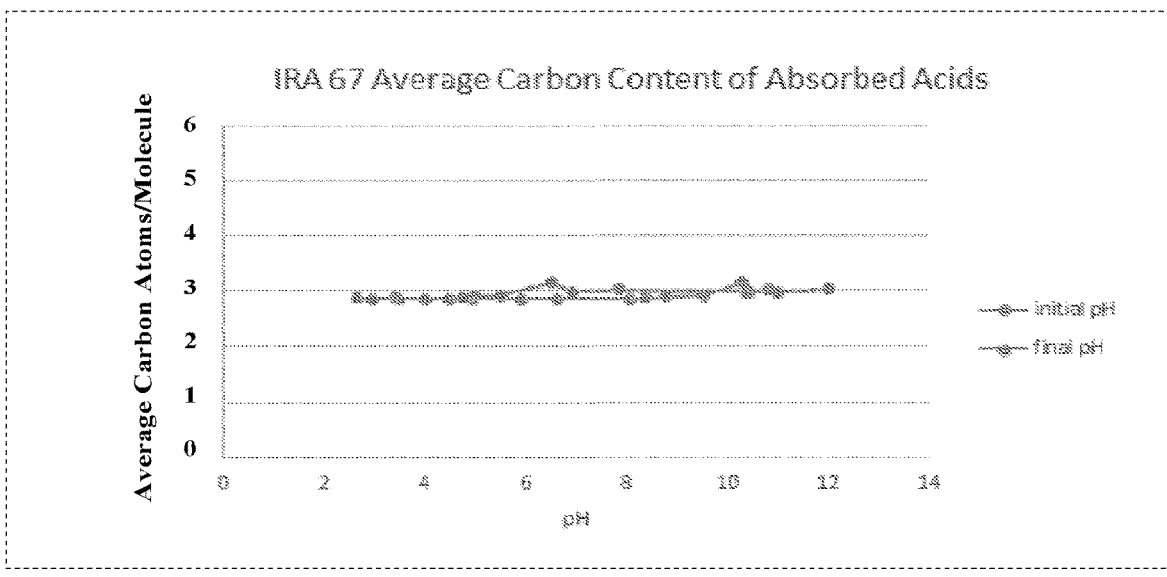
FIG. 48 shows average carbon number for IRA 67.
Figure 49:
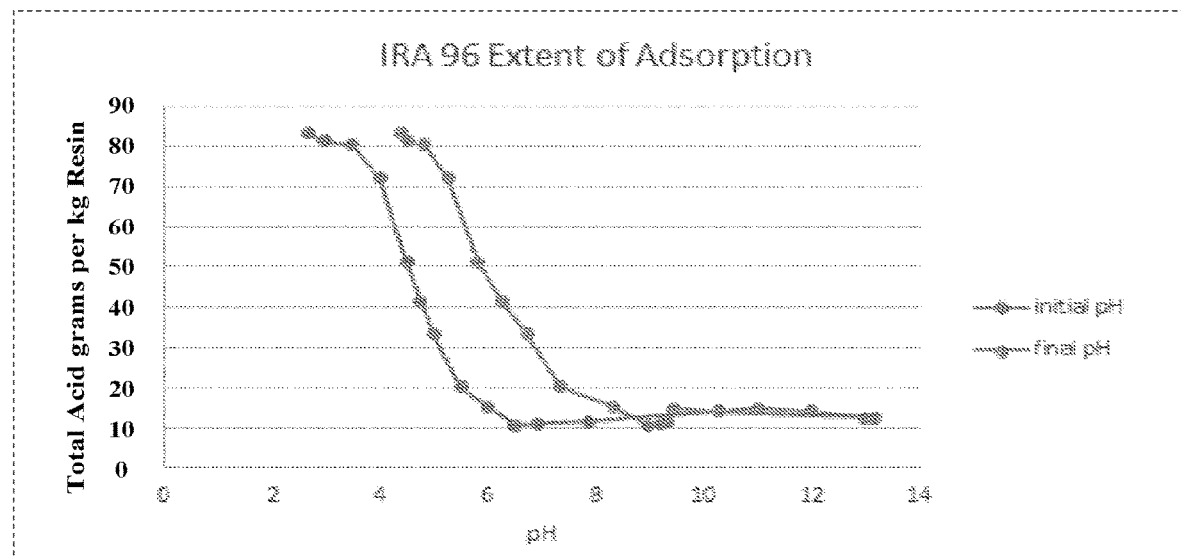
FIG. 49 shows acid loading for IRA 96.
Figure 50:
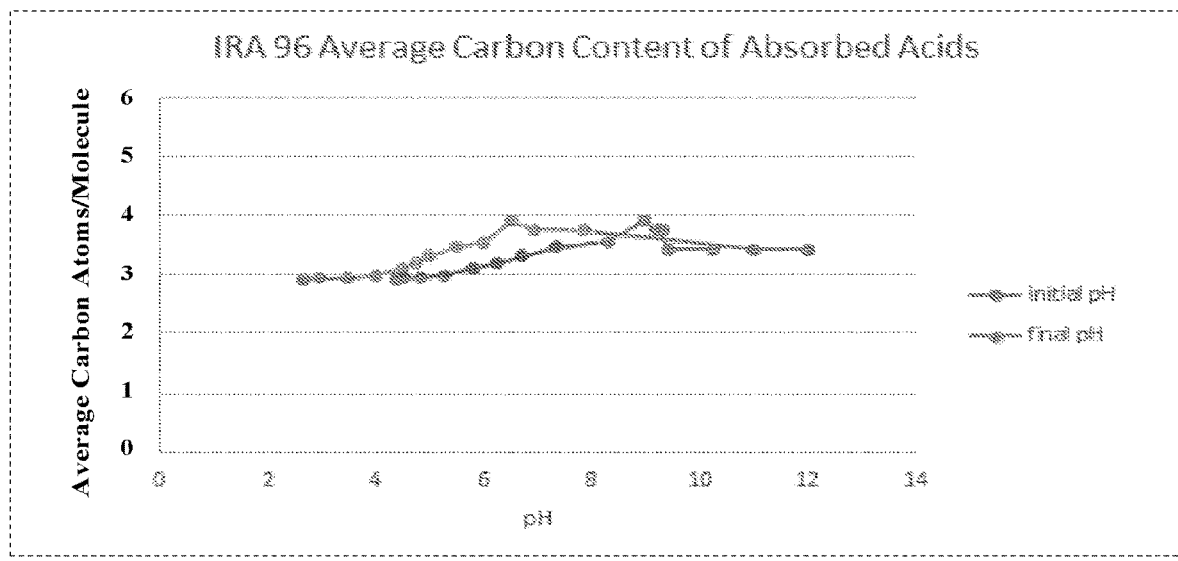
FIG. 50 shows average carbon number for IRA 96.
Figure 51:
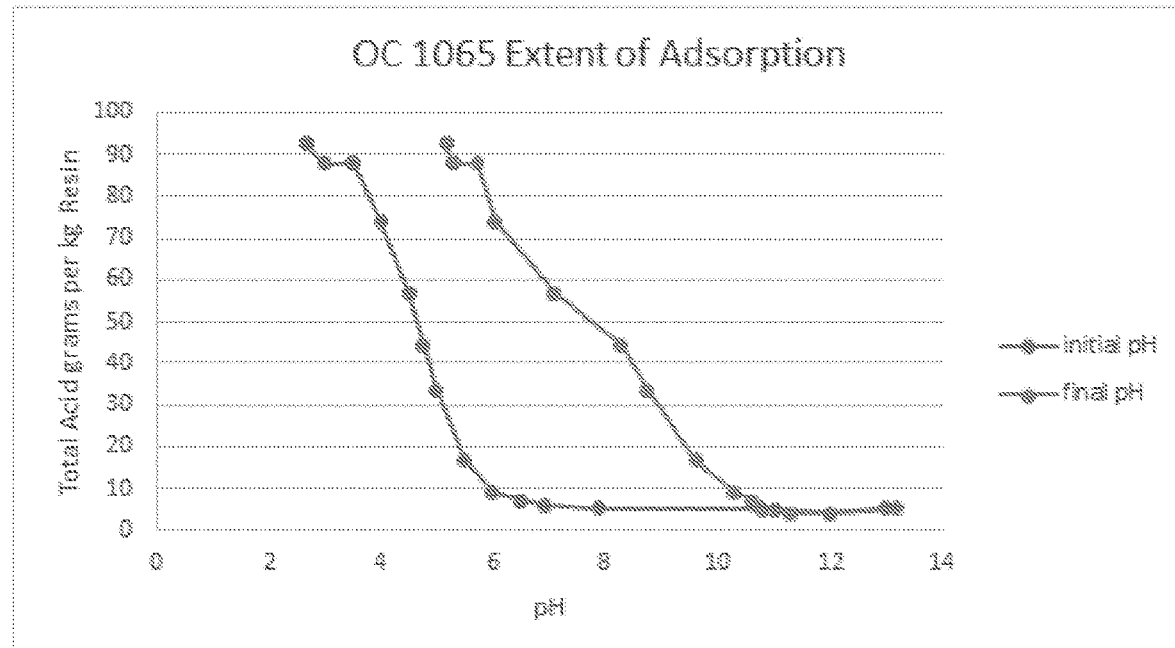
FIG. 51 shows acid loading for OC 1065.
Figure 52:
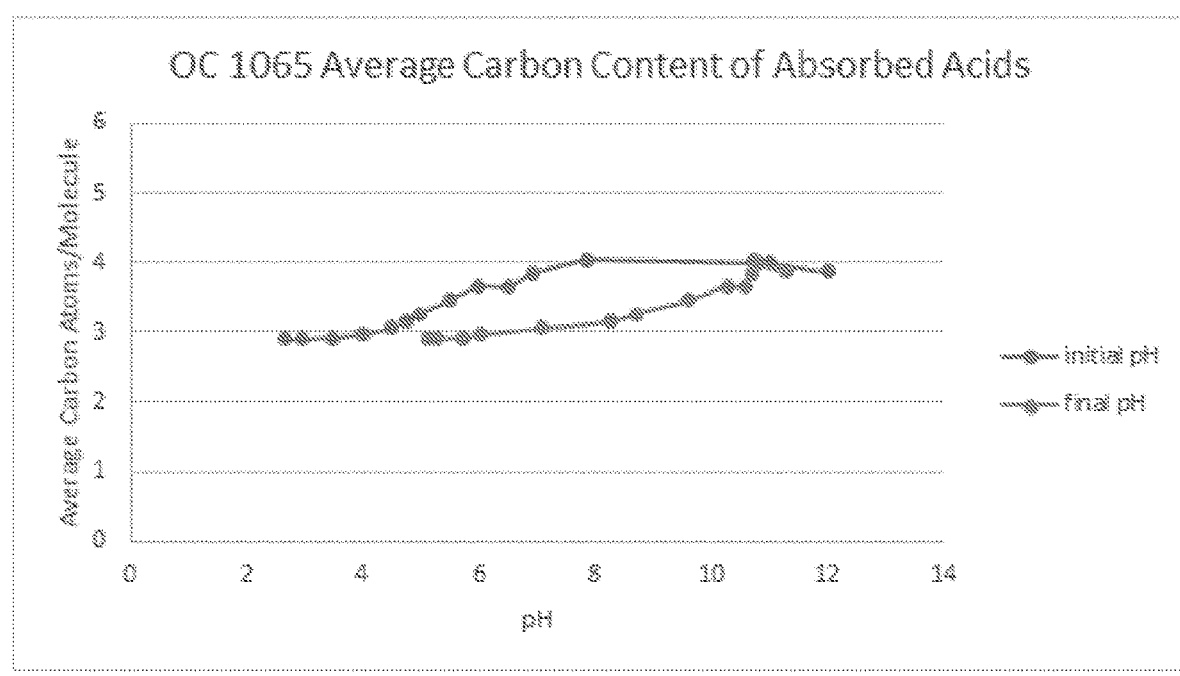
FIG. 52 shows average carbon number for OC 1065.
Figure 53A:
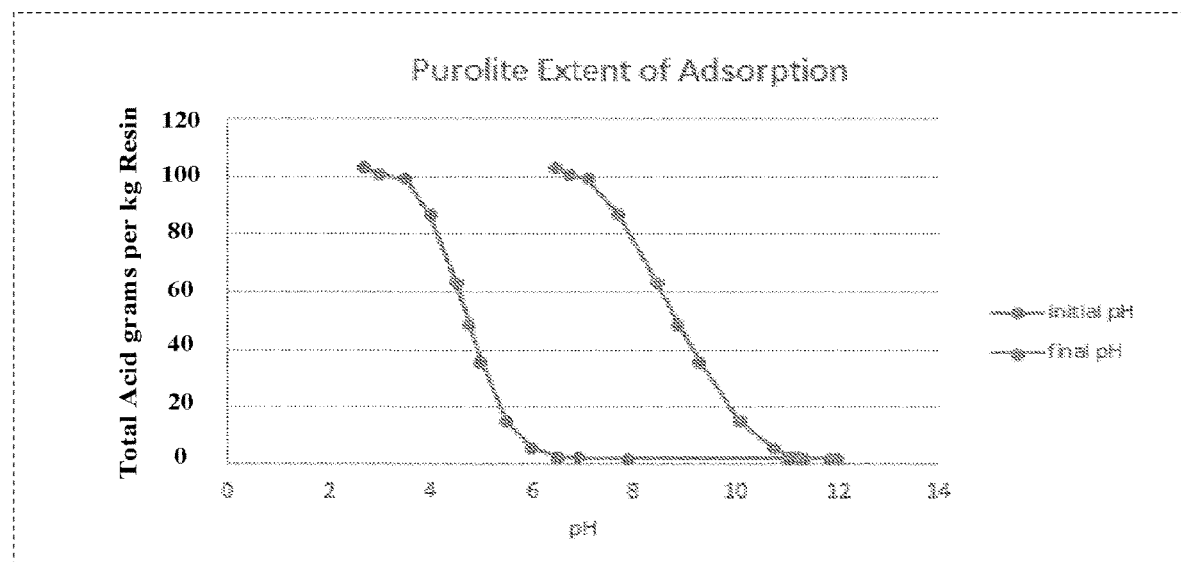
FIG. 53A shows acid loading for Purolite.
Figure 53B:
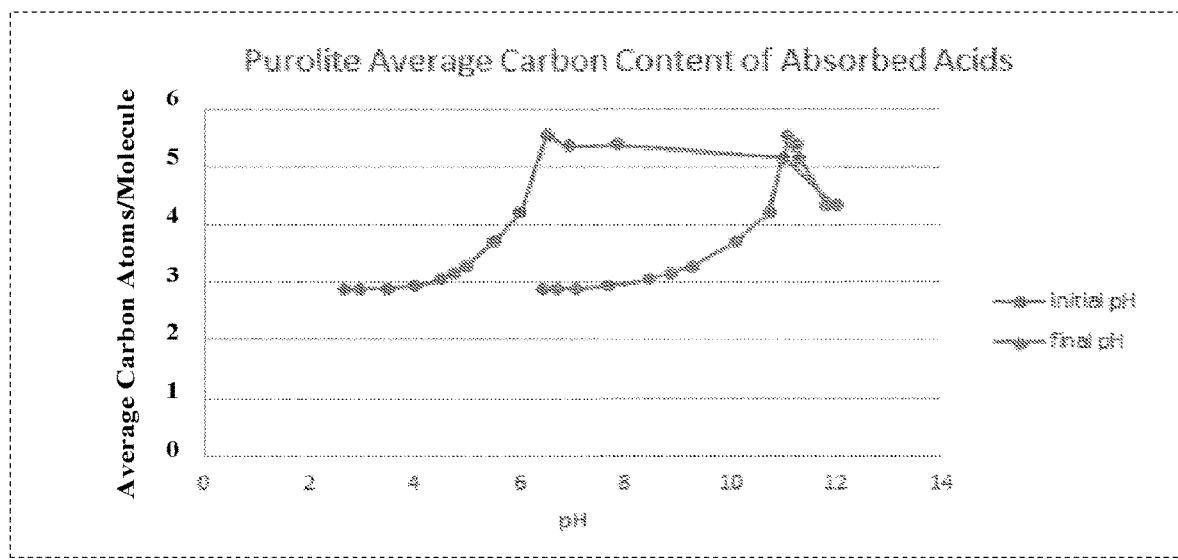
FIG. 53B shows average carbon number for Purolite.

A theoretical model was developed that matches the data with an $R^2$ value of 0.98 and then final pH was calculated based on this model. The results of this calculation are shown in FIG. 46. These data indicate that at the pH of fermentation broth (~7.0), the extractant does no attract acetic acid and therefore is not viable.

Example 5: Resins IRA 67, IRA 96, OC 1065, and Purolite

Several ion-exchange resins were tested for their ability to extract acids from a solution of mixed carboxylic acids at various pH values. Two liters of acid solution was made with a total acid concentration of 21.73 g/L with the acid concentrations shown in Table E-3.

TABLE E-3

Composition of acid solution

| Acid Species | Concentration (g/L) |
|---|---|
| Acetic | 9.04 |
| Propionic | 5.98 |
| Isobutyric | 0.605 |
| Butyric | 2.38 |
| Isovaleric | 0.23 |
| Valeric | 2.46 |
| Hexanoic | 1.035 |
| Total | 21.73 |

The acid solution was then titrated to various pH values using 50 wt % NaOH to various pH values. Each of the varied pH solutions was distributed in 20-mL quantities to various containers containing 4 g of one of the various resins. In this way, the adsorption characteristics of each resin were measured at various pH values of mixed-acid solutions.

The data from this example is presented in FIGS. 47 to 54. The extent of absorption is shown in terms of g acid/kg resin. These graphs give a good indication of the overall ability of the resin to recover acid. For each resin, the second graph shows the average number of carbon atoms present in the acid species recovered. This metric shows the selectivity of the resins for higher-molecular-weight acids. The acids in the fermentation broth model contained 2.88 carbon atoms per molecule on average. IRA-96 absorbs acids with an average of 3.91 carbon atoms at initial and final pH values of 6.5 and 8.91 respectively. This shows that IRA 96 shows a preference for high-molecular-weight acids at a pH similar to fermentation broth.

Example 6: Ion Exchange Resin Column Example

The advantage of using ion-exchange resins lies in the ability to regenerate resins when their adsorption capacity decreases. This study was undertaken to identify operation parameters for ion-exchange resin Amberlite IRA-67 in column mode.

Resins were poured into a 100-mL glass column. Acetic, propionic, and hexanoic acid solutions were passed through a resin column. The initial concentration of the solutions follow: 17.97 g/L (acetic acid), 17.92 g/L (propionic acid), and 17.96 g/L (hexanoic acid). Acid solution was continuously passed through an ion-exchange resin column and flow was ceased only when the column had reached its maximum adsorption capacity and was not adsorbing any more acid. Acids adsorbed onto the resin were recovered easily by passing sodium hydroxide (NaOH) solution through the column. Three solutions were prepared containing about 18 g/L of acetic, propionic, or hexanoic acids. A peristaltic pump was used to pass acid solution into the ion-exchange resin column and the outlet stream of solution was collected at 10-mL intervals for the first 200 mL of acid solution passed. Acid concentration of each sample was analyzed using a gas chromatograph (GC). When the column had reached its maximum adsorption capacity and required regeneration, 1-M NaOH solution was passed through the resin column and the solution eluted from the column was collected in 20-mL intervals. The volume of NaOH solution to be passed through the resin column was calculated as 240, 280, and 260 mL for acetic, propionic, and hexanoic acid solutions, respectively. Samples of the solution eluted were prepared for acid concentration analysis by GC.

Acid adsorbed on the resin was extracted by passing a solution of NaOH of known concentration and volume through the column. The mass of wet ion-exchange resin in the column was 30 g. It was observed that the resins with adsorbed acids were swollen; upon passage of base, the resins shrunk in size as the acids were eluted. The acid concentration of the solution eluted from the resin column was 2-3 times higher than that of the solution initially passed. This is beneficial because it helps concentrate acid solutions prior to downstream processing.

Figure 54:
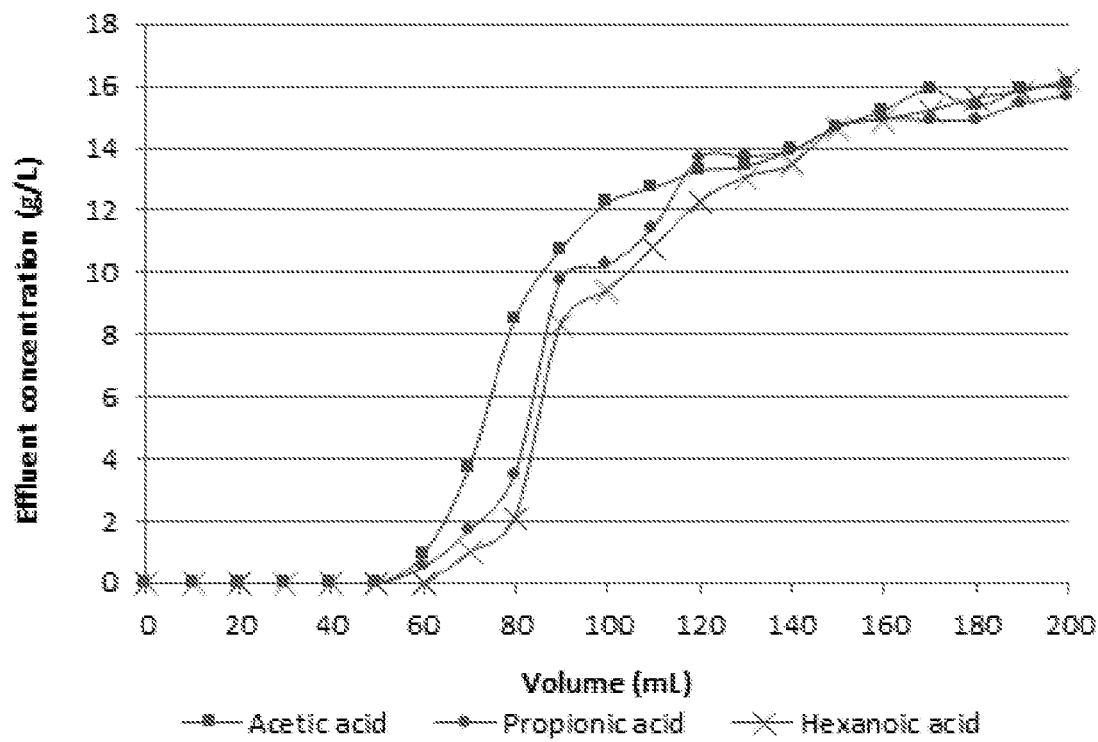
FIG. 54 shows effluent concentration from Amberlite IRA-67 during loading phase.
Figure 55:
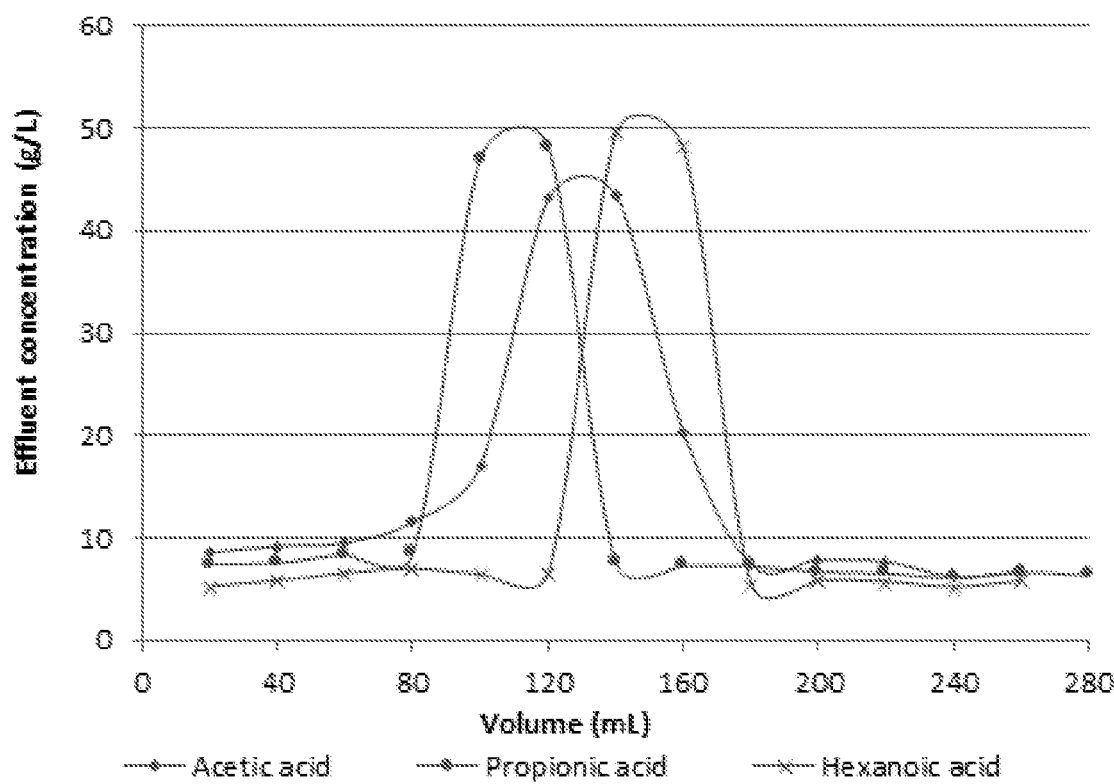
FIG. 55 shows effluent concentration from Amberlite IRA-67 during regeneration phase.
Figure 56:
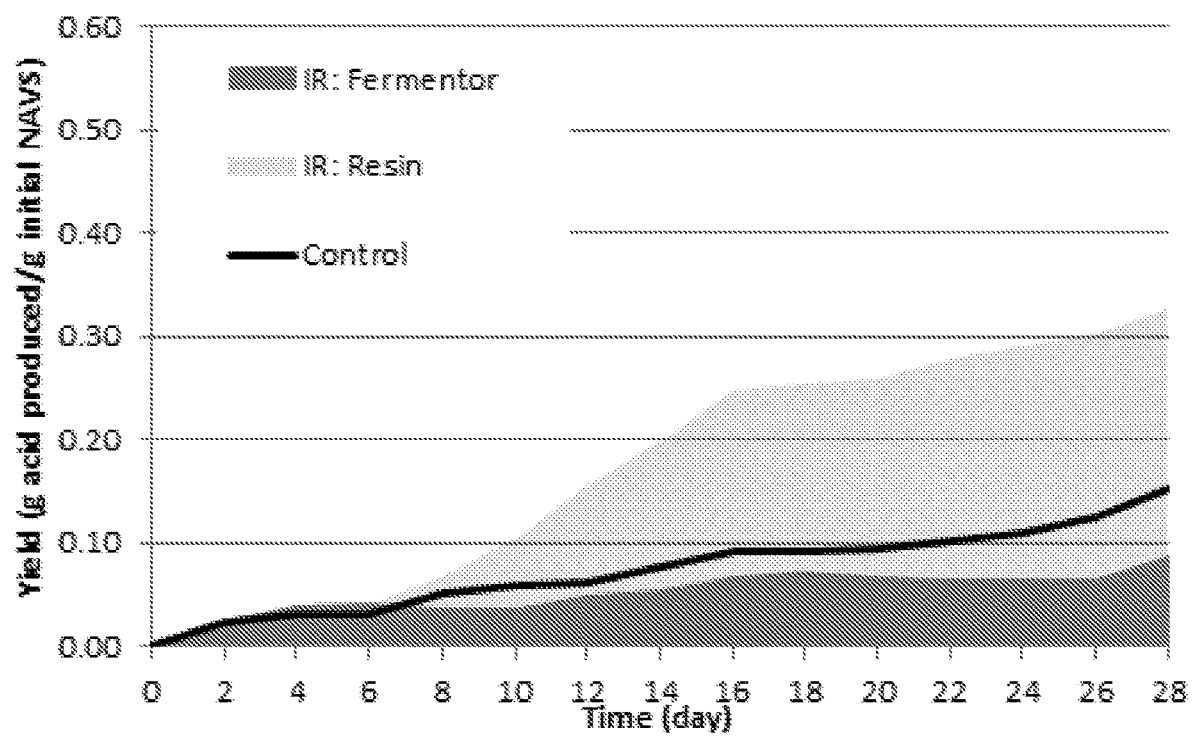
FIG. 56 shows the yield: α-cellulose for the experiment.
Figure 57:
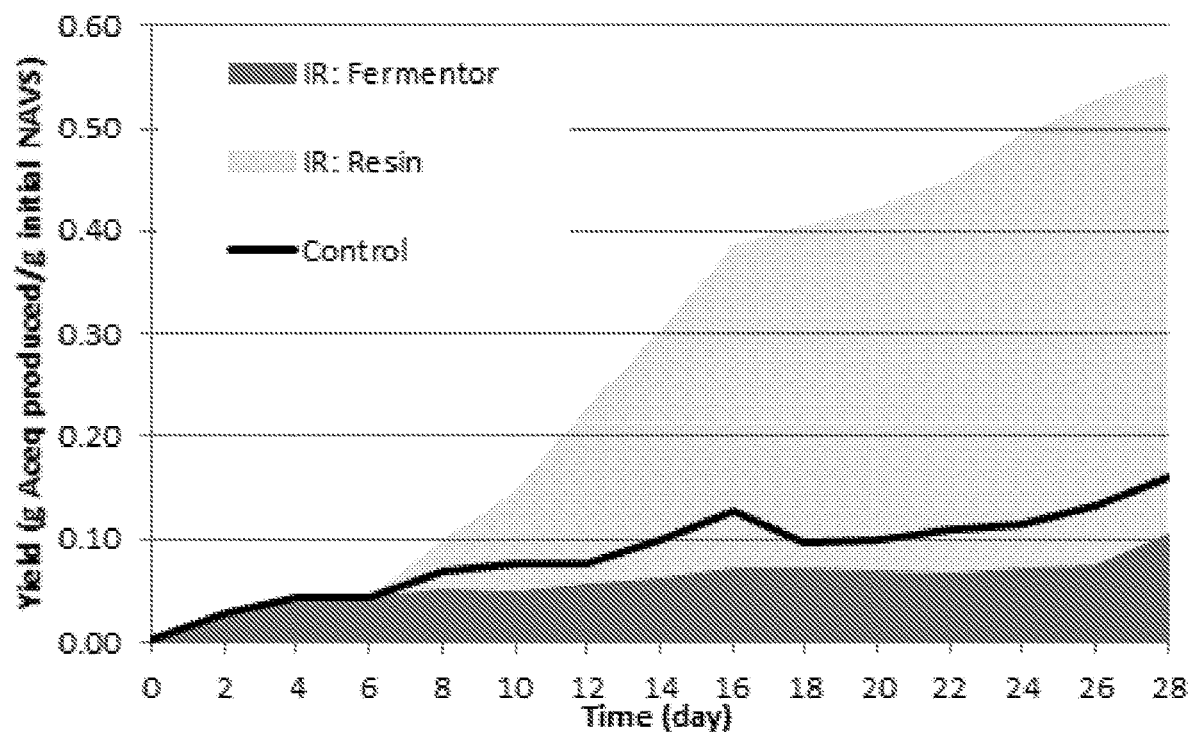
FIG. 57 shows yield (Aceq): α-cellulose for the experiment.
Figure 58:
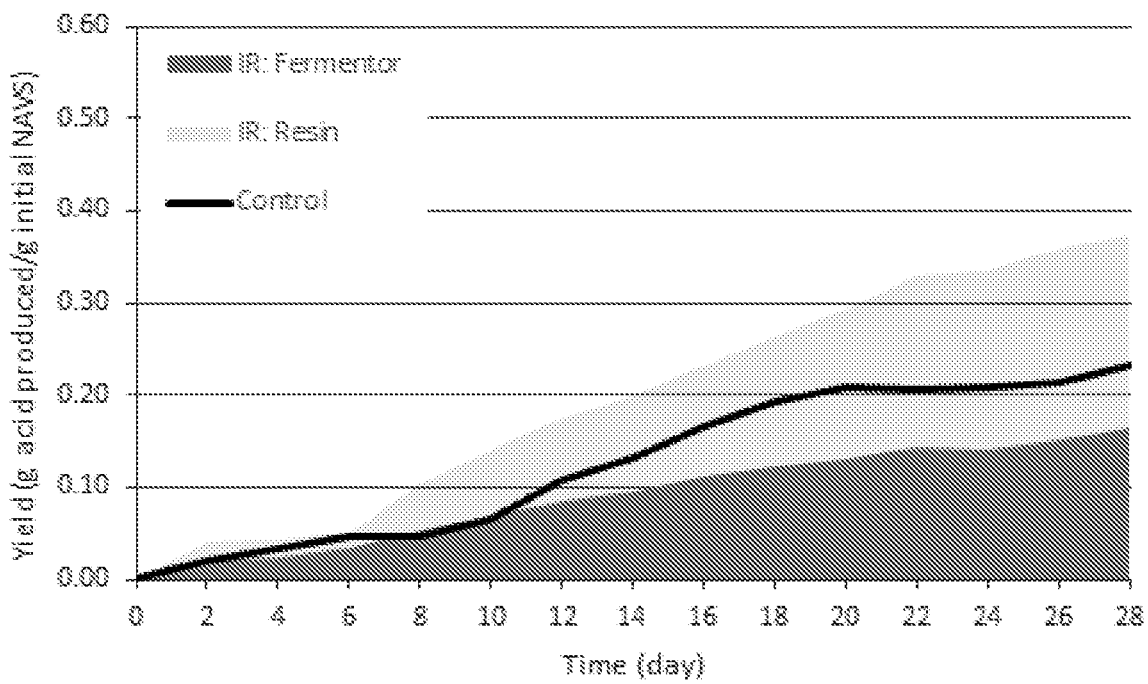
FIG. 58 shows yield: office paper for the experiment.
Figure 59:
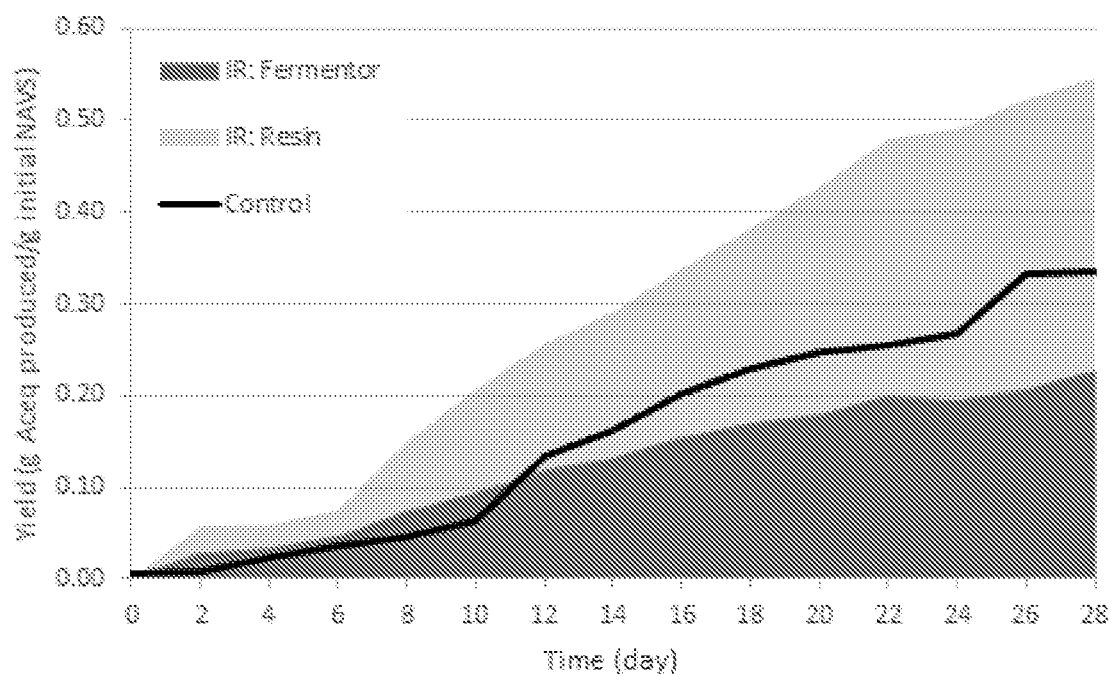
FIG. 59 shows yield (Aceq): office paper for the experiment.
Figure 60:
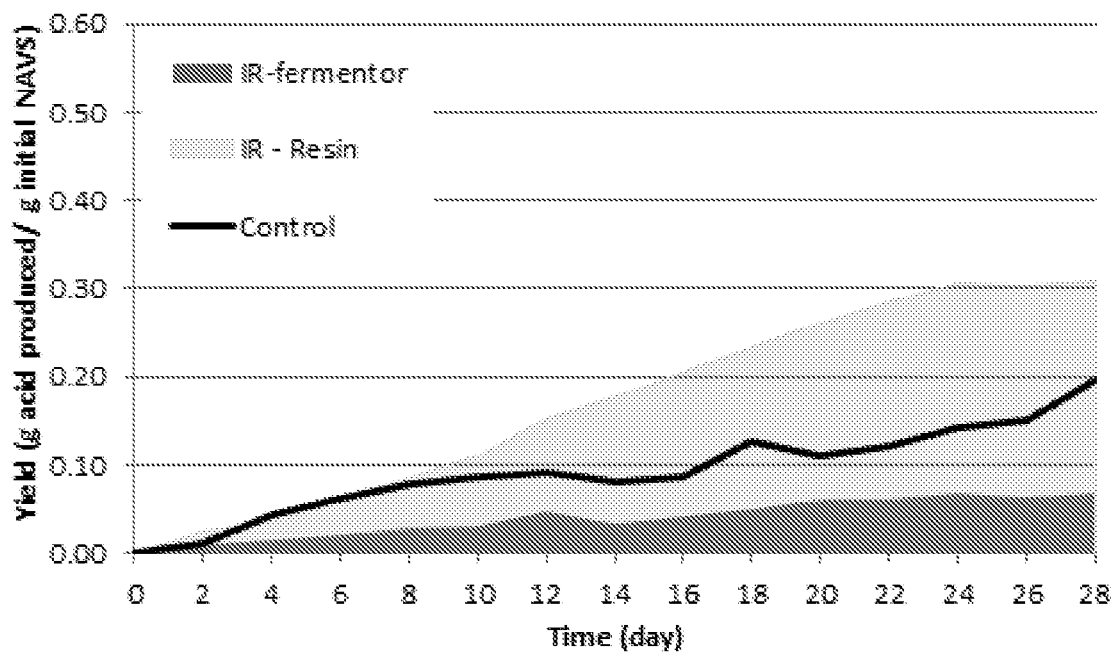
FIG. 60 shows yield: lime-pretreated corn stover for the experiment.
Figure 61:
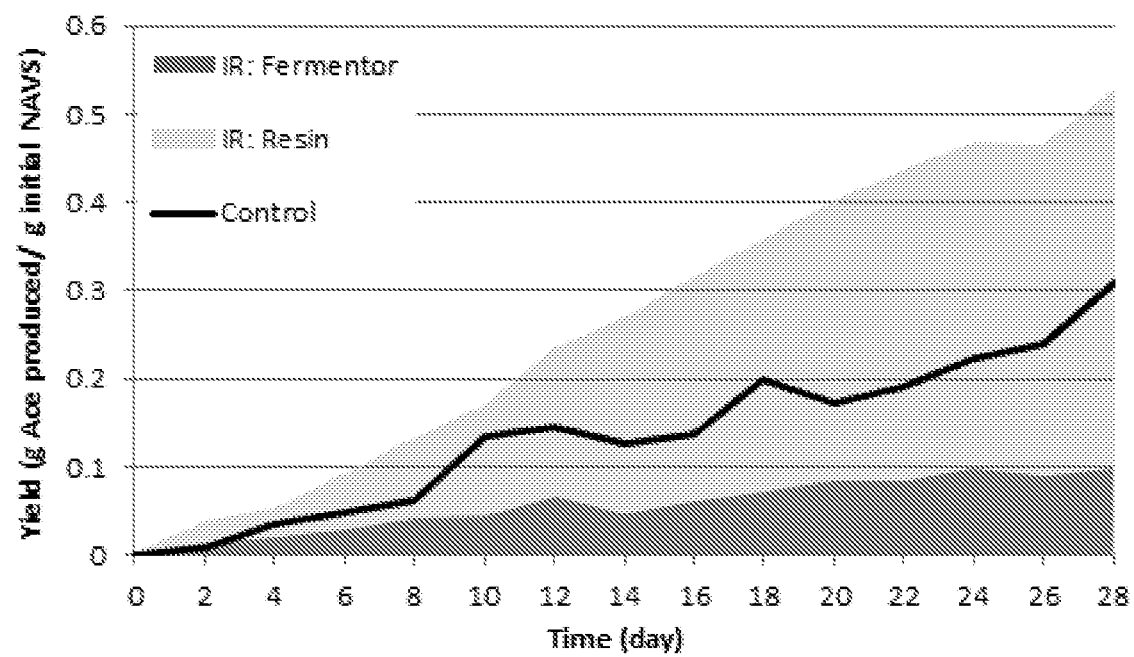
FIG. 61 shows yield (Aceq): lime-pretreated corn stover for the experiment.
Figure 62:
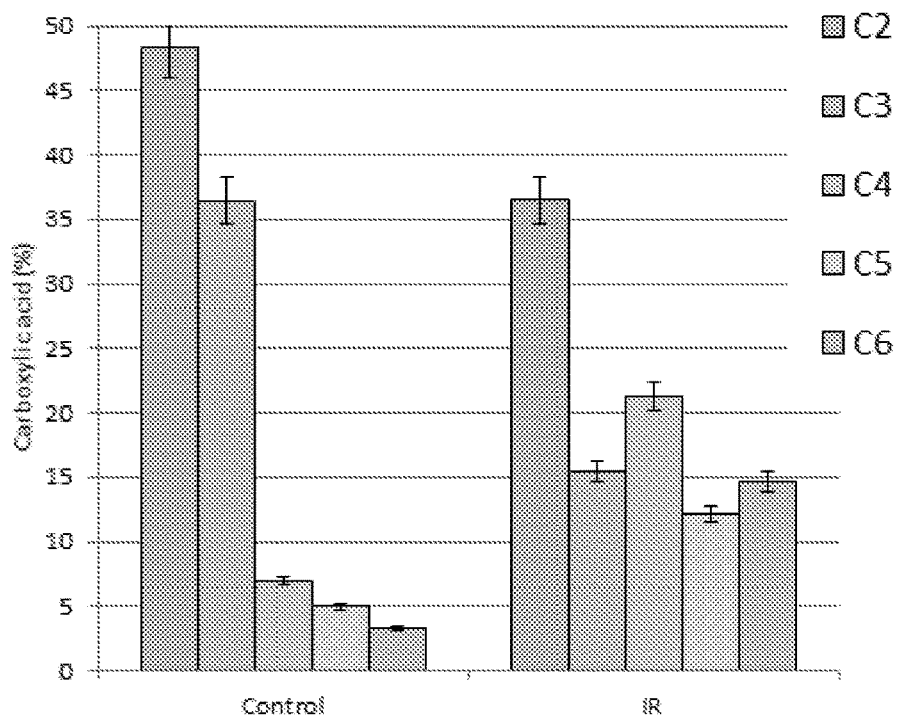
FIG. 62 shows acid distribution: α-cellulose for the experiment.
Figure 63:
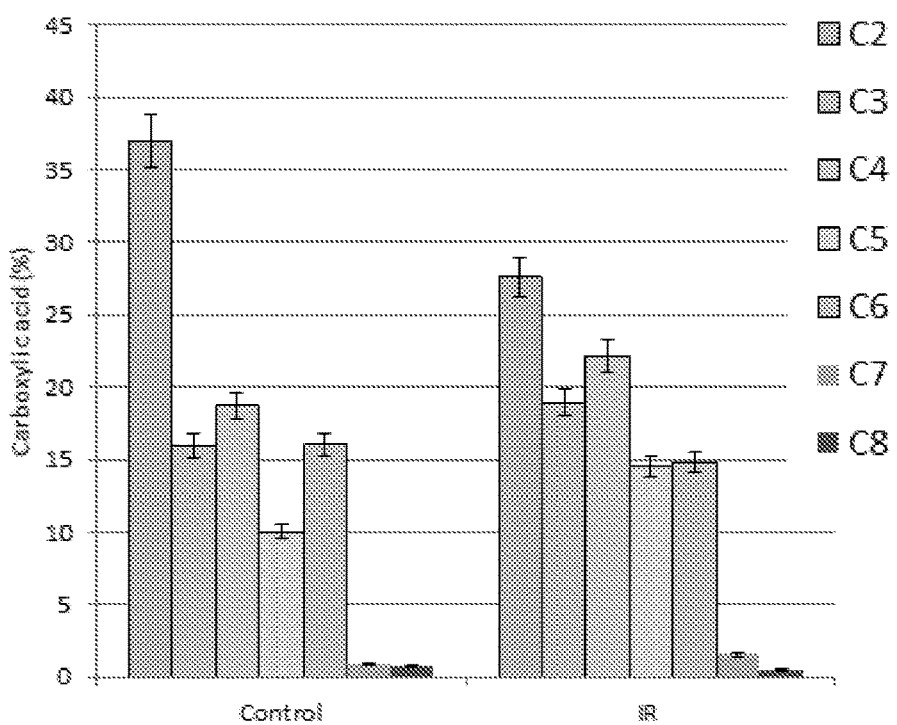
FIG. 63 shows acid distribution: office paper for the experiment.
Figure 64:
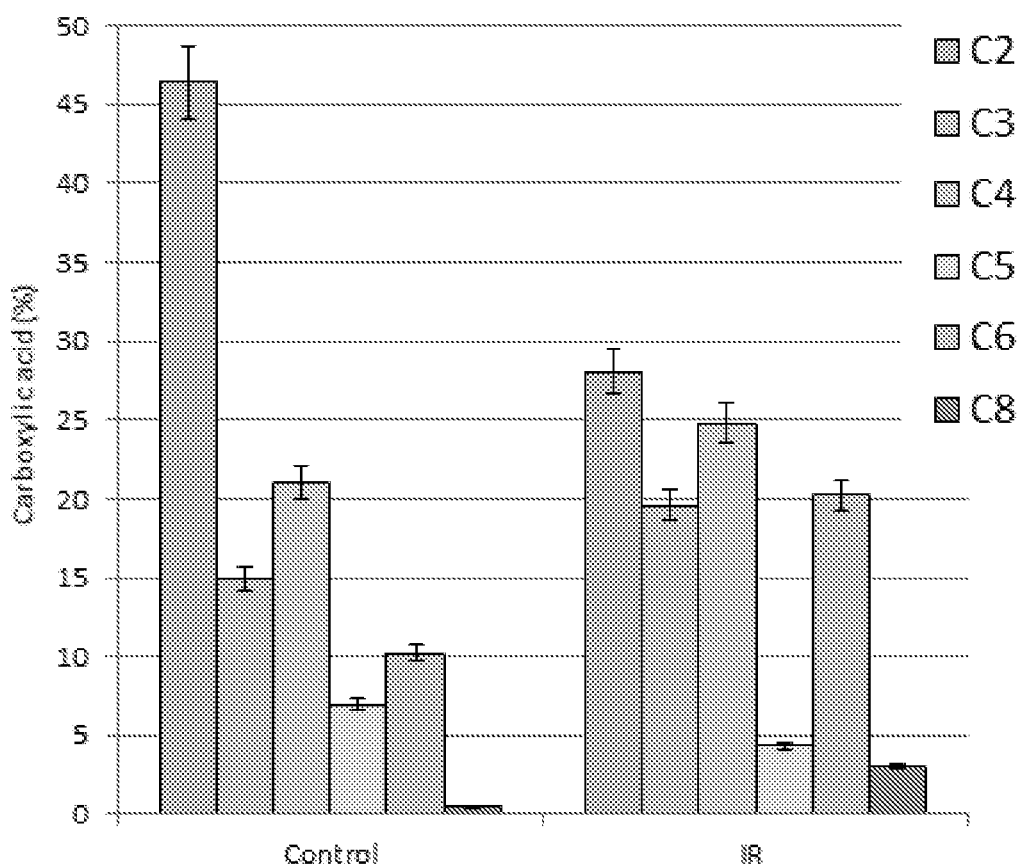
FIG. 64 shows acid distribution: lime-pretreated corn stover for the experiment.

FIG. 54 shows the adsorption characteristics of Amberlite IRA-67 in column mode by measuring the final concentration of acid solution eluted from the column. FIG. 55 shows the elution characteristics of Amberlite IRA-67 in column mode by measuring the concentration of acid in the solution eluted when NaOH is passed through the resin column.

Example 7: Fermentation with Ion Exchange Resin Example

Fermentations were performed using α-cellulose powder, shredded office paper, and lime-pretreated corn stover as substrates. Every 24 to 48 h, biogas was removed to prevent pressure build-up, iodoform was added to inhibit methane production, and the pH was adjusted. In the control group, pH was adjusted by adding magnesium carbonate until the pH was near neutrality. In the test group, fermentation broth was repeatedly passed through a column of IRA 67 ion exchange resin until the pH was near neutrality. The acids were recovered from the ion-exchange resin using high-concentration NaOH. The acid concentration in the fermentation broth and the NaOH recovery solution were determined using a gas chromatograph. The total mass of acid in the fermentation broth and resin was determined from these concentrations by mass balance. The experiment continued in this manner for 28 days. In this way, the effect of ion exchange resin (IR) on fermentation yield and preference for higher molecular weight acids could be tested. FIGS. 56 to 64 show that removing acid products using ion-exchange resin greatly improves the overall yield and fermentation rate. Also, a greater portion of acid products are medium-chain acids rather than short-chain acids. In some case, the figures express the acid concentration as acetic acid equivalents (aceq), which expresses the reducing potential of the acid mixture as equivalent acetic acid. Expressing concentrations as acetic acid equivalents puts all acids on the same energy basis and shows the benefits from the extra reducing potential of high-molecular-weight acids.

Example 8: Two-Stage Fermentation

Part 1: Acid Production at 55° C.

Figure 65:
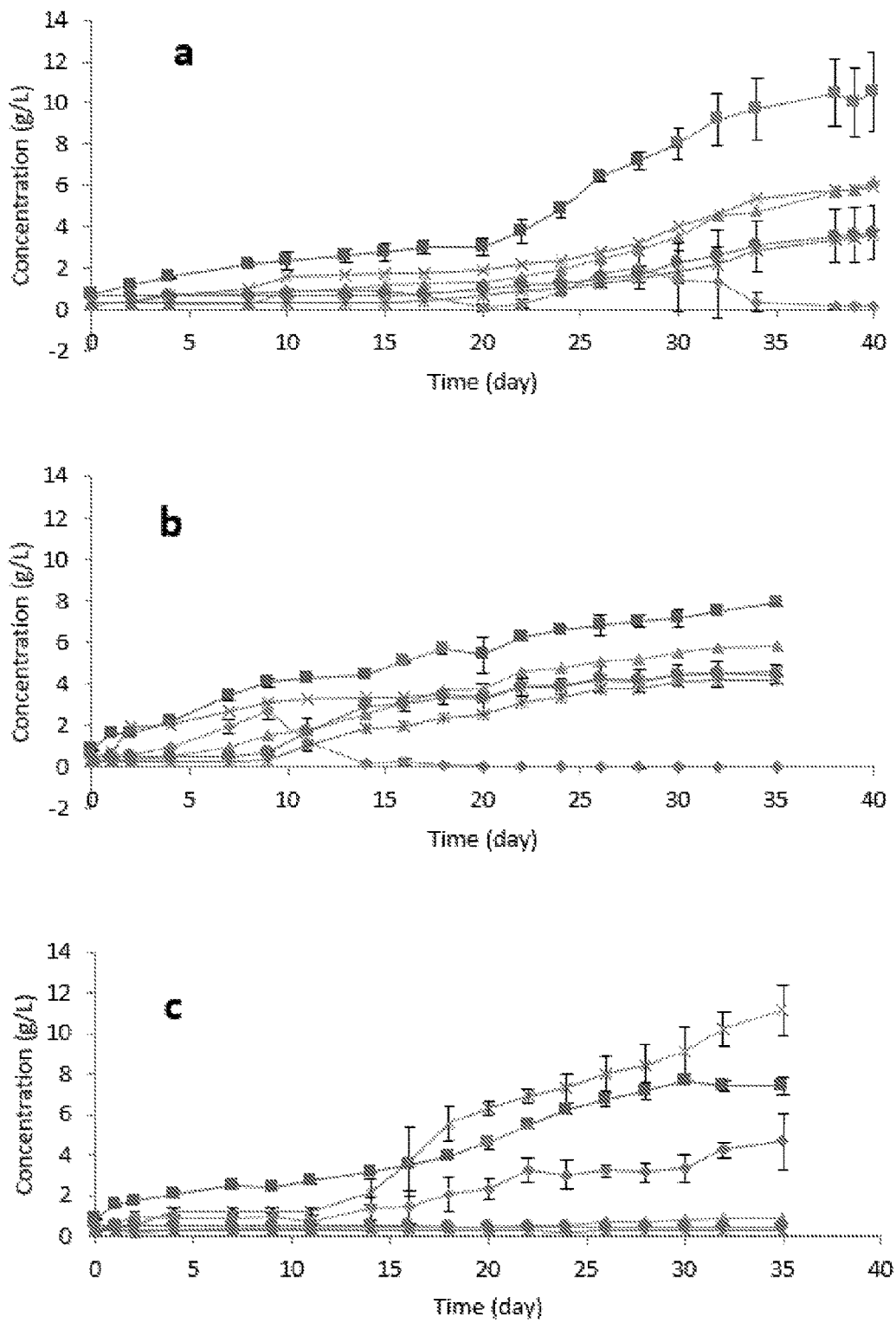
FIG. 65 shows the effect of temperature on acid production in mixed-culture fermentation.

Mixed-culture fermentation of office paper and chicken manure (in 4:1 ratio on dry weight basis) at 25, 40, and 55° C. and at neutral pH is shown in FIG. 65. The initial solids concentration was 10%.

At 55° C., short-chain acids are selectively produced. In addition to acids, ethanol is also produced from biomass (in-situ generation), which will reduce the external ethanol needed for chain elongation and therefore, will improve process economics.

Part 2: Chain Elongation at <40° C.

Figure 66:
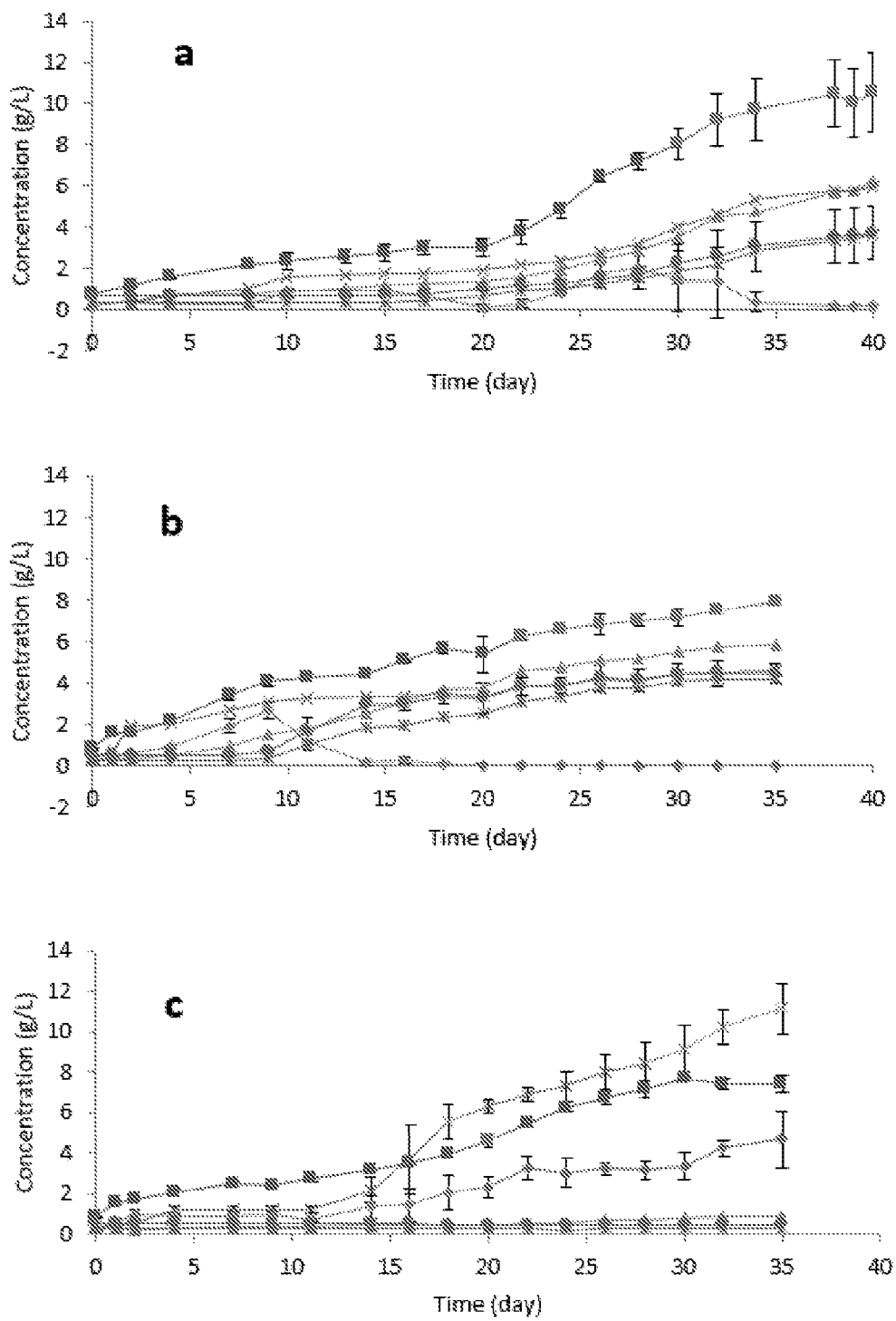
FIG. 66 shows the effect of temperature on chain elongation in mixed-culture fermentation.

Mixed-culture fermentation of office paper and chicken manure (in 4:1 ratio on dry weight basis) at 25, 40, and 55° C. with added ethanol (10 g/L) is shown in FIG. 66. The initial solids concentration was 10%. The fermentation was performed at neutral pH. Chain elongation occurs at 25 and 40° C. At 55° C., chain elongation does not occur.

During chain elongation, both ethanol and short-chain acids are consumed (section and (a) and (b) of FIG. 66). Sometimes, the consumption of short-chain acids during chain elongation is less pronounced (section (b) of FIG. 66) because the short-chain acids are produced in-situ from biomass as it is digested. So, we see either a small decrease in short-chain acid concentration or these concentrations remain constant (because the acids are consumed as they are produced). When all of the ethanol is consumed, the concentrations of acetic and butyric acid increase again.

Example 9: Carboxylic Acid Production Using Reversible Mineral Acid

Part 1—Conversion of Ammonium Sulfate into Ammonium Bisulfate

Hypothesis—When ammonium sulfate is heated to high temperature (250° C.), it is converted to ammonium bisulfate and releases ammonia (gas).

Experiment

Dry ammonium sulfate salt was heated in furnace at 250° C. for 1 day and loss in weight was measured. The loss in weight of sample was 3.7%. The temperature was selected based on the information published in literature. Ammonium sulfate is decomposed into ammonium bisulfate and ammonia at temperatures between 200-300° C. [1]

Solutions of original ammonium salt and heat treated salt were prepared in water. The concentrations were approximately 30 g/L. The pH of the solutions was measured.

pH of ammonium sulfate salt—5.30 pH of heat-treated salt—2.15

According to literature, pH of ammonium sulfate is between 5-6 and pH of ammonium bisulfate is between 1.5-2.5.

Conclusion

The decrease in pH of solution prepared with heat treated salt as compared to pure ammonium sulfate salt indicates that ammonium sulfate is converted to ammonium bisulfate.

Part 2—to Test if Ammonium Caproate Solution can be Concentrated by Evaporating Water without Formation of Amide Hypothesis—Ammonium caproate is converted to its corresponding amide when heated.

Experiment

Solution A—An aqueous solution of caproic acid and ammonium hydroxide was prepared. The pH of solution was 9.87. Caproic acid concentration was 9.9 g/L.

50 mL of Solution A was heated in open beaker using hot plate to evaporate water. After some time, the volume of remaining solution (Solution B) was 15 mL. pH of solution B was 6.15. The caproic acid concentration of Solution B was 33.85 g/L. The amount (in grams) of caproic acid in Solutions A and B were approximately the same.

Amount of caproic acid in Solution $A$=50 mL×9.9/1000 (g/mL)=0.495 g

Amount of caproic acid in Solution $B$=15 mL×33.85/1000 (g/mL)=0.5077 g

The error between the two amounts is an experimental/analysis error.

Conclusion

The amount of caproic acid remains the same even after concentrating the aqueous solution of ammonium caproate. This indicates that amide is not formed when concentrating aqueous solution of ammonium caproate.

Acid (or ammonium bisulfate salt) can be added to this concentrated aqueous solution of ammonium caproate to produce pure caproic acid, which forms a separate layer because of its low solubility in water at low pH.

Part 3—to Test if Caproic Acid can be Separated when pH of Ammonium Caproate Solution is Decreased by Addition of Ammonium Bisulfate Experiment Solution C—Aqueous solution of caproic acid and ammonium hydroxide was prepared. Caproic acid concentration is 44 g/L. pH of the solution is 9.5

Solution D—Aqueous solution of caproic acid and ammonium hydroxide was prepared. Caproic acid concentration is 22 g/L.

Ammonium bisulfate (0.5 g) was added to 10 mL of both Solutions C and D and pH was measured. pH of Solution C dropped to 5.09 and that of Solution D dropped to 1.83. A separate organic layer of caproic acid was observed on the surface of solution. A sample was taken from aqueous phase of both the solutions and was analyzed for caproic acid concentration. The concentration of caproic acid in Solution B was 17 g/L (it was 44 g/L before addition of ammonium bisulfate) and in Solution D was 7 g/L (it was 22 g/L before addition of ammonium bisulfate).

Conclusion

Caproic acid can be separated from aqueous solution of ammonium caproate by reducing the solution pH by adding ammonium bisulfate.

Figure 67:
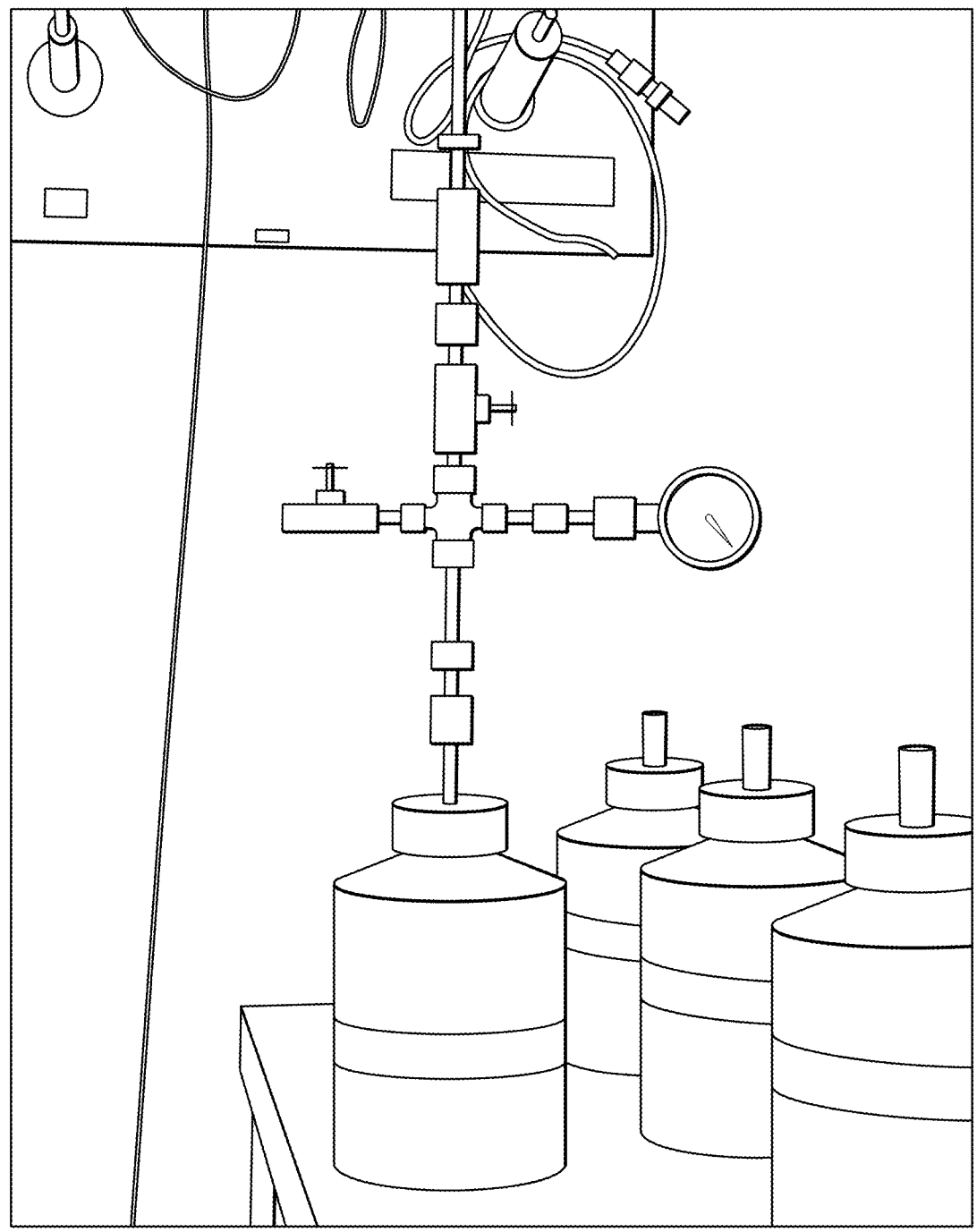
FIG. 67 shows stainless steel fermenter for gas composition fermentations.
Figure 68:
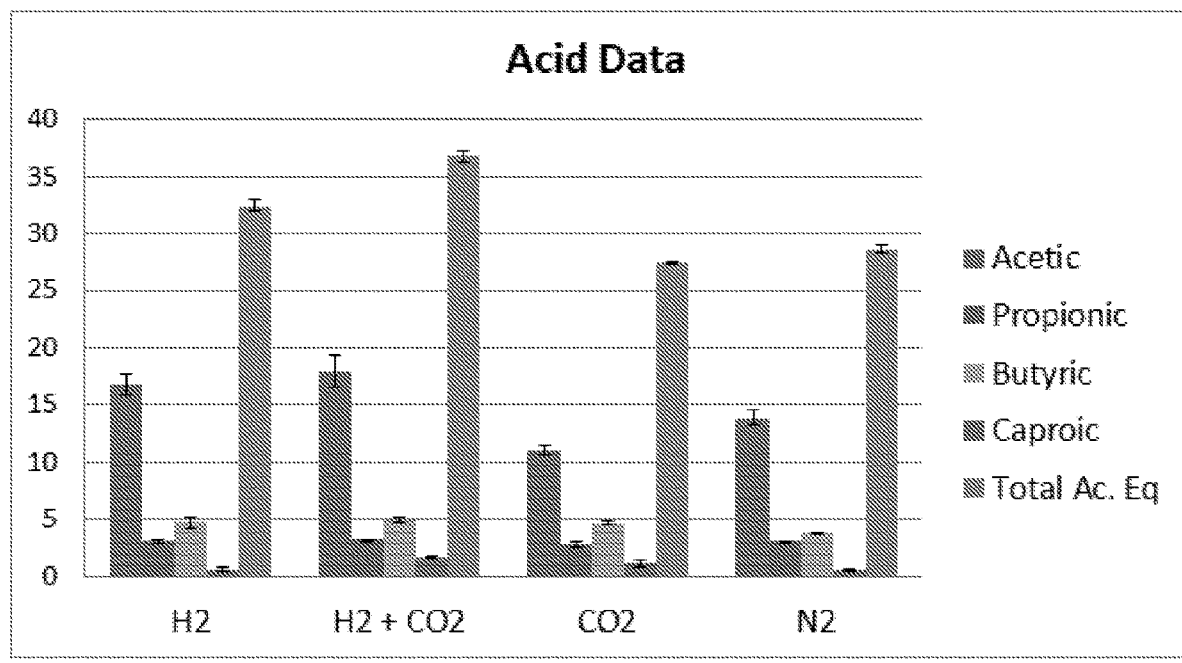
FIG. 68 shows carboxylic acid distribution for different headspace gas compositions.

Example 10: Effect of Gaseous Composition in the Headspace of the Mixed-Acid Fermenters Mixed-culture fermentations of raw (no pretreatment) corn stover and chicken manure (in 4:1 ratio on dry weight basis) were performed in air-tight stainless steel fermenters as shown in FIG. 67.

Experimental Set-Up

- Four different headspace compositions were used: hydrogen, hydrogen and carbon dioxide (1:1 ratio), carbon dioxide, and nitrogen
- Substrate loading: 100 g/L (raw corn stover and chicken manure in 4:1 ratio)
- Total volume: 400 mL
- Headspace pressure: 15 psig
- Incubation temperature: 40° C.
- Liquid medium: deoxygenated water
- Inocula: marine mixed culture
- Methane inhibition: iodoform 20 g $CHI_3$/L ethanol, 30 µL of this solution added every alternate day.
- Buffer: $MgCO_3$
- Samples (1 mL) were taken every alternate day, and the respective headspace gases were replenished to a headspace gas pressure of 15 psig.

Fermentation Acid Analysis

Fermentation liquid samples (1 mL) were collected every other day and the carboxylic acid concentration was measured using an Agilent 7890A Series Gas Chromatograph (GC) system equipped with a flame ionization detector (FID) and an Agilent 7683 automatic liquid sampler (Figure E-30). Table E-4 highlights the change in the acid profile. Addition of $CO_2$ enhances production of higher acids, such as butyric and caproic acids. Table E-5 shows other fermentation parameters (concentration, yield, conversion, and selectivity). Addition of $CO_2+H_2$ significantly enhanced conversion and yield. The enhanced yield is expected because this gas composition provides both a carbon source and energy source that can make additional product. It was unexpected that this gas composition also enhances biomass conversion.

TABLE E-4

Percentage change in acid composition compared to $N_2$ fermentor

| Headspace gas | Acetic C2 | Propionic C3 | Butyric C4 | Caproic C6 | Total Ac. Eq |
|---|---|---|---|---|---|
| $H_2$ | 20.34 | −0.23 | 21.87 | 5.19 | 13.19 |
| $H_2 + CO_2$ | 29.25 | 6.38 | 27.44 | 187.14 | 37.23 |
| $CO_2$ | −20.61 | −8.45 | 20.04 | 98.69 | −4.23 |

TABLE E-5

Batch fermentation of corn stover for 35 days

| Fermenter | $H_2$ | $CO_2$ | $H_2:CO_2$ (1:1) | $N_2$ |
|---|---|---|---|---|
| Total carboxylic acid concentration (g/L) | 26.2 | 20.7 | 28.9 | 21.3 |
| Yield (g total acids/ g $VS^1$ fed) | 0.193 | 0.166 | 0.250 | 0.172 |
| Conversion (g VS digested/ g VS fed) | 0.42 | 0.32 | 0.51 | 0.42 |
| Selectivity (g total acids/ g VS digested) | 0.46 | 0.52 | 0.49 | 0.41 |

[1]VS: volatile solid

Note:
Experiments were performed in duplicate.

Example 11

This experiment combines pretreatment and fermentation processes into one process called co-treatment. The untreated substrate, corn stover, was placed into the fermentor and treated by grinding over the course of the fermentation period. The grinding process disrupts the structure of the lignin to increase microbial access to hemicellulose in order to produce more carboxylic acids than untreated substrate. This is the substitute of typical pretreatment processes such as the use of various acids and bases. The purpose of co-treatment is to combine the treatment and fermentation processes in order to produce equal or higher acid concentrations than performing the two processes separately. If the co-treatment results prove successful, the energy costs of performing pretreatment can be eliminated, as well as any adverse effects pretreatment causes on digestion via microorganisms.

Materials
Fermentor Bottle Configuration

Figure 69A:
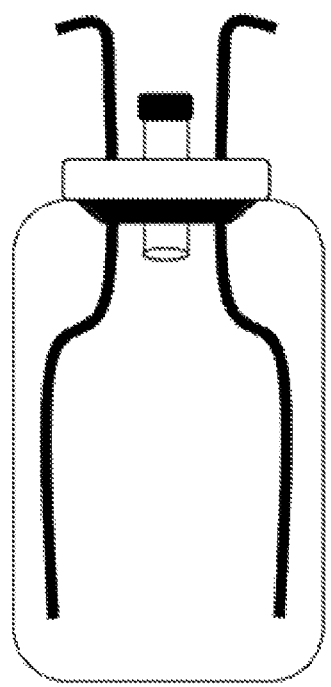
FIG. 69A shows a diagram of a fermentation bottle.

The fermentors (FIG. 69A) were created using Nalgene® 1-L high density polyethylene (HDPE) bottles with rubber stoppers as caps. In each rubber stopper, a glass tube was inserted and capped with a rubber septum and aluminum pressure cap. Two 0.25-inch stainless steel rods were inserted through the rubber stopper to facilitate mixing in the fermentor as it rotated in the incubator.

Fermentor Contents

Six fermentor bottles were each filled with 12.24 g of chicken manure, 52.12 g of corn stover, 350 mL of deoxygenated water, 1.2 g urea, and 50 grams of inoculum. The inoculum was originally extracted from Galveston, Texas soil, but for this experiment, the liquid from a previous co-treatment experimental bottle from a previous experiment was used as inoculum. The liquid from the previous experimental bottle was used because it contains a culture of microorganisms that had already been adapted to the substrate, corn stover, and the nutrient, chicken manure.

Grinder Configuration

Figure 69B:
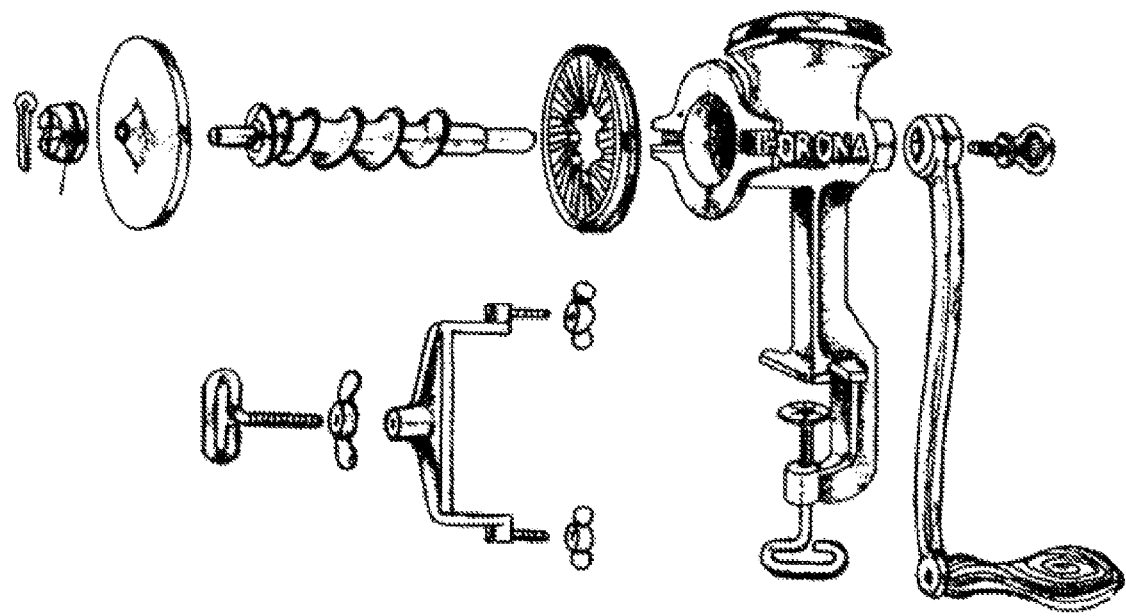
FIG. 69B shows a diagram of a cast iron manual crank grain mill.
Figure 70:
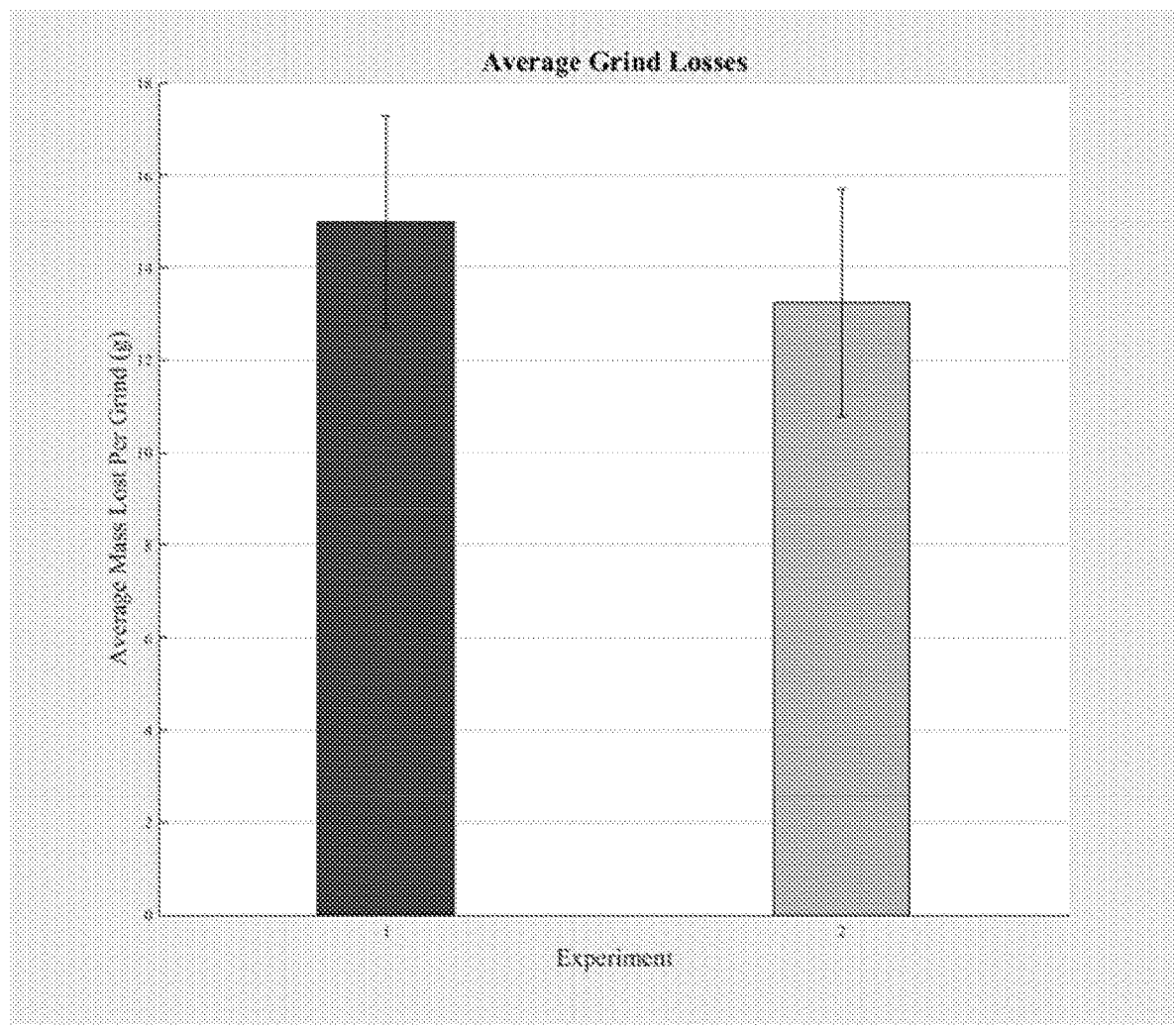
FIG. 70 shows a bar graph of average losses due to grinding for the experiment.

A cast iron manual crank grain mill was used to grind the solids during the co-treatment experiment. FIG. 69B outlines the design of the grain mill used.

Methods
Preparation of Bottles

Six Nalgene® 1-L high density polyethylene (HDPE) bottles and six stoppers were washed and autoclaved. Then, the weight of each of the bottles and the stoppers were recorded. To each bottle, 50 g of inoculum, 12.24 g of chicken manure, 52.12 g of corn stover, 1.2 g of urea, 120 µL of iodoform, and 350 g deoxygenated water were added. Once the bottles were closed with the stopper, the final weight was recorded and the bottles were placed inside the incubator. The incubator consists of about 50 continuously rolling pipes at 40° C. The bottles were placed inside one of the rolling pipes and spun continuously until removed after 48 hours. The steel bars inside the fermentors mixed the contents while the bottles were spun.

Sampling Only Procedure

Every 48 hours, the fermentors were removed from the incubator, allowed to cool, and initial weights were recorded. The gas inside the fermentor was vented and the volume recorded. The bottles were taken to the fume hood where their stoppers were removed and they were capped with a screw top in order to centrifuge. Then, pairs of bottles were balanced with each other and centrifuged for 10 minutes at 4000 rpm. After the centrifuge, the bottles were brought back to the fume hood where they remain for the remainder of the experiment.

To take a sample, six sample centrifuge tubes were labeled with the date and C1, C2, E1, E2, LC1, or LC2. The screw cap of each bottle was removed to take a 1.0-mL liquid sample directly from the bottle. This was repeated for all bottles. Then, the pH probe was washed and used to read the pH of the liquid directly from the bottle. The pH was recorded, and the probe was cleaned and used again for the rest of the bottles. If the pH was below 6.5, sodium hydrogen bicarbonate was used as a buffer to raise the pH. Next, 120 µL of inhibitor were added to each of the bottles. Finally, the oxygen was purged by nitrogen for 35 seconds and capped with the respective rubber stopper. The final weight of the bottles was recorded, and the bottles were placed back into the incubator to be removed after the next 48 hours.

Sampling and Grinding Procedure
Sampling

The experimental bottles were ground every 4 days, which was every other sampling day. On every fourth day, all of the bottles were sampled and the solids from two experimental bottles were ground.

The fermentors were removed from the incubator, allowed to cool, and initial weights were recorded. The gas inside the fermenter was vented and the volume recorded. The bottles were taken to the fume hood where their stoppers were removed and they were capped with a screw top in order to centrifuge. Then, pairs of bottles were balanced with each other and centrifuged for 10 minutes at 4000 rpm. After the centrifuge, all the bottles were brought back to the fume hood.

Immediately, the liquid from each of the experimental bottles (E1, E2) and loss-control bottles (LC1, LC2) was poured into separate labelled, tared beakers and the liquid weights of the liquids were recorded. Next, the caps were removed from the same four bottles and the bottle was placed onto the scale and the weight of the solid+bottle was recorded.

To take a sample, six sample centrifuge tubes were labeled with the date and C1, C2, E1, E2, LC1, or LC2. The screw cap from each bottle was removed to take a 1.0-mL liquid sample directly from the bottles of C1 and C2. The liquid sample for E1, E2, LC1, and LC2 were taken from the beaker containing the respective liquid. Then, the pH probe was washed and used to read the pH of the liquids.

Assembly of the Grinder

The grinder (FIG. 69B) was securely fastened to a wooden table via the attached screw clamp. Upon being secured to the table, each component was assembled following the manufacturer's instructions. In order to ensure adequate shear stress was applied to the feedstock, the burrs of the grinder were tightened until a noticeable amount of torque was required to operate the grinder. A plastic rectangular box with adequate wall height was placed under the burrs of the grinder to catch the grinded solids.

Grinding Procedure

Using a spatula, about a fourth of the solids in E2 bottle were removed and placed into the top of the grinder. The arm of the grinder was rotated forcing the solids through the burr blades. At the same time, a spatula was used to scrape off the solids that built up from the blades into the plastic tray. More solids were continuously added into the top of the grinder until all of the solids from E2 were ground. Next, the grinder was carefully disassembled. All of the parts were cleaned using spatulas and toothpicks to remove as much solids stuck in the burr blades and auger. The liquid in the respective E2 beaker was used to wash the remainder of solids stuck to the burrs at the end. Once as much solids were recovered as possible, the ground solids from the tray and the E2 liquids from the beaker were transferred back into the original E2 bottle. The weight of the E2 bottle was recorded. Using that weight and the sum of the liquid and solid/bottle weight from the data sheet, the losses can be calculated. After calculating the amount of mass lost due to grinding, that amount was removed from the solids of LC and discarded.

The grinder was disassembled, washed and rinsed with DI water, and reassembled to repeat the experiment for E2. The losses were removed from LC2.

Closing the Fermentors

If the pH was below 6.5 when the initial pH was read during sampling, sodium hydrogen bicarbonate was used as a buffer to raise the pH. Then, 120 µL of inhibitor were added to each of the bottles. Finally, the oxygen was purged by nitrogen for 35 seconds and capped with the respective rubber stopper. The final weight of the bottles was recorded, and the bottles were placed back into the incubator to be removed after the next 48 hours.

Results

In order to analyze and measure the performance of each fermentor in this experiment, the following set of equations was used:

$$V = \frac{u_L \times M_{L,f} + u_S \times M_{S,f}}{1000} \quad (4\text{-}1)$$

$$M_{A,f} = V \times C_{A,f} \quad (4\text{-}2)$$

$$NAVS_m = M_m(1 - u_m)(1 - Q_m) \quad (4\text{-}3)$$

$$NAVS_{cs} = M_{cs}(1 - u_{cs})(1 - Q_{cs}) \quad (4\text{-}4)$$

-continued $$NAVS_F = NAVS_m + NAVS_{cs} \quad (4\text{-}4)$$

$$Y = \frac{M_{A,f}}{NAVS_F} \quad (4\text{-}5)$$

For these equations, the symbols used were defined as follows:

TABLE 4-1

Definitions of symbols used in performance calculation equations

| Symbol | Meaning |
| --- | --- |
| $C_{A,f}$ | Final concentration of acid in solution |
| $M_{A,f}$ | Final mass of total acids produced |
| $M_{L,f}$ | Final mass of liquid |
| $M_{S,f}$ | Final mass of solid |
| $M_{cs}$ | Mass of corn stover |
| $M_m$ | Mass of chicken manure |
| $NAVS_F$ | Non-acid volatile solids fed |
| $NAVS_{cs}$ | Non-acid volatile solids from corn stover |
| $NAVS_m$ | Non-acid volatile solids from chicken manure |
| $Q_{cs}$ | Gravimetric ash content of corn stover |
| $Q_m$ | Gravimetric ash content of chicken manure |
| V | Real liquid volume |
| Y | Yield |
| $u_L$ | Gravimetric moisture content of liquid |
| $u_S$ | Gravimetric moisture content of solid |
| $u_{cs}$ | Gravimetric moisture content of corn stover |
| $u_m$ | Gravimetric moisture content of chicken manure |

4.2 Performance Calculations

Through the use of Equations 4-1 through 4-5 and Table 4-1, the following table was produced.

TABLE 4-2

Computed performance values for each fermentor in the experiment.

| Fermentor | V (L) | $M_{A,f}$ (g) | $NAVS_m$ (g) | $NAVS_{cs}$ (g) | $NAVS_F$ (g) | Y |
| --- | --- | --- | --- | --- | --- | --- |
| C1 | 0.356 | 6.406 | 8.182 | 44.941 | 53.123 | 0.121 |
| C2 | 0.357 | 7.594 | 8.193 | 44.943 | 53.136 | 0.143 |
| E1 | 0.329 | 10.363 | 8.185 | 44.939 | 53.124 | 0.195 |
| E2 | 0.335 | 10.195 | 8.183 | 44.938 | 53.121 | 0.192 |
| LC1 | 0.328 | 8.016 | 8.173 | 44.944 | 53.116 | 0.151 |
| LC2 | 0.332 | 7.614 | 8.182 | 44.942 | 53.124 | 0.143 |

From Table 4-2, it can be seen that E2 and E1 greatly outperformed the controls C1 and C2, as well as the loss controls LC1 and LC2. When comparing the average yield of E1 and E2 to the average yield of C1 and C2, the experimental fermentors produced 46.6% more carboxylic acids than the control fermentors by mass for every gram of $NAVS_F$. Over the duration of the experiment, the nature of the grinding process made losses of mass unavoidable.

Mass Losses

During each grinding session, some portion of the feedstock (and the liquid) was lost in and on the crevices, burrs, and auger of the grinder, as all of the feedstock could not be removed from these areas. Over time, the amount of mass lost due to grinding became significant enough that selectivity and conversion calculations became complex, as the system was not at pseudo-steady-state for the experimental fermentors. As a result, the best indication of performance for the experiment lies in the amount of carboxylic acids produced, as a very similar amount of feedstock was placed in each bottle initially.

Aside from losses in the experimental fermentors due to grinding, all fermentors lost ~2.5 grams from sampling every two days. Because this process was identical for all fermentors, the sampling process had no apparent effect on the results of the experiment.

Acid Losses

For each sample taken from the fermentors over the course of the experiment, a GC analysis was performed to identify the concentration of carboxylic acids ranging from $C_2$ to $C_8$. From this, the concentration of carboxylic acids in each fermentor could be observed as it changed over the course of the experiment.

Figure 71:
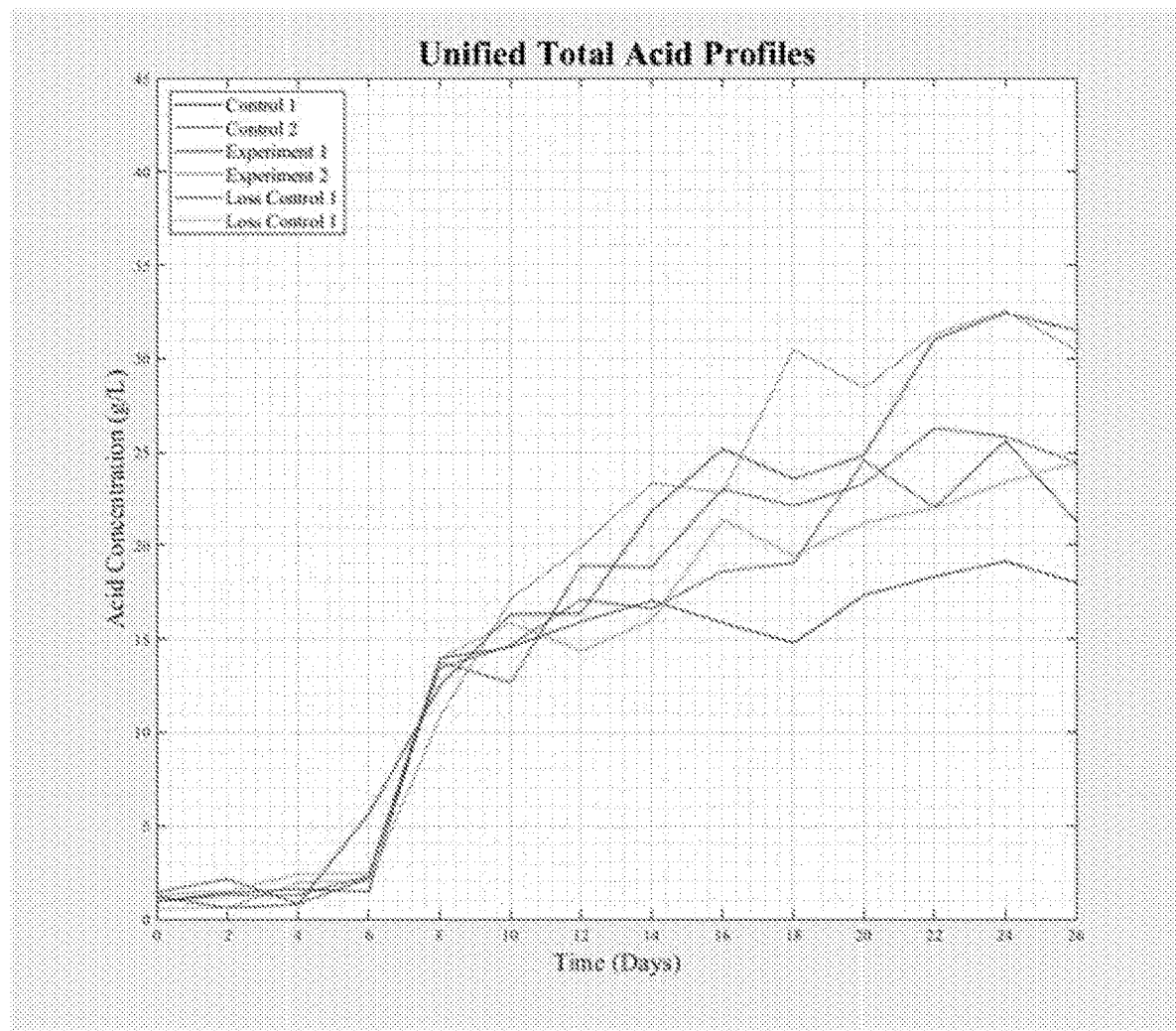
FIG. 71 shows a line chart of the concentration of total acids in each fermentor.
Figure 72:
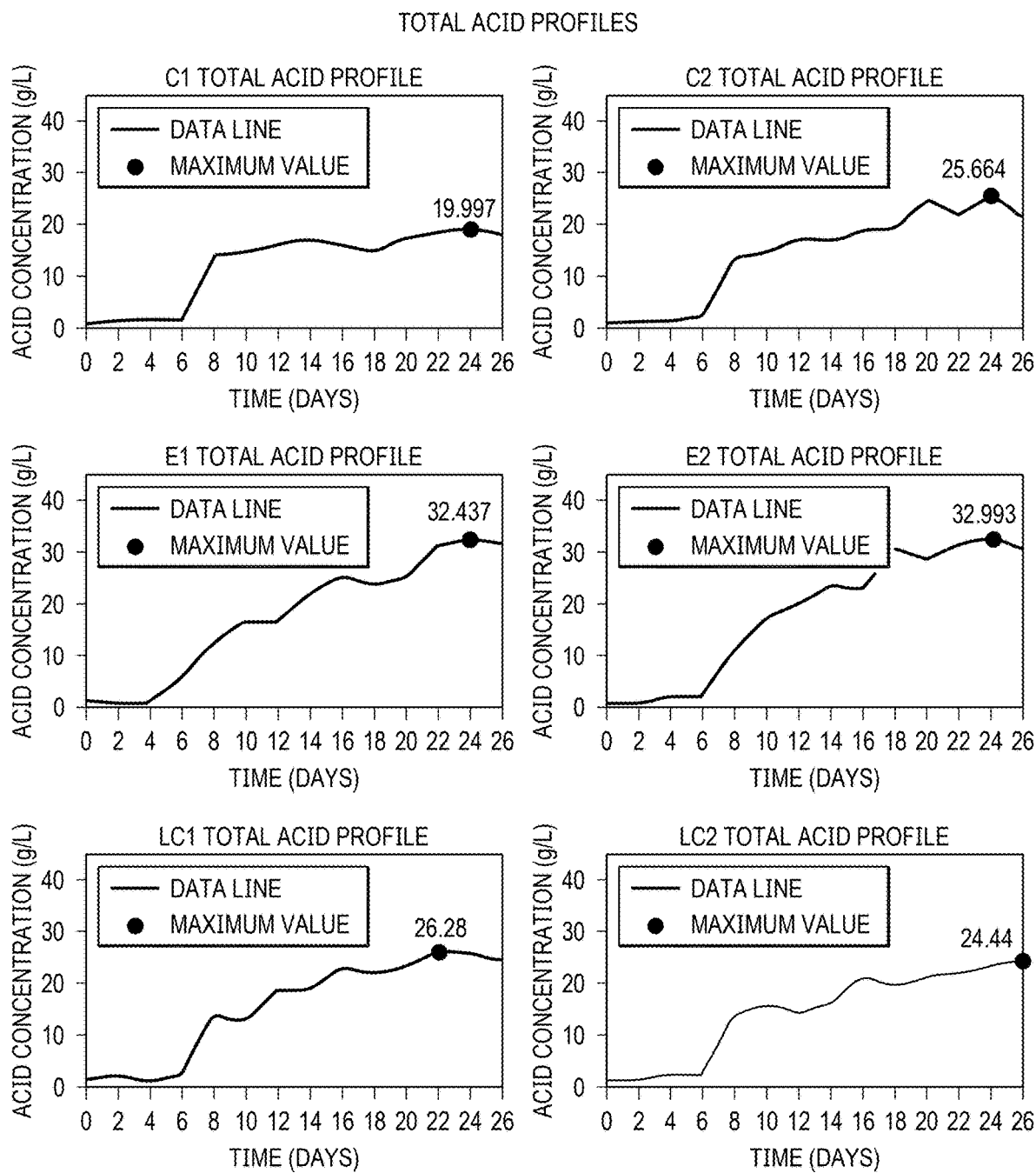
FIG. 72 shows individual line charts of the concentration of total acids in each fermentor.

From FIG. 71, there appears to be latent period from Day 0 to Day 6 for most of the fermentors. This is probably due to the bacteria becoming acclimated to the new bottles. After this apparent latent period however, the concentration of carboxylic acids in the experimental fermentors rises above the controls and remains there for the majority of the experiment timeline.

Observing the average of the maximum concentration of carboxylic acids in each fermentor over the course of the experiment, the E1/E2 outperformed both C1/C2 and LC1/LC2, having an average maximum carboxylic acid concentration 45.2% and 28.1% greater than C1/C2 and LC1/LC2 respectively.

Figure 73:
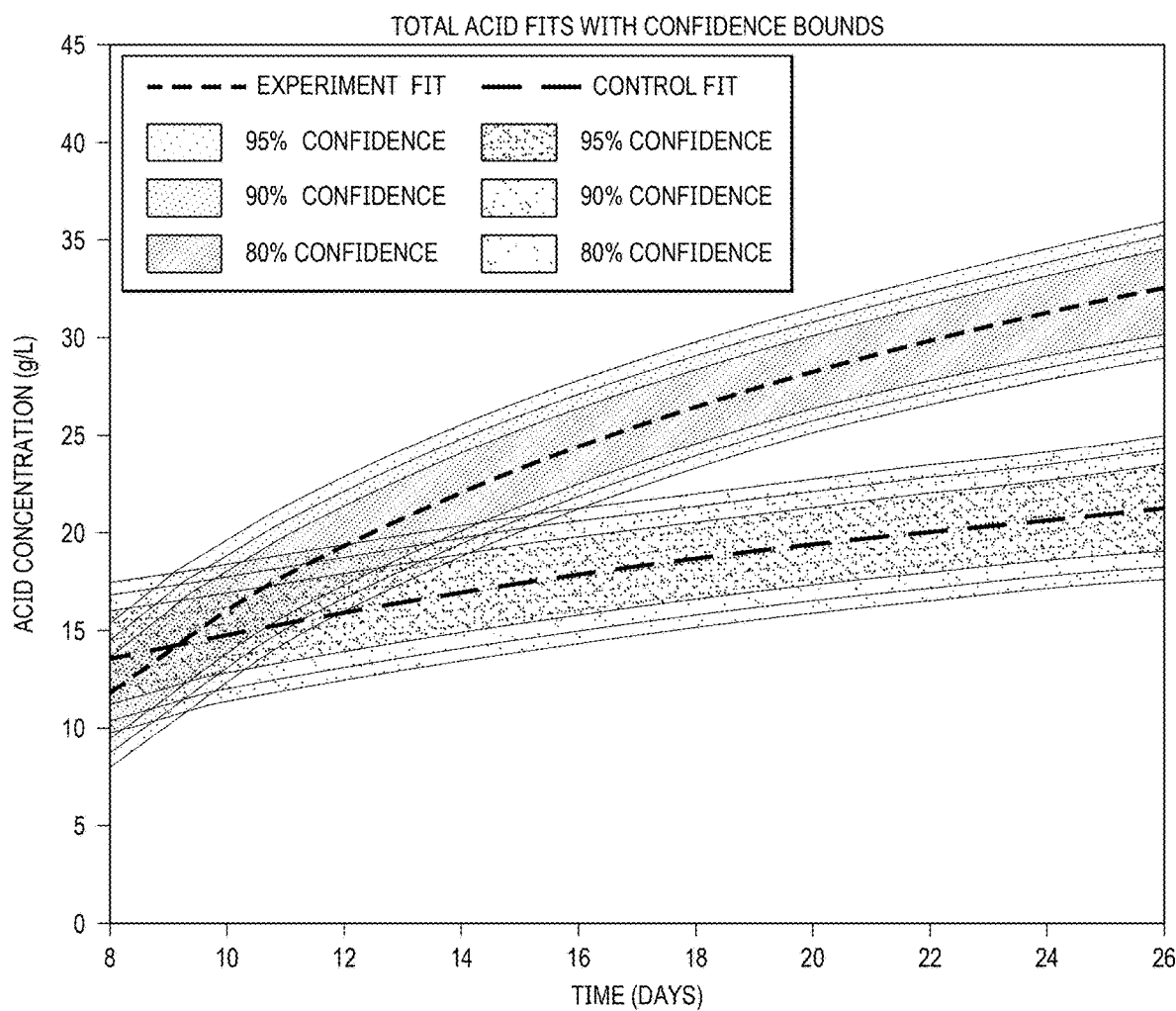
FIG. 73 shows fitted equations modelling the growth of total acid concentration in an experimental bottle and a control bottle over time.

Although there is little overall data for experiments of this nature, one useful tool to develop is a model that can predict the concentration of carboxylic acids in hypothetical experimental and control batch fermentors subject to similar treatments as those describe in this experiment. In FIG. 73, fits are plotted for the total acid concentration versus time for the experimental and control bottles used in this experiment after the latent period. Aside from the fits, confidence intervals are plotted to depict the model's goodness of fit relative to the true mean total acid concentration. Various confidence intervals are shown to allow flexibility in how confident one wants to be, as well as to account for the randomness associated with biological processes.

TABLE 4-3

Values for the coefficients of the model to predict the concentration $C_a(t)$ of various carboxylic acids (g/L) given time t (Days/2 > 4), where the "first" day is indexed t = 1.
Model: $C_a(t) = At^B + C$

| BOTTLE: ACID CHAIN | A | B | C |
|---|---|---|---|
| EXPT: TOTAL | −120.5 | −0.3439 | 81.03 |
| EXPT: $C_2$ | −66.12 | −0.3307 | 42.16 |
| EXPT: $C_3$ | −23.1 | −0.2361 | 17.77 |
| EXPT: $C_4$ | −48.62 | −1.673 | 8.349 |
| CTRL: TOTAL | 25.2 | 0.1951 | −20.91 |
| CTRL: $C_2$ | −33.49 | −0.1876 | 29.45 |
| CTRL: $C_3$ | −15.92 | −1.23 | 3.242 |
| CTRL: $C_4$ | −15.25 | −1.369 | 4.686 |

Conclusion

Based on the results of the experiment, co-treatment was successful in increasing the concentration of carboxylic acids the bacteria produced. The two experimental bottles, E1 and E2, yielded an average of 46.6% more total carboxylic acids by mass per gram of $NAVS_F$, and had an average total acid concentration 52.4% larger than that of C1 and C2 (using the model) after 26 days. From these results, we believe grinding the feedstock in order to break down the rigid lignin into more manageable pieces for the bacteria to consume succeeds as a "pretreatment" process. In the future, we recommend directly comparing the results of traditional feedstock pretreatment methods to that of this co-treatment method in order to better compare the economic viability of using co-treatment as a complete substitute for traditional pretreatment methods.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A biomass processing system comprising:
   a first and second fermentation stage, each of the first and second fermentation stages yielding a desired product, the first fermentation stage yielding a higher concentration of the desired product than the second fermentation stage;
   a first extraction stage associated with an output of the first fermentation stage,
   a second extraction stage associated with an output of the second fermentation stage, the second extraction stage having an output that feeds the first fermentation stage;
   a countercurrent flow path, separate from the output of the second extraction stage that feeds the first fermentation stage, that extends from the second extraction stage to the first extraction stage;
   a first separator associated with the first fermentation stage, the first separator configured to separate a combination of solids and liquids from the first fermentation stage in order to send liquids to the first extraction stage and solids to the second fermentation stage;
   a third fermentation stage; and
   a second separator associated with the second fermentation stage, the second separator configured to separate a combination of solids and liquids from the second fermentation stage in order to send liquids along a first path to the second extraction stage and solids along a second path, separate from the first path, to the third fermentation stage.

2. The system of claim 1, wherein the first and second fermentation stages have piles of biomass, the pile of biomass associated with the second fermentation stage having an age of processing higher than the first fermentation stage.

3. The system of claim 1, further comprising:
   a third fermentation stage, the third fermentation stage yielding the desired product, the third fermentation stage yielding a lower concentration of the desired product than the second fermentation stage;
   a third extraction stage associated with an output of the second fermentation stage, the third extraction stage having an output that feeds the second fermentation stage; and
   wherein the countercurrent flow path:
      further extends from the third extraction stage to the second extraction stage, and
      is separate from the output of the third extraction stage that feeds the second fermentation stage.

4. The system of claim 1, wherein the first extraction stage has a first output to send liquids to the first fermentation stage and a second output for extractants.

5. The system of claim 1, further comprising:
a third extraction stage;
a third separator associated with the third fermentation stage, the third separator configured to separate a combination of solids and liquids from the third fermentation stage in order to send liquids to the third extraction stage.

6. The system of claim 1, further comprising
a third fermentation stage, the third fermentation stage yielding the desired product, the third fermentation stage yielding a lower concentration of the desired product than the second fermentation stage.

7. A biomass processing system comprising:
a first and second fermentation stage, each of the first and second fermentation stages yielding a desired product, the first fermentation stage yielding a higher concentration of the desired product than the second fermentation stage;
a first ion exchange resin bed associated with the first fermentation stage;
a second ion exchange resin bed associated with the second fermentation stage;
a countercurrent flow path that extends from the second ion exchange resin bed to the first fermentation stage without passing through the first ion exchange resin bed
a first separator associated with the first fermentation stage, the first separator configured to separate a combination of solids and liquids from the first fermentation stage in order to send liquids to the first ion exchange resin bed and solids to the second fermentation stage;
a third fermentation stage; and
a second separator associated with the second fermentation stage, the second separator configured to separate a combination of solids and liquids from the second fermentation stage in order to send liquids along a first path to the second ion exchange resin bed and solids along a second path, separate from the first path, to the third fermentation stage.

8. The system of claim 7, further comprising:
a third ion exchange; and
a third separator associated with the third fermentation stage, the third separator configured to separate a combination of solids and liquids from the third fermentation stage in order to send liquids to the third ion exchange and solids to another process.

9. A biomass processing system comprising:
a first and second fermentation stage, each of the first and second fermentation stages yielding a desired product, the first fermentation stage yielding a higher concentration of the desired product than the second fermentation stage;
a first extraction stage associated with an output of the first fermentation stage,
a second extraction stage associated with an output of the second fermentation stage, the second extraction stage having:
a first output with a flow that feeds the first fermentation stage; and
a second output with a countercurrent flow path that extends from the second extraction stage to the first extraction stage, wherein the flow from the first output of the second extraction stage does not pass through the first extraction stage;
a first separator associated with the first fermentation stage, the first separator configured to separate a combination of solids and liquids from the first fermentation stage in order to send liquids to the first extraction stage and solids to the second fermentation stage;
a third fermentation stage; and
a second separator associated with the second fermentation stage, the second separator configured to separate a combination of solids and liquids from the second fermentation stage in order to send liquids to the second extraction stage and solids to the third fermentation stage.

10. The system of claim 9, wherein the first and second fermentation stages have piles of biomass, the pile of biomass associated with the second fermentation stage having an age of processing higher than the first fermentation stage.

11. The system of claim 9, further comprising:
a third fermentation stage, the third fermentation stage yielding the desired product, the third fermentation stage yielding a lower concentration of the desired product than the second fermentation stage;
a third extraction stage associated with an output of the third fermentation stage, the third extraction stage having:
a first output with a flow that feeds the second fermentation stage; and
a second output with a countercurrent flow path that extends from the third extraction stage to the second extraction stage, wherein the flow from the first output of the third extraction stage does not pass through the second extraction stage.

12. The system of claim 9, wherein the first extraction stage has a first output to send liquids to the first fermentation stage and a second output for extractants.

13. The system of claim 9, further comprising:
a third extraction stage; and
a third separator associated with the third fermentation stage, the third separator configured to separate a combination of solids and liquids from the third fermentation stage in order to send liquids to the third extraction stage.

14. The system of claim 9, further comprising:
a third fermentation stage, the third fermentation stage yielding the desired product, the third fermentation stage yielding a lower concentration of the desired product than the second fermentation stage.

* * * * *